US010721193B1

(12) United States Patent
    Chitrapu

(10) Patent No.: US 10,721,193 B1
(45) Date of Patent: Jul. 21, 2020

(54) REDUCING AVOIDABLE TRANSMISSION OF AN ATTACHMENT TO A MESSAGE BY COMPARING THE FINGERPRINT OF THE ATTACHMENT TO BE SENT TO THAT OF AN ATTACHMENT THAT WAS PREVIOUSLY SENT OR RECEIVED BY THE USER AND INDICATING TO THE USER WHEN A MATCH OCCURS THAT THE ATTACHMENT IS REDUNDANT

(71) Applicant: MICROSOFT TECHNOLOGY LICENSING, LLC, Redmond, WA (US)

(72) Inventor: Sriramachandra Murthy Chitrapu, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/384,868

(22) Filed: Apr. 15, 2019

(51) Int. Cl.
    *H04L 12/58* (2006.01)
    *G06K 9/62* (2006.01)
    *H04W 4/12* (2009.01)

(52) U.S. Cl.
    CPC ............ *H04L 51/08* (2013.01); *G06K 9/6201* (2013.01); *H04L 51/12* (2013.01); *H04W 4/12* (2013.01)

(58) Field of Classification Search
    CPC .......... H04L 51/12; H04L 51/08; H04W 4/12; G06K 9/6201
    See application file for complete search history.

(56) References Cited

U.S. PATENT DOCUMENTS

| 5,813,008 | A  | * | 9/1998  | Benson ............... G06Q 10/107 |
|-----------|-----|---|---------|-----------------------------------|
| 6,047,327 | A  | * | 4/2000  | Tso .................... G06F 16/9537 709/232 |
| 6,496,853 | B1 | * | 12/2002 | Klein .................. G06Q 10/107 709/206 |
| 6,631,398 | B1 | * | 10/2003 | Klein ...................... H04L 51/12 709/203 |
| 6,829,635 | B1 | * | 12/2004 | Townshend ............ H04L 51/14 709/206 |
| 7,251,680 | B2 | * | 7/2007  | DeVos ............... G06F 11/1453 709/206 |
| 7,577,656 | B2 | * | 8/2009  | Kawai ................. G06Q 10/107 |

(Continued)

*Primary Examiner* — Daniel C. Murray
(74) *Attorney, Agent, or Firm* — NovoTechIP International PLLC

(57) ABSTRACT

Techniques for electronic messaging including identifying a first user-indicated attachment associated with a message to a recipient body, and determining that the first user-indicated attachment is redundant, such that a fingerprint for the first user-indicated attachment corresponds to a second user-indicated attachment. In some examples, the determination results in a sending device presenting a notification that the first user-indicated attachment is redundant with an attachment previously sent to or sent by a recipient user. In some examples, the determination results in a recipient device presenting a description of the message that includes an indication that the first user-indicated attachment is redundant and selectively enabling a user-initiated operation related to presentation of the message. In some examples, the determination results in transmitting to an end-user device an indication that the first user-indicated attachment is redundant.

20 Claims, 41 Drawing Sheets

(56) References Cited

U.S. PATENT DOCUMENTS

| | | | | |
|---|---|---|---|---|
| 7,836,054 B2* | 11/2010 | Kawai | G06Q 10/107 | 707/737 |
| 7,941,490 B1* | 5/2011 | Cowings | H04L 51/12 | 709/204 |
| 8,065,424 B2* | 11/2011 | Foresti | G06Q 10/107 | 340/7.22 |
| 8,219,524 B2 | 7/2012 | Gokhale | G06F 16/9574 | 707/610 |
| 8,527,608 B2 | 9/2013 | Wilson | G06Q 10/107 | 709/219 |
| 8,804,966 B2* | 8/2014 | Brown | H04L 51/00 | 380/279 |
| 9,065,842 B2 | 6/2015 | Vandervort | H04L 9/3247 | |
| 9,111,261 B2* | 8/2015 | Bhattiprolu | G06Q 10/107 | |
| 9,256,699 B2 | 2/2016 | Heimes | H04L 51/12 | |
| 9,262,429 B2 | 2/2016 | Roomp | H04L 51/08 | |
| 9,438,549 B2* | 9/2016 | Maresh | G06Q 10/107 | |
| 9,614,796 B2 | 4/2017 | Aleksandrov | H04L 51/08 | |
| 9,819,630 B2 | 11/2017 | Johnstone | H04L 51/22 | |
| 9,912,625 B2 | 3/2018 | Mutha | H04L 51/08 | |
| 10,193,844 B1 | 1/2019 | Conley | H04L 51/18 | |
| 10,250,543 B2* | 4/2019 | Gnech | H04L 51/08 | |
| 10,505,723 B1* | 12/2019 | Griffin | H04L 9/3247 | |
| 2001/0054073 A1* | 12/2001 | Ruppert | G06Q 10/107 | 709/206 |
| 2003/0084293 A1* | 5/2003 | Arkko | H04L 29/12009 | 713/168 |
| 2004/0221014 A1* | 11/2004 | Tomkow | H04L 51/30 | 709/206 |
| 2005/0021963 A1* | 1/2005 | Tomkow | H04L 51/30 | 713/171 |
| 2005/0080856 A1* | 4/2005 | Kirsch | H04L 51/12 | 709/206 |
| 2005/0080857 A1* | 4/2005 | Kirsch | H04L 51/12 | 709/206 |
| 2005/0080860 A1* | 4/2005 | Daniell | G06Q 10/107 | 709/206 |
| 2005/0091512 A1* | 4/2005 | Shipp | G06F 21/562 | 713/188 |
| 2005/0114450 A1* | 5/2005 | DeVos | G06F 11/1453 | 709/206 |
| 2005/0198511 A1* | 9/2005 | Tomkow | H04L 51/30 | 713/176 |
| 2005/0210289 A1* | 9/2005 | Brown | H04L 51/38 | 726/5 |
| 2006/0190493 A1* | 8/2006 | Kawai | G06Q 10/107 | |
| 2006/0212712 A1* | 9/2006 | Braverman | G06F 21/562 | 713/181 |
| 2007/0016613 A1* | 1/2007 | Foresti | G06Q 10/107 | |
| 2007/0135095 A1* | 6/2007 | Barker | H04L 51/063 | 455/412.1 |
| 2008/0183824 A1* | 7/2008 | Chen | G06Q 10/107 | 709/206 |
| 2009/0005010 A1* | 1/2009 | Dote | H04L 51/12 | 455/412.1 |
| 2009/0089378 A1* | 4/2009 | Maresh | G06Q 10/107 | 709/206 |
| 2009/0282086 A1* | 11/2009 | Heimes | H04L 51/12 | |
| 2010/0250705 A1* | 9/2010 | Wilson | G06Q 10/107 | 709/219 |
| 2012/0278407 A1* | 11/2012 | Meisels | H04L 51/08 | 709/206 |
| 2013/0238720 A1* | 9/2013 | Tulasidas | H04L 67/1095 | 709/206 |
| 2015/0169599 A1* | 6/2015 | Burnett | H04L 51/08 | 707/662 |
| 2015/0264111 A1* | 9/2015 | Aleksandrov | H04L 51/08 | 726/4 |
| 2015/0296010 A1* | 10/2015 | Xi | H04L 67/1095 | 709/248 |
| 2015/0373002 A1* | 12/2015 | Siebert | H04L 63/1408 | 726/4 |
| 2016/0119269 A1* | 4/2016 | Heimes | H04L 51/12 | 709/206 |
| 2016/0241499 A1* | 8/2016 | Hailpern | G06Q 10/107 | |
| 2016/0308812 A1* | 10/2016 | Johnstone | H04L 51/22 | |
| 2017/0214642 A1* | 7/2017 | Tichauer | H04L 51/08 | |
| 2020/0004829 A1* | 1/2020 | Denton | G06F 16/288 | |

* cited by examiner

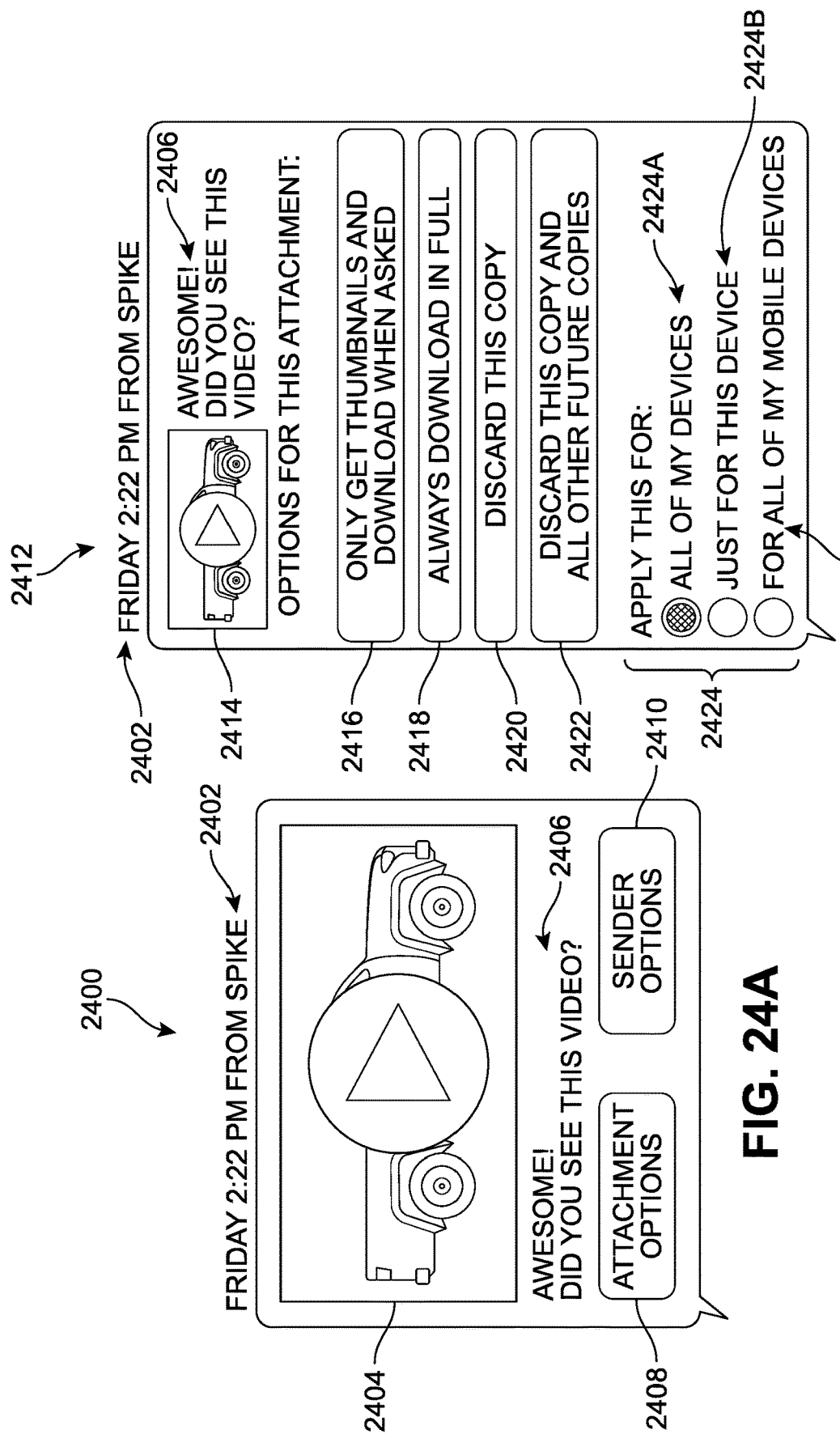

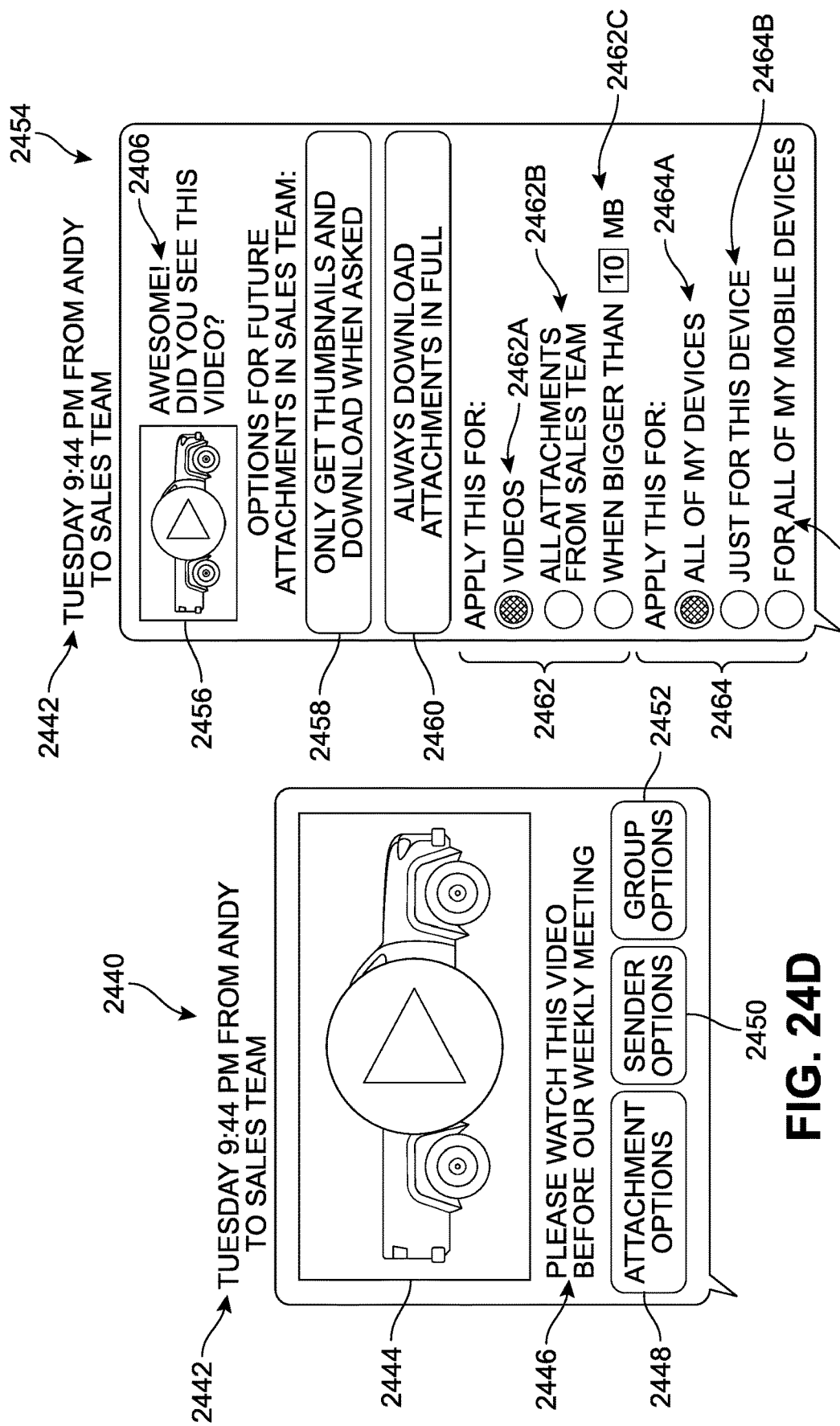

REDUCING AVOIDABLE TRANSMISSION OF AN ATTACHMENT TO A MESSAGE BY COMPARING THE FINGERPRINT OF THE ATTACHMENT TO BE SENT TO THAT OF AN ATTACHMENT THAT WAS PREVIOUSLY SENT OR RECEIVED BY THE USER AND INDICATING TO THE USER WHEN A MATCH OCCURS THAT THE ATTACHMENT IS REDUNDANT

BACKGROUND

Computing device users are increasingly accustomed to generating, receiving and sending many types of electronic content items (which may be referred to as "content items"), such as documents of different types, photographs, videos, images, and so forth according to different formats. In particular, electronic messaging services (which may be referred to as "messaging services") have made it simple and fast for users to send both content items and text-based communications in real time among each other, which far greater convenience than pursuing similar interactions via electronic mail. As a result, content items have been observed to be far more likely to "go viral" via messaging services, resulting in large numbers of repeated transmissions of content items among users. Since these content items are often media items (such as, but not limited to, videos and images), substantial amounts of resources are consumed by the repeated transmissions of "viral" content items, including multiple transmissions of content items to and/or from individual users. The circulation of such items, and other redundant transmissions of attachments among various messaging service user bases, can result in undesired increases in device power demands, device storage space demands, and data communication network bandwidth usage (including, for example, via metered data communication networks).

In a typical electronic messaging setting, a user can identify an electronic content item to be sent to other users and/or groups of users as a message attachment (which may be referred to as an "attachment"). This often results in the attachment being transmitted to, and stored by, the recipients' end-user computing devices. Current messaging services will transmit attachments to and/or from end-user computing devices with little or no reference to the redundancy of that attachment within a messaging service. There is a need for methods and systems for allowing the service and/or users to more selectively receive relevant content items so that a user may reduce the time-consuming and inefficient process of receiving, storing, and disposing of redundant content items.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

In FIG. 1A, a first end-user requests a first message and an associated first message attachment be sent to a second end-user, resulting in transmission of the first message attachment to an end-user device in use by the second end-user. In FIG. 1B, a third end-user requests a second message and an associated second message attachment be sent to the same second end-user, but based on a fingerprint for the second message attachment, the second message attachment is not transmitted to the end-user device.

In FIG. 2A, first and second sending end-users send messages with respective first and second message attachments, with a network transmission of the second message attachment being avoided.

FIGS. 10-12 illustrate additional implementations of the system architecture shown in FIG. 9. In FIG. 10, a messaging service includes a fingerprint directory used to identify message attachments that match message attachments from previous messages. In FIG. 11, a messaging service includes a fingerprint directory that associates fingerprints with senders and recipients of messages. In FIG. 12, a recipient end-user device includes a fingerprint directory used to identify message attachments that match message attachments from previous messages.

FIG. 13A illustrates an example of a "mediated" system in which an intermediary is used to manage delivery and transmissions of messages and associated attachments between users, and FIG. 13B illustrates an example of an "unmediated" system in which end-user devices are configured to transmit and receive message attachments directly between end-user devices without passing through an intermediary messaging service. FIG. 14A illustrates an example in which a message service operates as a message processing system configured to evaluate whether values of properties satisfy associated conditions. FIG. 14B illustrates an example in which a sending end-user device operates as a message processing system configured to evaluate whether values of properties satisfy associated conditions. FIG. 14C illustrates an example in which a receiving end-user device operates as a message processing system configured to evaluate whether values of properties satisfy associated conditions.

FIGS. 15, 16A, 16B, and 17 show various examples in which a sending end-user is notified regarding a redundancy 'status' for attachments selected by the sending end-user. In FIGS. 18A and 18B, additional information or options for one or more attachments are automatically presented in response to a determination that an attachment is redundant. FIGS. 19A-19C show examples in which a receiving end-user is offered various opportunities for both receiving redundancy status information and/or taking action in response to such information. FIG. 20 shows an example of a redundancy listing interface. FIGS. 21A-21D illustrate examples of various user interfaces directed to notifying and/or guiding users in response to redundant attachments. FIG. 22 presents a flow diagram of an implementation of a messaging content management process in which edited versions of previous attachments are identified, changes between versions determined, and data corresponding to the determined changes transmitted for the edited attachments.

FIGS. 23, 24A, 24B, 24C, 24D, 24E, 25A, 25B, and 25C illustrate examples of a fourth system architecture in which an intermediary messaging service is configured to receive and apply attachment transmission rule settings received from end-user computing devices. FIG. 23 illustrates an example of the fourth system architecture. FIGS. 24A-25C illustrate examples of various user interfaces provided at end-user devices for making changes to the attachment transmission rule settings.

DETAILED DESCRIPTION

Figure 1A:
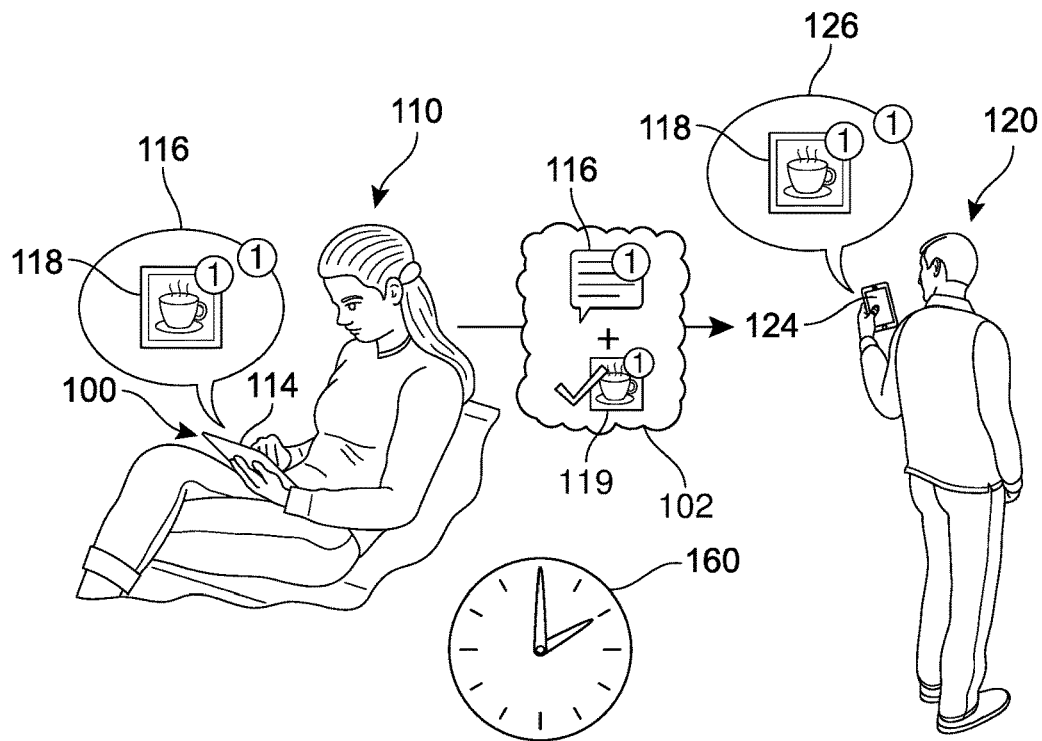
FIGS. 1A and 1B present a high-level example of a representative computing environment for implementing a first messaging content management system (MCMS).

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles.

As noted above, repeated transmissions of attachments among users of messaging applications and services can be associated with many burdens, both to users and data communication networks (which may be referred to as "networks"). The following disclosure is directed to methods and systems for facilitating the detection of avoidable transmissions of previously sent attachments, and in some implementations, minimizing avoidable transmissions of attachments, thereby helping to reduce power consumption and device storage space of end-user computing devices resulting from the attachments. In addition, such an approach can reduce needless network bandwidth consumption. Such scenarios occur frequently, although certainly not exclusively, in situations in which the sender and/or recipient are members of one or more 'communication groups'.

When a user is included as a member of a large communication group, the likelihood of receiving multiple messages providing identical or similar copies of an attachment will be much higher than via communication traffic that is limited to only two individuals (from a sending user to a single recipient user). As will be discussed in greater detail below, the following implementations provide for a system in which a fingerprint is obtained for an attachment identified for a message. The system can be configured to determine, based on the obtained fingerprint, whether a network transmission of the attachment can be avoided as a result of an attachment sent for a different message. This can occur, for example, by reference to this fingerprint and a directory of fingerprints for previous attachments. In some implementations, the system refrains from transmitting the attachment to a recipient end-user computing device if the fingerprint matches a fingerprint obtained for an attachment previously sent to the recipient user. However, there are many other opportunities for avoiding transmitting attachments and various techniques for exploiting those opportunities discussed in this disclosure.

Throughout this description, a messaging service and a messaging application can be understood to be configured to transmit and receive messages and associated message attachments via one or more data communication networks according to a messaging protocol. The messaging protocol defines network data exchange rules and/or formats for: sending a message including a user-created text component between different end-user computing devices, sending a message between different end-user computing devices and indicating a user-indicated message attachment associated with the message, transferring a user-indicated attachment associated with a message by an end-user computing device sending the message, and transferring a user-indicated attachment associated with a message to an end-user computing device. In some implementations, the messaging protocol also provides network data exchange rules and/or formats for sending a message including a user-created text component between different end-user computing devices and identifying a user-indicated message attachment associated with the message. It is noted that although portions of this disclosure may refer to a message attachment as being "attached to" or "included in" a message, such statements do not imply anything more than the message attachment being associated with the message.

A messaging service and/or a messaging application may be configured to support multiple different users, associate at least one unique user identifier with each user, identify a user associated with a unique user identifier, associate a user with an messaging application instance, identify at least one recipient user corresponding to a recipient body to which a message is to be sent, and identify a sending user that requested a message be sent to the recipient body. A messaging service and/or a messaging application may be configured to support and perform registration, authentication, and authorization of users. A messaging service may be configured to associate various records and data with users.

In some implementations, a messaging service and/or a messaging application is configured to support "communication groups" (which may be referred to as "user groups" or "groups"), with each communication group associated with one or more users as members of the communication group (which may be referred to as "member users" of the communication group). In some examples, a communication group may be associated with at least one unique group identifier, and a messaging service may be configured to identify a communication group associated with a group identifier and identify member users of the communication group as recipient users of a message sent to the communication group. In some examples, a messaging service is configured allow a member user of a communication group to request a message be sent to the other member users by identifying the communication group as a recipient of the message using an associated group identifier. A message transmitted to an end-user device may include an identification of a communication group through which it was sent.

The term "recipient body" refers to information identifying, implicitly or explicitly, one or more individual users (which may, for example, each be identified using associated user identifiers) and/or one or more communication groups (which may, for example, each be identified using associated communication group identifiers) to which a message is requested to be sent. In some examples, a recipient body may simply identify a single individual user. A messaging service and/or a messaging application may be configured to, for a message sent to a recipient body, identify all of the users corresponding to a recipient body as recipient users to which the message is to be sent.

An end-user computing device executes a respective messaging application instance of a messaging application. Example embodiments of end-user computing devices include, but are not limited to, desktop computers, mobile computing devices (including mobile computing devices configured to communicate via a mobile communication network), smart televisions, gaming devices, set-top boxes, Internet-of-Things (IoT) devices, and/or any other network-enabled computing devices. A messaging application instance executing on an end-user computing device is configured to utilize one or more user interfaces to present information to an end-user and/or receive user input from an end-user via one or more human-machine interfaces provided by the end-user computing device. In some examples, graphical user interfaces ("GUIs") may be presented on a display device of an end-user computing device. In some examples, a voice-driven user interface may be used.

In some implementations, messages may be exchanged using multiple different messaging applications, and message may be exchanged using different versions of a messaging application. A message application may be implemented in various forms including, but not limited to, as a native application persistently installed on an end-user computing device (such as, but not limited to, a smartphone app), as a web application executed via a web browser component or application, and/or a hybrid application including both native software components and web application components. An "active messaging session" refers to a messaging application instance executing in a state currently able to receive new messages (including, for example, having suitable network access and/or having authenticated with a messaging service). An active messaging session may be associated with a user (and the end-user computing device on which it is executing may also be associated with the user), and as a result send messages to other users on behalf of the associated user and receive messages sent to the associated user by other users. In some implementations, a messaging service and/or a messaging application is configured to identify all active messaging sessions associated with a user to effect delivery of a messages sent to the user. In some implementations, a messaging service and/or a messaging application may be configured to support sending a message to an "offline" user currently without an active messaging session by storing the message for deferred transmission once an active messaging session associated with the user becomes available.

For purposes of reference, the term "messaging content management system" ("MCMS") will be used at a higher level to describe a system by which an end-user (which may be referred to as a "user," and in connection with sending a message, a "sending end-user," a "sending user," or a "sender") can, using a messaging application instance executing on an end-user computing device (which may be referred to as an "end-user device" or a "client device," and in connection with sending a message, a "sending end-user device" or a "sending device") indicate one or more electronic content items are to be sent as user-indicated message attachments in association with a user-initiated message sent to a recipient body; receive messages and associated message attachments sent by other end-users; perform a variety of management tasks in connection with received attachments, such as retrieving, modifying, browsing, and/or sharing the attachments; adjust settings and/or user preferences regarding the delivery and/or transmission of message attachments; and/or enable an end-user to access messages and message attachments from multiple client devices. A "mediated" MCMS refers to an MCMS in which messaging application instances are configured to send and receive messages through an associated electronic messaging service. An "unmediated" MCMS refers to an MCMS in which messaging application instances are configured to exchange messages directly with other messaging application instances without sending and receiving the messages through an associated electronic messaging service (although an associated electronic messaging service may still be used for other purposes such as, but not limited to, user registration, user authentication, and/or directory services for locating active messaging sessions). In various implementations, aspects of an MCMS may be implemented by an electronic messaging service associated with the MCMS and/or the end-user client computing devices used to send and receive messages and message attachments via the electronic messaging service.

In addition, terms such as "electronic content item" or "data object" can include any digital data that may be included in a message attachment. Some non-limiting examples include including but not limited to an electronic document, media content (such as, but not limited to, digital video, digital images, or digital audio), and other digital data. Although an end-user may indicate a file (locally stored or otherwise) is to be used as a message attachment, in some examples an end-user may indicate a content of a system clipboard (for example, an image being cut and pasted from a different application) is to be used as a message attachment.

Figure 1B:
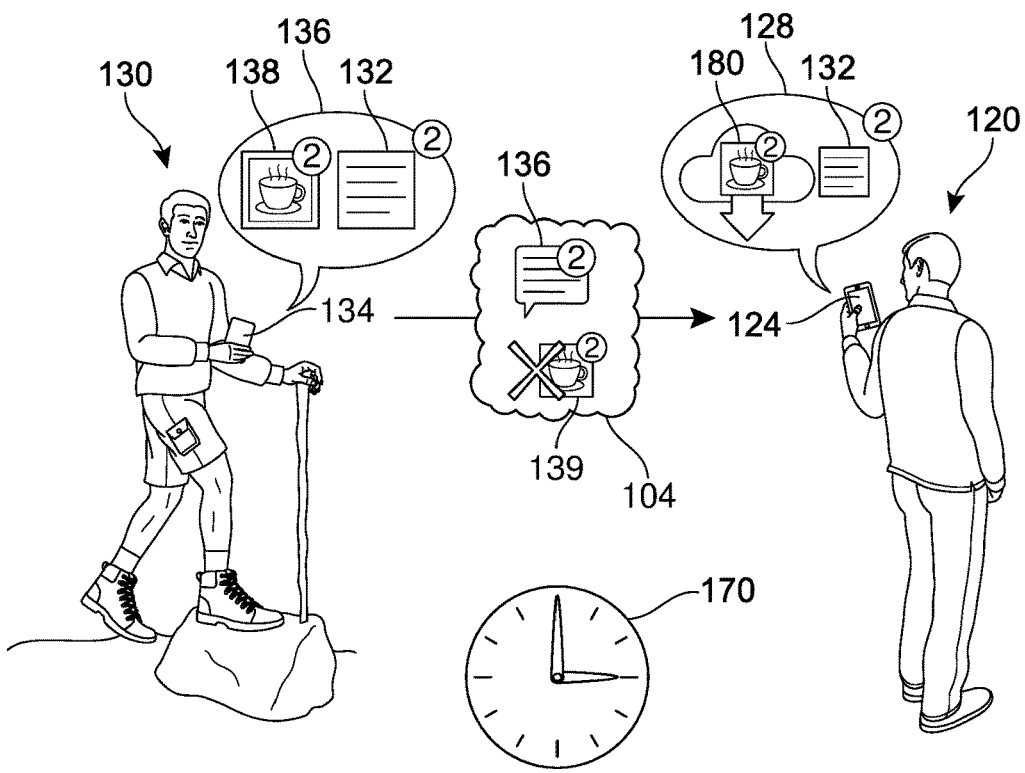

In order to better introduce the systems and methods to the reader, FIGS. 1A and 1B present a high-level example of a representative computing environment ("environment") 150 for implementing a first MCMS. (A generalized implementation of an MCMS will also be described with reference to FIGS. 2A and 2B). In different implementations, the environment 150 can include one or more computing device end-users, or simply "users". One or more users can interact with or manipulate data presented via a client device. The various features and activities illustrated in FIGS. 1A and 1B are described generally, with further details and examples presented in connection with later figures.

As an example, a first end-user 110, a second end-user 120, and a third end-user 130 are shown in FIGS. 1A and 1B. In this case, the first end-user 110 is accessing a messaging client application ("messaging client") 100 on a first end-user computing device 114. In FIGS. 1A and 1B, only three end-user computing devices 114, 124, and 134 are shown, but any number of end-user computing devices may be communicating and/or sharing messages, including associated attachments, via a messaging service. As the first end-user 110 submits a request to send a message via the first end-user computing device 114 in FIG. 1A, various text content and/or attachments may be transmitted via a data communication network connection.

In this example, the first end-user computing device 114 allows the first end-user 110 to create a first message 116 and identify a first attachment 118 associated with the first message 116, and request that the first message 116 be conveyed to another user (here, to second user 120). In response, at a first time 160, the MCMS generates or otherwise obtains a first fingerprint corresponding to the first message attachment 118. The first fingerprint may be used to determine whether the second user 120 has previously received the content corresponding to the first message attachment 118 by reference to a fingerprint record directory, as will be described in greater detail below. For purposes of this example, as no other fingerprint is identified in the directory that matches the first fingerprint, the MCMS determines that the second user 120 has not previously received the first message attachment 118. As shown in FIG. 1A, the first message 116 and first attachment data 119 for the first message attachment 118 are transmitted via a network 102 to a second device 124 for the second user 120. In some implementations, the second user 120 may receive and view the first message attachment 118 on a second device 124, or a messaging client of the second device 124 may simply be in receipt of the first message 116, for example if the second user 120 has not yet accessed or viewed the message via native control for the messaging client.

For purposes of this description, a "native control" refers to a mechanism for communicating content through a client application to an application user. For example, native controls may include pop-up windows that may be presented to a user via native application user interfaces (UIs), interactive buttons or other objects that may be shown to a user through native application UIs, as well as mechanisms that are native to a particular application for presenting associated content with those native controls. In FIG. 1A, the messaging client 100 can be understood to provide or display on the first device 114 a UI that is configured to permit the first user 110 to send a message. Similarly, the messaging client can also provide the second device 124 with another UI that is configured to permit the second user 120 to receive the message. As a result, the first message attachment 118 is delivered to the second user 120 in association with a first delivered message 126.

The third user 130 may also initiate a message request to the second user 120, as shown in FIG. 1B. A second message 136, in this case including both a text component 132 and a second message attachment 138, is illustrated. In many cases, the average user is unaware of whether a given message attachment has been previously in circulation among other users, or whether the desired target recipient body (or a portion of a recipient body that corresponds to multiple recipient users) has already been sent this message attachment. The MCMS, at a second time 170 that occurs after the first time 160, can generate or otherwise obtain a second fingerprint corresponding to the second message attachment 138. The second fingerprint may be used to determine whether the second user 120 has previously received the content corresponding to the second message attachment 118 by reference to the fingerprint record directory, which now also includes a record of the first fingerprint.

For purposes of this example, the MCMS determines that, because the first fingerprint and the second fingerprint are a match (or substantially match), the first message attachment 118 and the second message attachment 138 are the same. In response, the system can determine that the second user 120 has previously received the pending second message attachment 138. As shown in FIG. 1B, the second message 136, including the text message 132, is then transmitted to the second device 124. However, transmission via a network 104 of a second attachment data 139 for the second message attachment 138 is avoided in connection with sending the second message 136. The second user 120 may receive and view the text message 132 of the second message 136 on the second device 124. In some implementations, the MCMS may also provide an indication to the second user 120 and/or the third user 130 of the redundancy determination, or a notification that the second message attachment 138 was not delivered. In another implementation, the second user 120 may be provided with an opportunity to request or override the exclusion of the second message attachment 138 and receive the full second message 136. In other implementations, as discussed below, the messaging client may deliver the text message 132 along with a compressed or reduced-size version of the second message attachment 138 to the second device 124, or some other symbol or representation (see an indicator 180) of the excluded content. In different implementations, the indicator 180 can itself serve as a selectable option for initiating a request for access to the full content of the omitted message attachment.

Figure 2A:
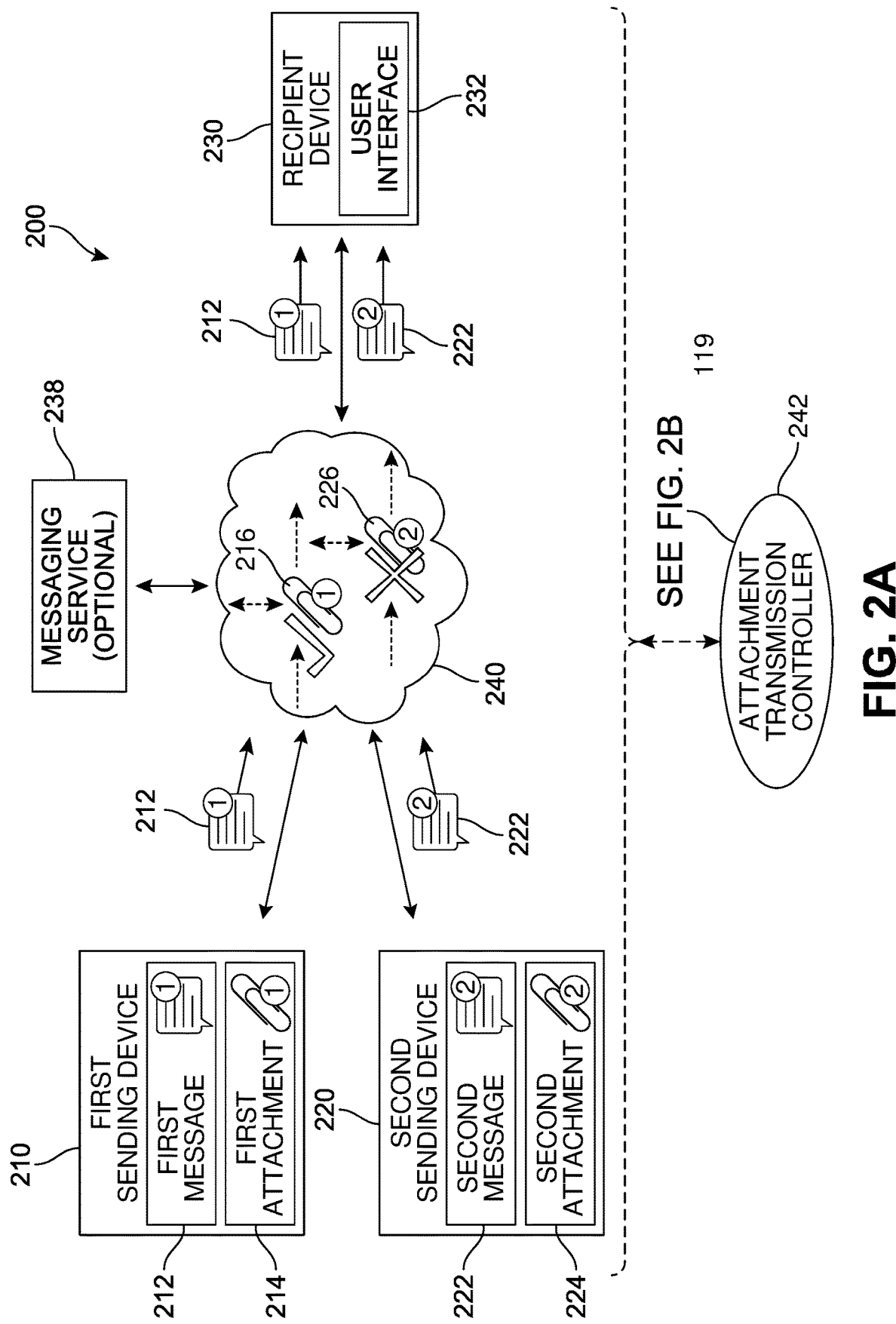
FIGS. 2A and 2B present a high-level example of a representative architecture for a generalized implementation of an MCMS.
Figure 2B:
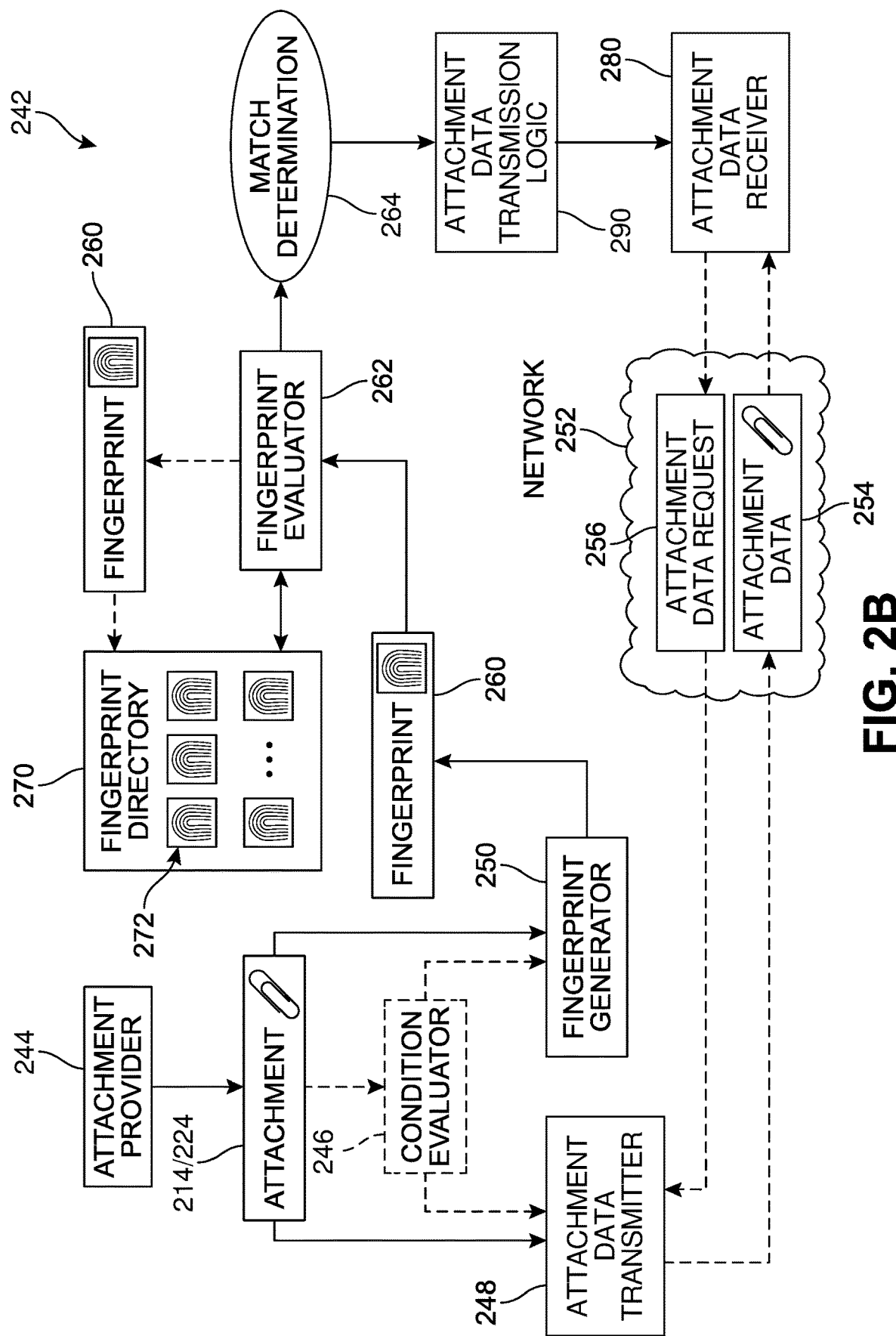

Referring now to FIGS. 2A and 2B, an example of a representative architecture of an MCMS 200 is depicted. In different implementations, the MCMS 200 can be configured to transmit and receive information to/from various computing devices that may be included in the MCMS 200 or be separate from the MCMS 200. Some computing devices can present user interfaces for display of messaging information. It is to be understood that the MCMS 200 presented here is merely an example implementation, only some aspects are presented for purposes of clarity, and that a wide variety of other implementations are possible.

In the example illustrated in FIG. 2A, a first sending end-user (not shown in FIG. 2A) may, via a user interface (not shown in FIG. 2A) on a respective first end-user device 210 (or "first sending device"), request that a first message 216 be sent (in some implementations, on behalf of a sending user), to a recipient user (not shown in FIG. 2A) associated with a recipient end-user device 230. In some implementations, the MCMS 200 includes an attachment transmission controller 242 (discussed in greater detail in FIG. 2B) configured to process any message attachments, such as a first message attachment 214, indicated by the first sending end-user for being sent in association with the first message 212. In various implementations, the attachment transmission controller 242 can be implemented with one or more of the first sending device 210, a second sending device 220, an optional messaging service 238, and/or the recipient device 230. In various implementations, the MCMS 200 can include multiple such attachment transmission controllers. The various processing may include or make use of a fingerprint generator 250, which configured to generate fingerprints for message attachments for use by the attachment transmission controller 242 and/or the MCMS 200 to identify and/or compare message attachments, as will be discussed in FIG. 2B. As shown in FIG. 2A, a first attachment data 216 (providing an electronic content of the first attachment 214) is transmitted via a network 240 in association with the sending of the first message 212. The network 240 may correspond to, for example, a network link between the first sending device 210 and/or the second sending device 220 and the messaging service 238, a network link between the messaging service 238 and the recipient device 230, and/or a network link between the first sending device 210 and/or the second sending device 220 and the recipient device 230. Where the MCMS 200 is "mediated," the MCMS 200 includes the messaging service 238 to manage or help manage messaging among users. The first message 212 can then be delivered to the recipient device 230, at which the recipient end-user may view the first message 212 or otherwise access information regarding the first message 212 via a user interface 232 provided by the recipient device 230.

Also in the example illustrated in FIG. 2A, a second sending end-user (not shown in FIG. 2A) may, via a user interface on the respective second end-user device 220 (or "second sending device"), similarly request that a second message 222 and an associated user-indicated second message attachment 224, be sent to the same recipient user. However, the second sending end-user is unaware that the second message attachment 224 matches the first message attachment 214 (for example, the attachments 214 and 224 might be bitwise identical, although in some examples non-identical attachments may match) that was previously sent (in association with the first message 212) to the recipient user.

The attachment transmission controller 242 determines that a transmission via the network 240 of a second attachment data 226 (providing an electronic content of the second attachment 224) can be avoided, and as a result the MCMS 200 selectively avoids or otherwise does not perform the transmission in association with the sending of the second message 222. The avoided transmission of the second attachment data 226 in association with sending the second message 226 can occur in response to various processes and determinations made by the attachment processing controller 242, which may include, for example, obtaining and using fingerprints for the first and second message attachments 214 and 224. In some examples, although the first message 212 and its associated first attachment data 216 are transmitted via the network 240 at approximately a first time, the second attachment data 226 is not transmitted via the network 240 at approximately a second time that the second message 222 is transmitted via the network 240 (although in some circumstances, the second attachment data 226 may be transmitted via the network 240 at a later time, such as in response to a request from the recipient device 230).

Referring to FIG. 2B, one implementation of the attachment transmission controller 242 is shown. The attachment transmission controller 242 can work with or be incorporated in the MCMS 200 in different implementations. An attachment provider 244 (e.g., a message sender) can provide the attachment 214 to further modules for initiating the evaluation. For example, the attachment 214 can be sent to fingerprint generator 250 in order to create, generate, and/or assign a unique or substantially unique identifier ("fingerprint") 260 for each particular attachment. A variety of mathematical functions may be utilized to generate the fingerprints, an example of which is a hashing algorithm, which will be discussed in greater detail below.

In some implementations, an attachment may be subject to the fingerprinting process only if one or more conditions about or with respect to the attachment are met. For example, an optional condition evaluator 246 can review metadata or other information about the attachment and determine whether the attachment is of a type, size, or other property that would allow the attachment to bypass the fingerprinting process. In such cases, a determination as to whether the attachment is redundant need not occur, and the attachment can instead be directly conveyed to an attachment data transmitter 248, which can (for example, via a network 252) transmit attachment data 254 for the attachment 214 to an attachment receiver 280. In such a scenario, the attachment may be redundant or may be new to a system including the attachment data receiver 280.

In another implementation, the condition evaluator 246 can process the attachment's descriptive data and determine that the attachment 214 meets one or more of the conditions for resuming a fingerprinting process of the attachment 214. In such cases, the attachment 214 may be provided to fingerprint generator 250, which outputs a fingerprint 260 that will henceforth correspond to this attachment 214. It should be understood that, as the condition evaluator 246 is optional, in other implementations, the attachment provider 244 can be configured to directly provide the attachment 214 to the fingerprint generator 250. In other words, in different implementations, the system 202 can submit all attachments, regardless of attachment properties or type, for processing by the fingerprint generator 250.

As a general matter, the fingerprint generator 250 can be configured to generate a fingerprint for an attachment using a variety of mathematical functions or approaches. In one example, the fingerprint generator 250 may employ a hash algorithm. The hash algorithm can produce a hash value, which may be a number, set of letters, or other alphanumeric tag or symbol, generated from a string of data which forms or comprises each attachment. Typically, the hash value is smaller than the string itself, and may be generated in such a way that it is unlikely that some other string will result in the same hash value. For instance, it may be generally unlikely that two different strings will produce the same hash value. However, matching strings are generally expected to produce the same hash value. Thus, a hash value may be used as a fingerprint.

In different implementations, a fingerprint evaluator 262 can obtain the generated fingerprint 260 and, with reference to a fingerprint directory 270, make a determination as to whether the fingerprint 260 has been previously sent to the receiver. This can occur by attempting to find a match between fingerprint 260 and one or more of a plurality of fingerprint records 272 stored in the fingerprint directory 270. In some implementations, the system 202 may compare this generated fingerprint with an attachment list or directory which includes similarly generated fingerprints (i.e., using a similar mathematical function) for previously-sent attachments. If the generated fingerprint matches a fingerprint in the fingerprint directory 270, a first type of match determination 264 is generated, indicating that the fingerprint 260 matches with another fingerprint record in the fingerprint directory 270, and thereby corresponds to an attachment that is redundant for the specified receiver. In other words, the particular attachment contains the same data as an attachment previously sent to this recipient user. In some other implementations where the fingerprint 260 does not match any of the current records stored in the fingerprint directory 270, the fingerprint 260 can be submitted to the fingerprint directory 260 to update the listing of fingerprint records. In such cases, the match determination 280 can instead indicate that the fingerprint 260 corresponds to an attachment that has not been previously sent to this recipient body. It should be understood that, in some implementations, the attachment data receiver 280 can request transmission of the attachment 214 (see attachment data request 256), despite a determination that the attachment 214 was redundant. In some examples, attachment data transmission logic 290 may be included which, based on the match determination 264, controls the attachment data receiver 280.

Figure 3:
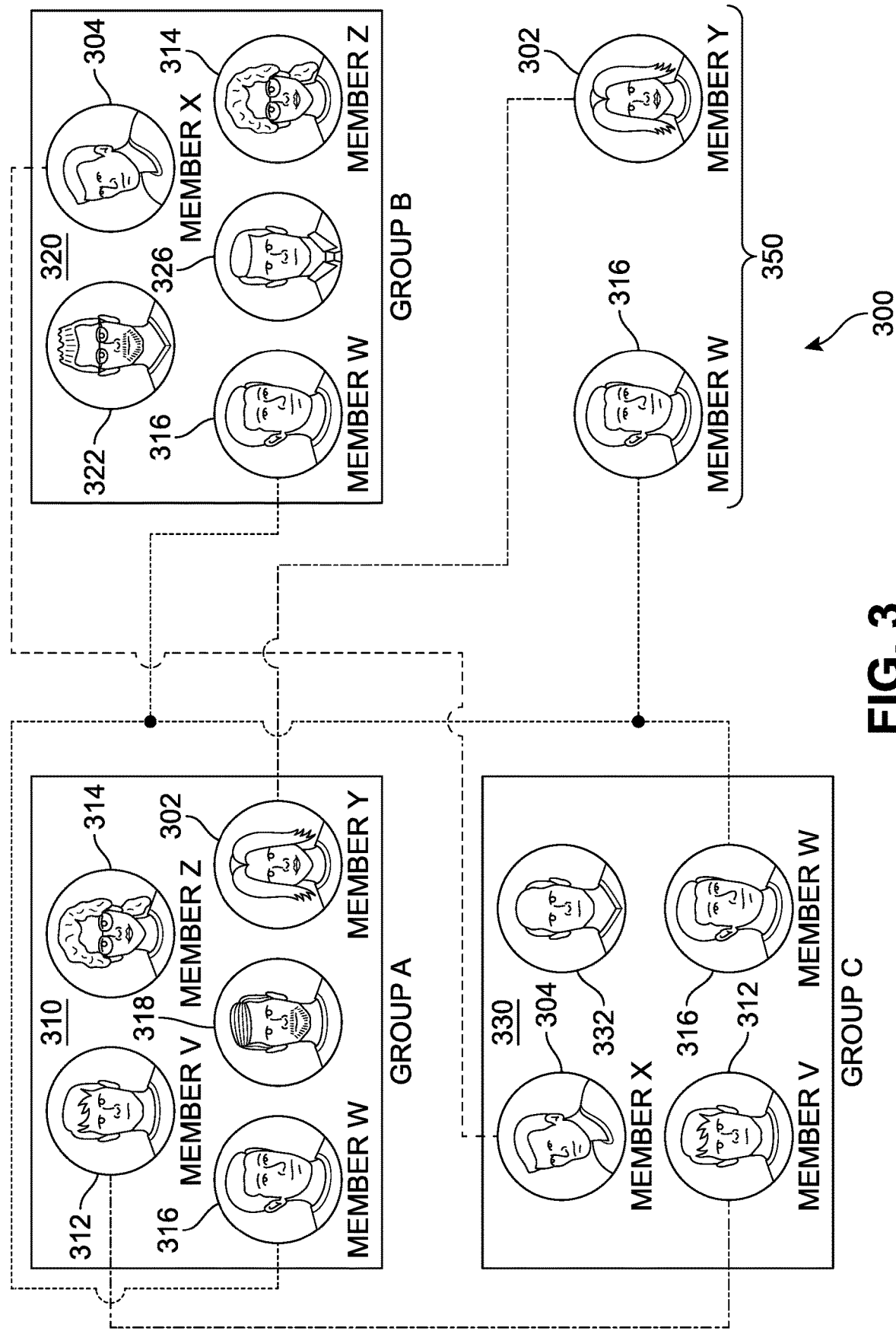
FIGS. 3, 4, 5,6, and 7 illustrate an example of one technical implementation of the proposed systems involving various scenarios in which messages with associated message attachments are sent between and among users who are members of various communication groups.

Referring now to the sequence of FIGS. 3-7, an example of one technical implementation of the proposed systems is presented. In FIG. 3, an overview of a plurality of messengers ("messengers") 300 is illustrated shown. The messengers 300 include three groups (Group A' or first group 310, 'Group B' or second group 320, and 'Group C' or third group 330), each group comprising a plurality of individual end-users, as well as two individual users 350. The paradigm of FIG. 3 is provided primarily for purposes of reference for the reader, illustrating some of the possible types of message senders and receivers. For example, first group 310 includes a first member 312 ('Member V'), a second member 314 ('Member Z'), a third member 316 ('Member W'), a fourth member 318, and a fifth member 302 ('Member Y'). Thus, any message sent to "Group A" will be transmitted to the individual members of the first group 310. Similarly, second group 320 includes a sixth member 322, a seventh member 304 ('Member X'), and an eighth member 326. Furthermore, the second group 320 includes both third member 316 ('Member 316') and second member 314 ('Member Z'), each of whom are also members of first group 310. Any message sent to "Group B" will be transmitted to the individual members of the second group 320. In addition, third group 330 includes a ninth member 332, as well as seventh member 304 ('Member X'), first member 312 ('Member V'), and third member 316 ('Member W'). Messages sent to "Group C" will be transmitted to the individual members of the third group 330. It can also be observed that the two individual users 350 include persons who are members of other groups: 'Member W' or third member 316 and 'Member Y' or fifth member 302).

Figure 4:
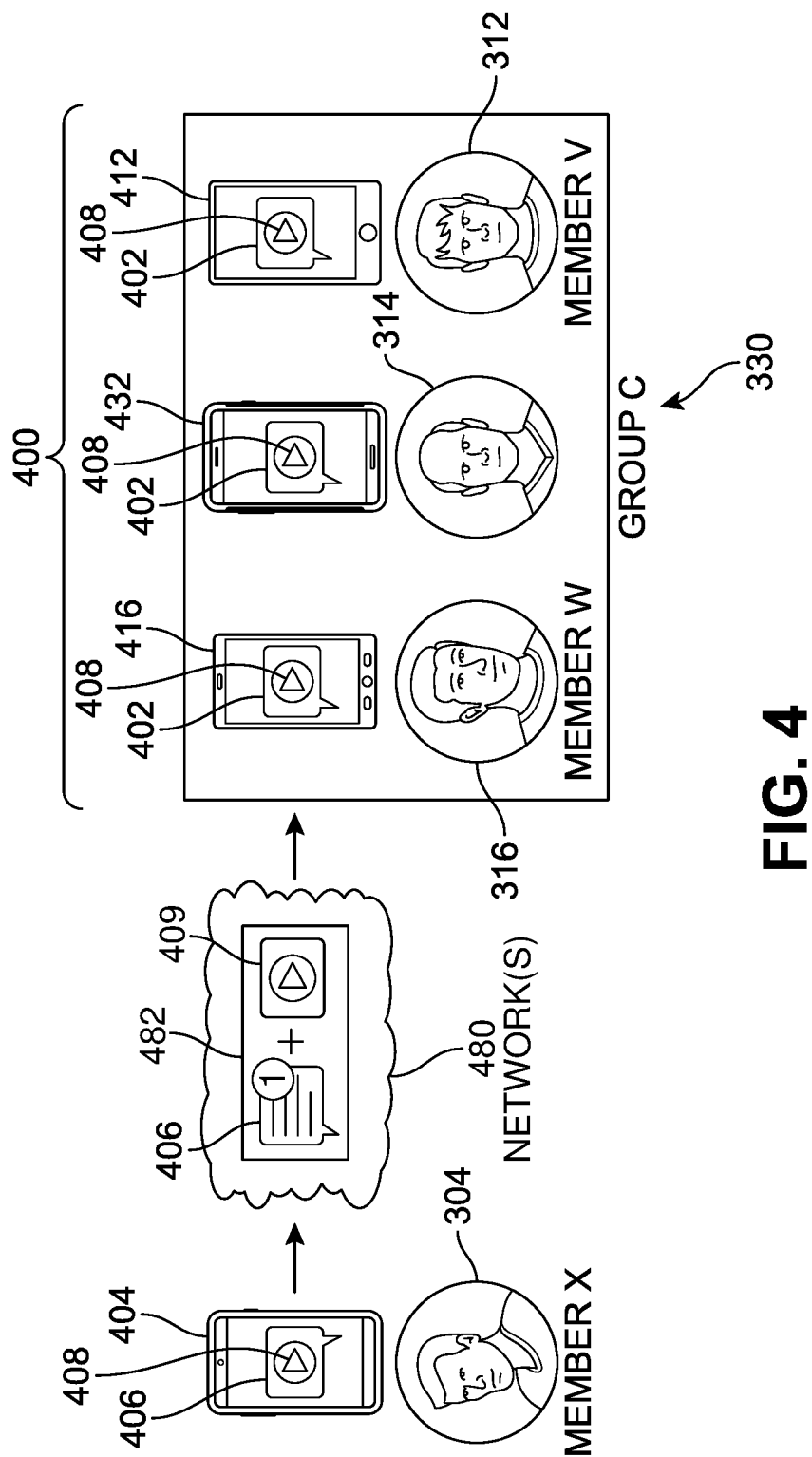

FIG. 4 presents an example scenario where the seventh member 304 is shown requesting a first message 402 and an associated video message attachment 408 be sent to a first recipient body 400 including fellow members of the third group 330. The seventh member 304 accesses, receives, creates, captures, obtains, or otherwise produces a first message content 406 via a first device 404 for sending to the first recipient body 400, including indicating the video attachment 408. In this example, both the first message 402 and its associated video attachment 408 are transmitted via a network to each of the recipient users corresponding to the first recipient body 400. It can be observed that the first message 402 and the video attachment 408 are transmitted to a second end-user device 416 associated with a third member 316 ('Member W'), the first message 402 and the video attachment 408 are transmitted to a third end-user device 432 associated with the ninth member 332, and the first message 402 and the video attachment 408 are transmitted to a fourth end-user device 412 associated with the first member 312 ('Member V'). For each of the individual recipient users corresponding to the first recipient body 400, the first message 402 and its associated video attachment 408 are transmitted to each of the three end-user devices 412, 416, and 432, as represented by a message bubble containing a 'play' symbol button. In this example, it can be understood that the system determined that the video attachment 408 is being sent for the first time to each of the three recipient users 312, 314, and 316 (i.e., the content of the video attachment 408 has not been previously sent to these three members of the third group 330).

Figure 5:
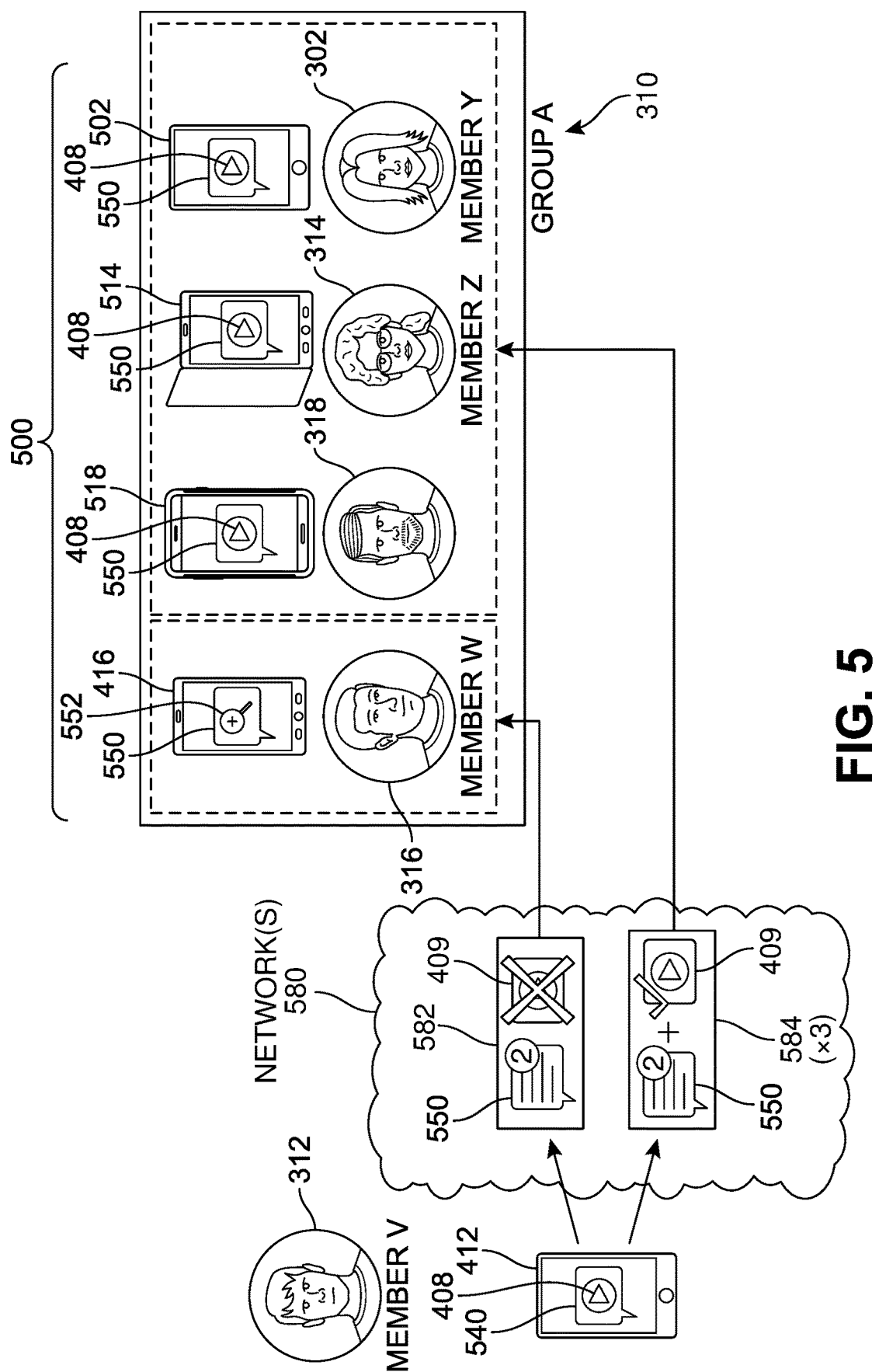

Referring next to FIG. 5, a second, subsequent scenario depicts the first member 312 submitting a request for a second message 550 to be sent to other fellow members of first group 310, who together comprise a second recipient body 500. First member 312 accesses, receives, creates, captures, obtains, or otherwise produces a second message content 540 via his fourth device 412 for sending to his group. As one example, the first member 312 may in this case be forwarding the first message he received from the seventh member in FIG. 4. Thus, in FIG. 5, the second message content 540 comprises video attachment 408 (i.e., the same attachment as previously described with reference to FIG. 4). The submitted second message 550, including the video attachment 408, is sent via a network to the second recipient body 500. It can be observed that third member 316 ('Member W') receives the second message 550 via his second device 416, the fourth member 318 receives the second message 550 via a fifth device 518, the second member 314 ('Member Z') receives the second message 550 via a sixth device 514, and the fifth member 302 ('Member Y') receives the second message 550 via a seventh device 502. For most of the individuals of the second recipient body 500, the second message 550 conveys the full message content sent by the first member 304, including video attachment 408, as represented by a message bubble containing a 'play' symbol button. In other words, the system has determined that video attachment 408 is being sent for the first time to each of three individuals of the group (i.e., the content of the video attachment 408 has not been previously sent to these three members), comprising fourth member 318, second member 314, and fifth member 302.

However, it can be observed the 'Member W' or third member 316 was also a member of third group 330 of FIG. 4, and therefore has previously been sent the video attachment 408. In different implementations, the system is configured to determine that the second message content 540 includes an attachment that is redundant with respect to the third member 316. In response, the system can automatically exclude the video attachment 408 when the second message 550 is transmitted to the third member 316. One implementation of this is presented in FIG. 5, where the second message 550 is shown on the display of the second device 416, but the content of the second message 550 differs from what was conveyed to the remaining group members. In this case, the second message 550 includes an indication 552 that the attachment associated with the sender's (first member 312) message is absent, missing, removed, or otherwise has not been transmitted in connection with transmitting the message. It should be understood that the indication 552 shown to third member 316 in FIG. 5 (illustrated here as a magnifying glass) can vary widely in different implementations. In some implementations, the indication can comprise alphanumeric text, symbols, icons, interactive or otherwise actuatable buttons, or there may be no indication provided that the redundant attachment was not transmitted. For purposes of this example, the indication 552 may be an actuatable option via which the third member 316 may request access to or transmission of the video attachment 408, irrespective of its redundancy. However, without such an express request, the system can conserve its resources, as well as those of the recipient user, by excluding a network transmission of the redundant message attachment.

Figure 6:
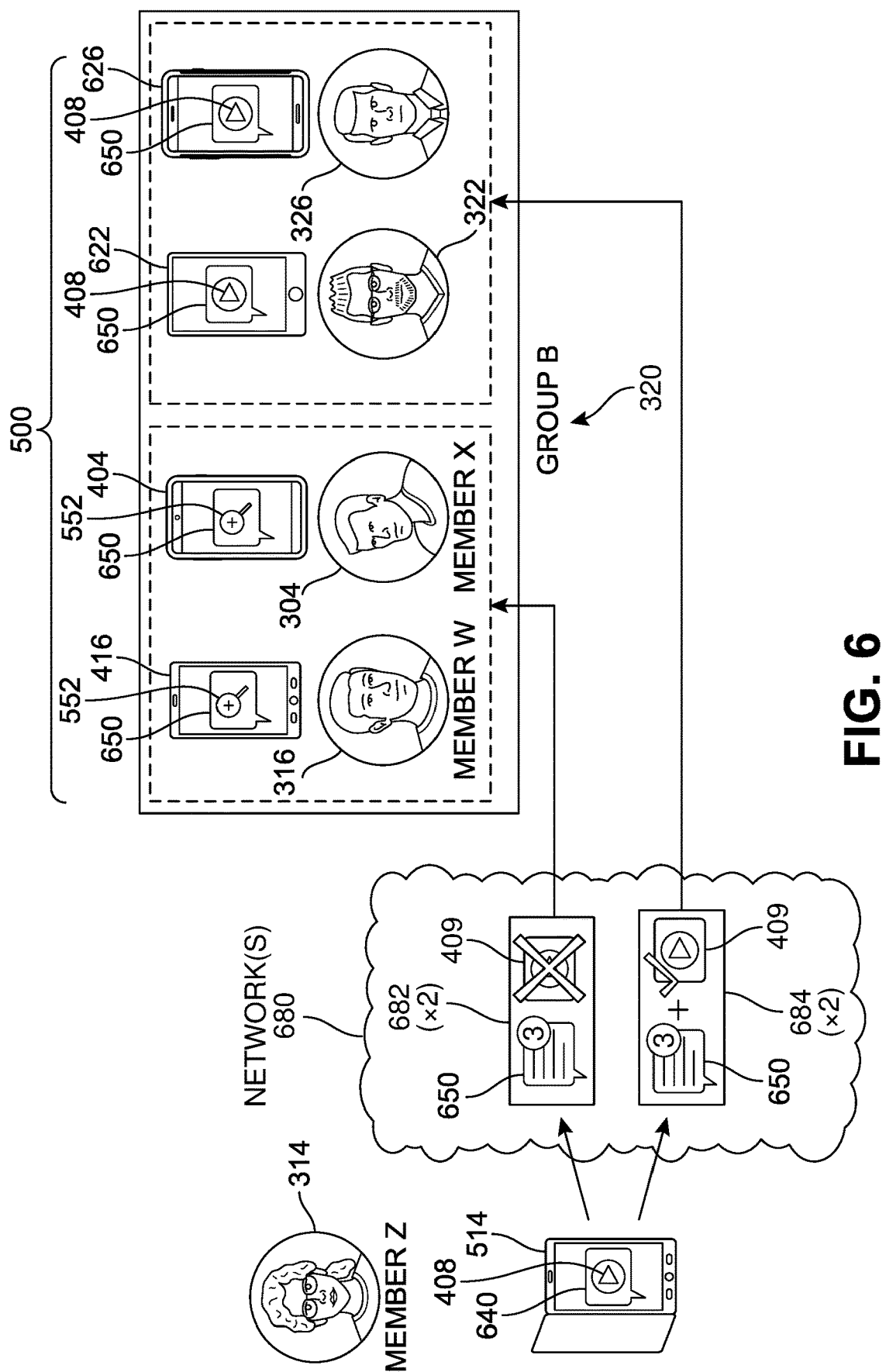

Another example of this process is shown with reference to FIG. 6, in which a third, subsequent scenario depicts second member 314 submitting a request for a third message 650 to be sent to fellow members of second group 320, who together comprise a third recipient body 600. Second member 314 accesses, receives, creates, captures, obtains, or otherwise produces a third message content 640 via her sixth device 514 for sending to her group. As one example, the second member 314 in this case can be understood to be forwarding the second message she had received from the first member in FIG. 5. Thus, in FIG. 6, the third message content 640 comprises video attachment 408 (i.e., the same attachment as previously described with reference to both FIGS. 4 and 5). The submitted third message 650, including the video attachment 408, is sent via a network to the third recipient body 600. It can be observed that third member 316 ('Member W') receives the third message 550 via his second device 416, the sixth member 322 receives the third message 650 via an eighth device 622, the eighth member 326 receives the third message 650 via a ninth device 626, and the seventh member 304 ('Member X') receives the third message 650 via first device 404. For two of the individuals of the third recipient body 600, the third message 650 conveys the full message content sent by the second member 314, including video attachment 408, as represented by a message bubble containing a 'play' symbol button. In other words, the system has determined that video attachment 408 is being sent for the first time to two individuals of the group (i.e., the content of the video attachment 408 has not been previously sent to these two members), comprising sixth member 322 and eighth member 326.

However, it can be observed the 'Member W' or third member 316 was also a member of third group 330 of FIG. 4, and therefore has previously been sent the video attachment 408. In addition, a previous attempt to send Member W (third member 316) the same attachment occurred with respect to FIG. 5, and was excluded once the system determined the attachment was redundant for this recipient user. FIG. 6 illustrates how this assessment can occur on multiple occasions, as recipients (for example, recipient users and/or recipient groups) are repeatedly sent the same attachment. Similarly, Member X (seventh member 304) was previously sent the video attachment 408 as described above with respect to FIG. 5. In different implementations, the system is configured to determine that the third message content 640 includes an attachment that is redundant with respect to both the third member 316 and the seventh member 304. In response, the system can automatically avoid transmitting the video attachment data 409 when the third message 650 is transmitted to the third member 316 and the seventh member 304. This is presented in FIG. 6, where the third message 650 is shown on the displays of both the second device 416 and the first device 404, but the content of the third message 650 differs from what was conveyed to the remaining group members. In this case, the third message 650 includes the indication 552 that the attachment associated with the sender's (second member 314) message is absent, missing, removed, or otherwise has not been transmitted as part of transmitting the message.

Figure 7:
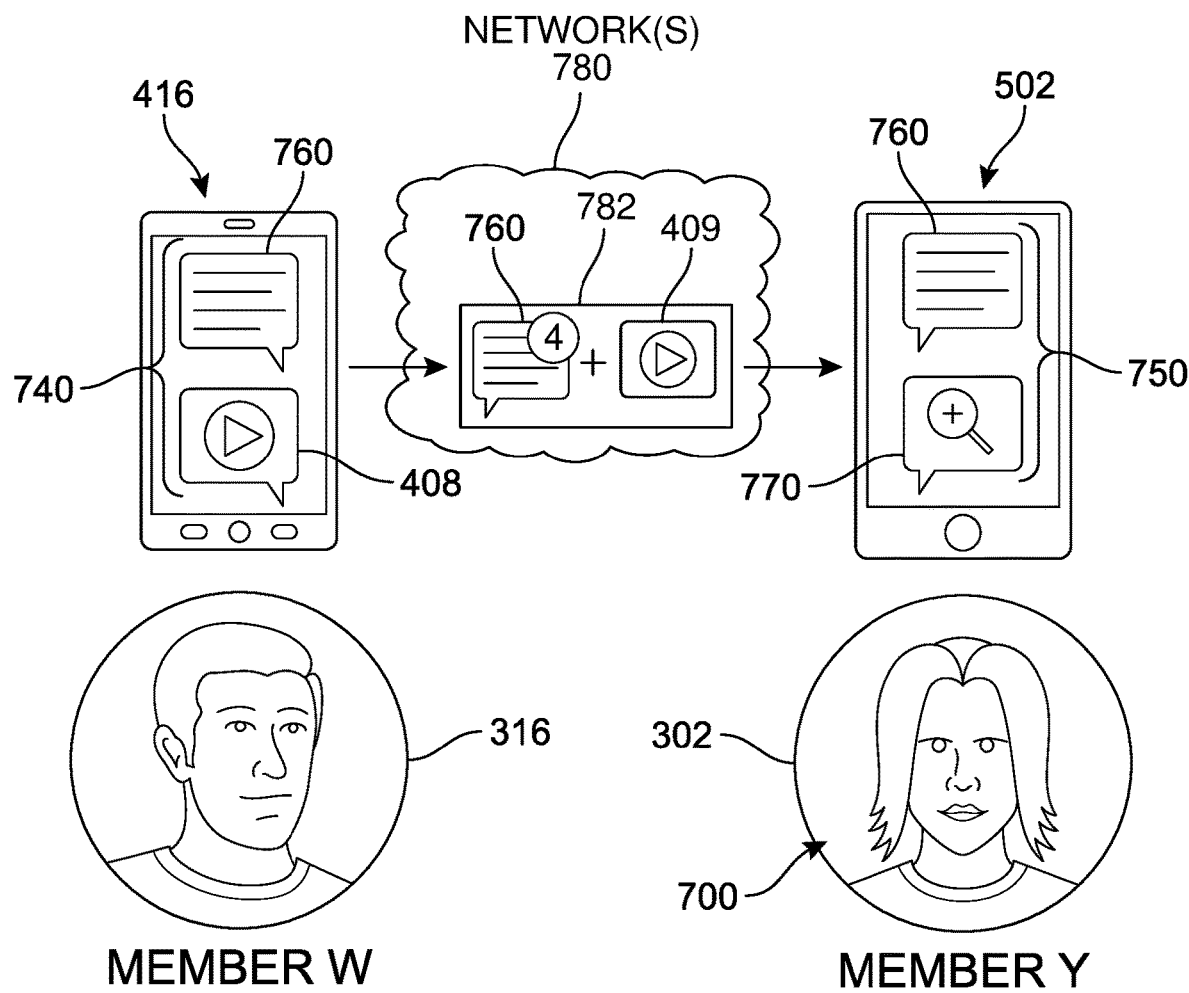

A third scenario is presented with respect to FIG. 7, where third member 316 is shown submitting a request for delivery a fourth message 750 to be sent to an individual end-user (for example, a spouse, friend, or other contact) who may be understood to represent a fourth recipient body 700. Third member 316 accesses, receives, creates, captures, obtains, or otherwise produces a fourth message content 740 via his second device 416 for sending to his contact. As an example, the third member 316 may be forwarding the first message he had received from the seventh member in FIG. 4. Thus, in FIG. 7, the fourth message content 740 comprises the video attachment 408 (i.e., the same attachment as previously described with reference to both FIGS. 4, 5, and 6). In addition, for purposes of illustration, the fourth message content 740 also includes a text message 760. The submitted fourth message 750, including both the video attachment 408 and the text message 760, is sent via a network to the fourth recipient body 700. It can be observed that fifth member 302 ('Member Y') receives the fourth message 750 via her seventh device 502.

However, it can be observed the 'Member Y' or fifth member 302 was also a member of first group 310 of FIG. 5, and therefore has previously been sent the video attachment 408. FIG. 7 illustrates how this assessment of a message attachment can occur in conjunction with messages that include textual content. As noted above, once the system determines that the fourth message content 740 includes an attachment that is redundant with respect to the fifth member 302, the system can be configured to automatically avoid transmitting the video attachment data 409 via network(s) 780 when the fourth message 750 is transmitted to the fifth member 302. However, the textual content of the message is delivered in full. This is presented in FIG. 7, where the fourth message 750 is shown on the display of the seventh device 502, but the content of the fourth message 750 differs from what was sent by Member W. In this case, the data transmitted for the fourth message 750 includes the text message 760, and in lieu of the video attachment data 409, an indication 552 is shown notifying the receiver that the attachment that had been part of the sender's message is absent, missing, removed, or otherwise has not been delivered as part of the message as a whole. In other words, in different implementations, the process described herein can be applied such that only particular portions of a whole message (for example, associated message attachments) are partitioned and evaluated for redundancy, while portions that are not associated attachments may be conveyed to the recipient users regardless of whether any associated attachment(s) are deemed redundant.

Figure 8:
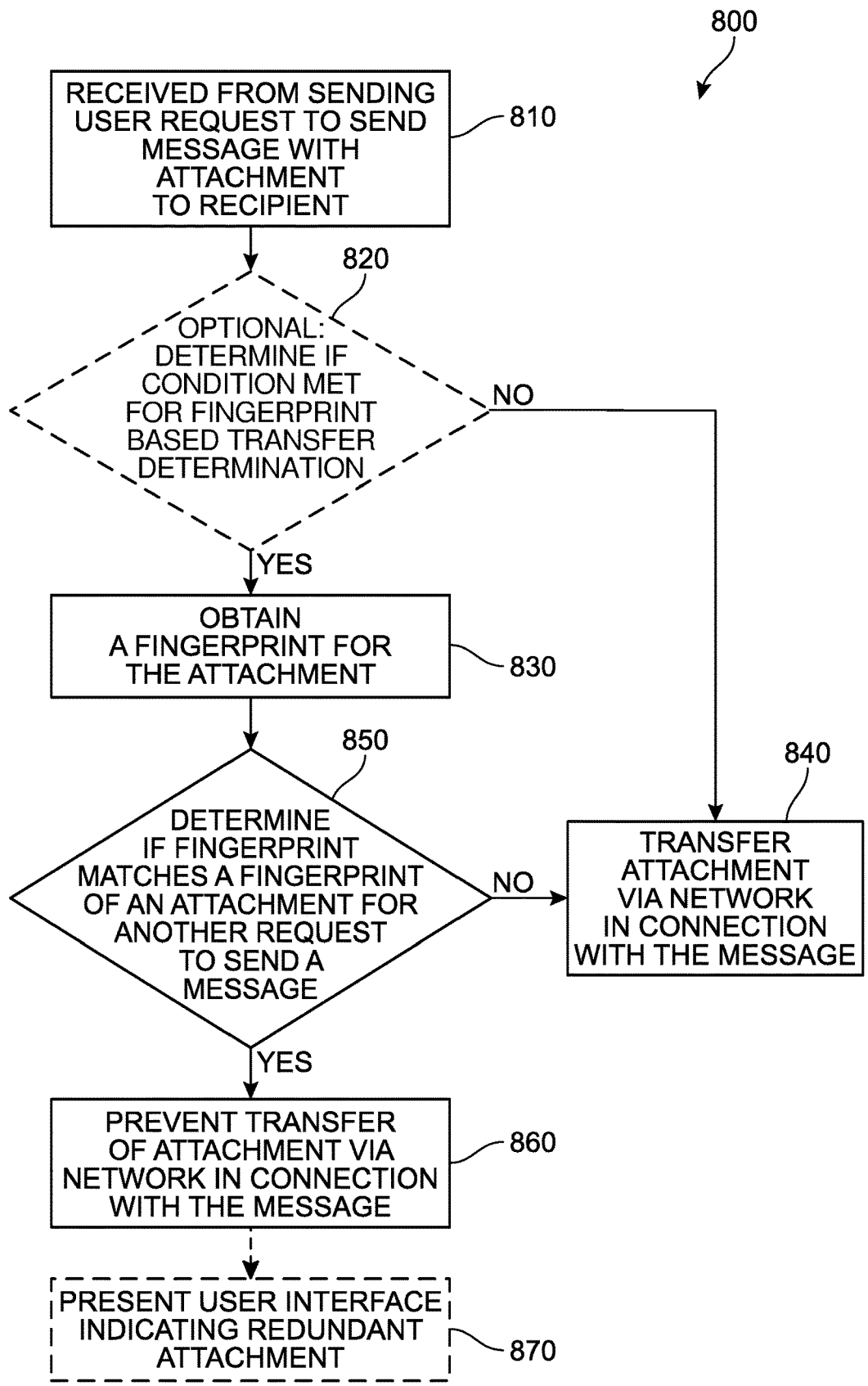
FIG. 8 presents a flow diagram of one implementation of an example messaging content management process.

In order to allow the reader to better appreciate some of the aspects described herein, FIG. 8 presents a flow diagram of one implementation of an example messaging content management process 800. In some examples, some or all of the process 800 may be performed in combination with any of the features discussed in connection with FIGS. 1A-7. In a first stage 810, a sending user may generate or submit a request to send a message and an associated message attachment to a recipient user (or, in some examples, to a recipient body corresponding to multiple users). At a second (optional) stage 820, if the attachment meets one or more conditions for performing fingerprint generation (as described earlier), the system can proceed to obtain a fingerprint for the attachment in a third stage 830. If the attachment did not meet the condition(s) at stage (stage 820, "NO"), the process 800 proceeds to a stage 840 in which the attachment is transmitted via a network connection in association with sending the message and the process 800 can end. It should be understood that because second stage 820 is optional, the process 800 may instead go from the first stage 810 to a third stage 830 without the intervening second stage 820 (i.e., without evaluation of the attachment in view of any conditions).

Referring again to the third stage 830, once the fingerprint corresponding to the attachment is obtained, the system can be configured to determine if the fingerprint matches a fingerprint for another attachment that was associated with a previous request to send a message at a fifth stage 850. If no such match is established, the process can again move to the fourth stage 840. If a match is found, the attachment can be excluded or otherwise be prevented from its transmission via a network to the recipient in a sixth stage 860. Finally, in some implementations, the recipient user may be provided with an indication of the redundancy determination of the attachment via a user interface in a seventh stage 870.

In order to better clarify the described implementations for the reader, several examples of the proposed systems are now presented below. Referring first to FIGS. 9-12, a first system architecture in which an intermediary messaging service facilitates the message management process is shown. In this example, fingerprint generation can occur in conjunction with the sender's request to send a message attachment to a recipient and/or on the device that is submitting the sender's request. In other words, in one implementation, the system can be configured to obtain a fingerprint for a message attachment before transmission of the message attachment from the sender device occurs. Thus, the determination regarding a redundancy of the submitted message attachment to a particular recipient user can be made without incurring a larger transmission cost to the network that would result from the transfer of the larger attachment. In some implementations, some or all of the features described in connection with FIGS. 9-12 may be performed in combination with any of the features discussed in connection with FIGS. 1A-8.

Figure 9:
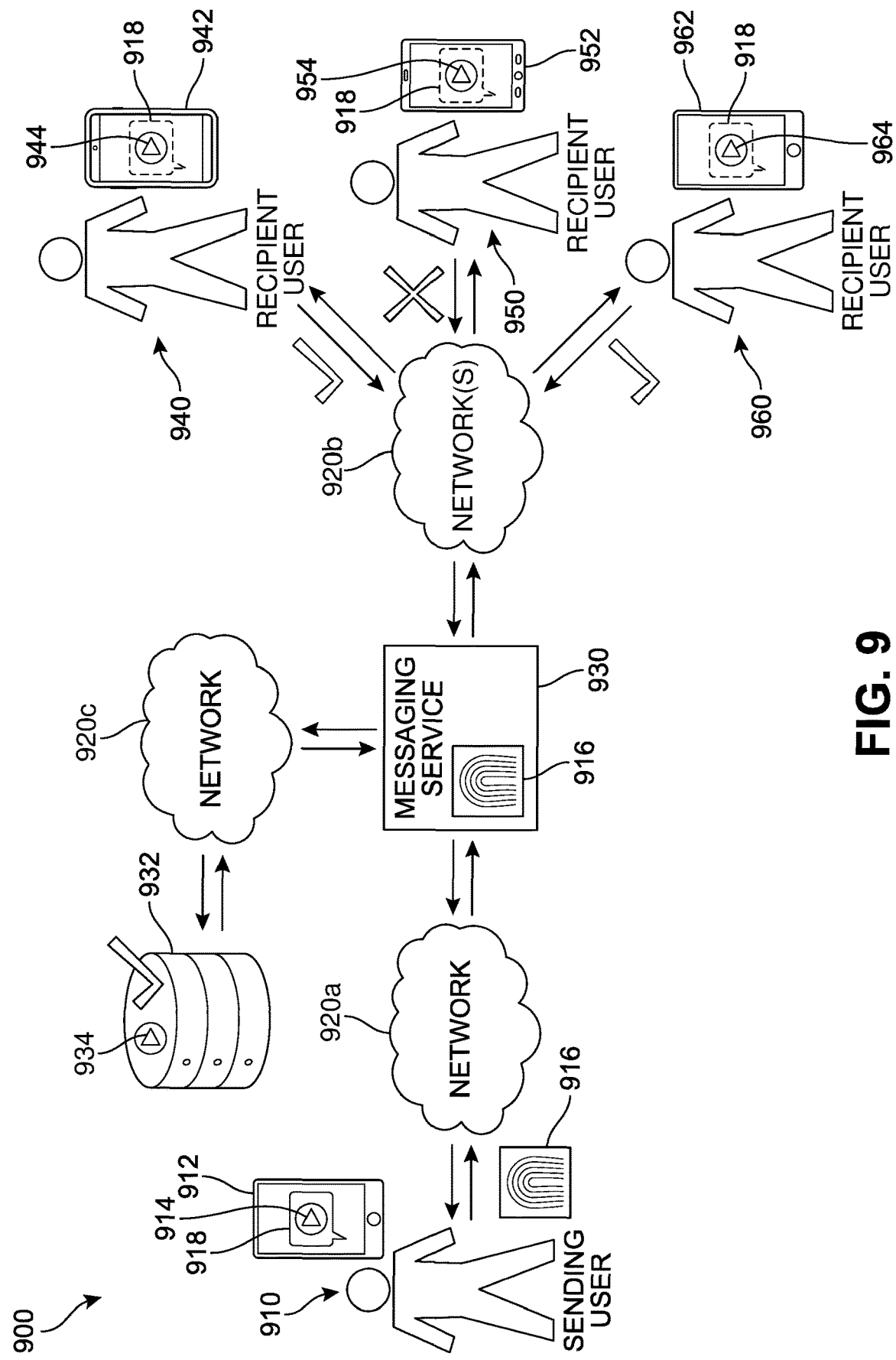
FIGS. 9, 10, 11, and 12 illustrate examples of a first system architecture in which an intermediary messaging service facilitates the message management process, including avoiding transmissions of message attachments from sending end-user devices to the intermediary messaging service in appropriate situations.

In FIG. 9, a sending end-user 910 is shown submitting, via a first end-user device 912, a request for a first message 918 and an indicated associated message attachment 914 to be sent to a first recipient body 900 that corresponds to a first receiving user 940, a second receiving user 950, and a third receiving user 960. As the request is conveyed via a network 920a to a messaging service 930, it can be understood that rather than transmitting the bulk data for the message attachment 914, a fingerprint 916 can be generated at the first device 912 and conveyed via the network 920a to the messaging service 930 instead. In other words, the message attachment 914 is not itself transmitted, at least initially, from the first end-user device 912 to the messaging service 930. Once the fingerprint 916 is received or otherwise obtained by the messaging service 930, a determination can be made, with reference to a fingerprint directory and attachment storage module ("storage module") 932.

In some implementations, the storage module 932 may include a fingerprint record that matches the fingerprint 916, and as a result determine that the messaging service 930 has previously received or obtained this particular attachment content. This process can occur for each targeted recipient user. For purposes of this example, such a process occurs three times. In this case, as symbolized by the "X" and checkmark symbols, neither first receiving user 940 nor third receiving user 960 are determined to have received the message attachment 914 previously, while for the second receiving user 950 the message attachment 914 is deemed redundant. This paradigm is presented for purposes of illustration only, and in other implementations, the message attachment can be deemed redundant for all users, or for none of the users, or another ratio not shown in FIG. 9. Thus, the message attachment 914 need only be conveyed to two of the three receiving users, reducing the amount of data that must be communicated via a network 920b (which may be the same as or differ from network 920a). in some implementations, the second receiving user 950 can be optionally presented with a notification 954 which can allow the second receiving user 950 to view information about the excluded or redundant message attachment, and/or to request the download of the message attachment irrespective of its redundant designation.

In different implementations, the messaging service 930 may be further configured to access the content corresponding to the message attachment 914 without further reference to or communication with the first device 912. This can occur when the messaging service 930 is itself able to provide or otherwise obtain the message attachment 914, as symbolized by a checkmark by storage module 932. As an example, the storage module 932 can include or access a plurality of data files or objects for one or more message attachments that have been sent using the messaging service 930. The messaging service 930 can be configured to obtain the content for message attachment 914 and provide the content to the designated receiving users. In such cases, the transfer of data that occurs between the sending user and the receiving users can be significantly reduced, as network 920a need not upload or otherwise receive the message attachment from the sending user. The network 920a instead needs only to facilitate the transfer of the fingerprint (and other message content such as textual content) from the sending user 910, which is generally of a significantly smaller size than any message attachment(s).

Figure 10:
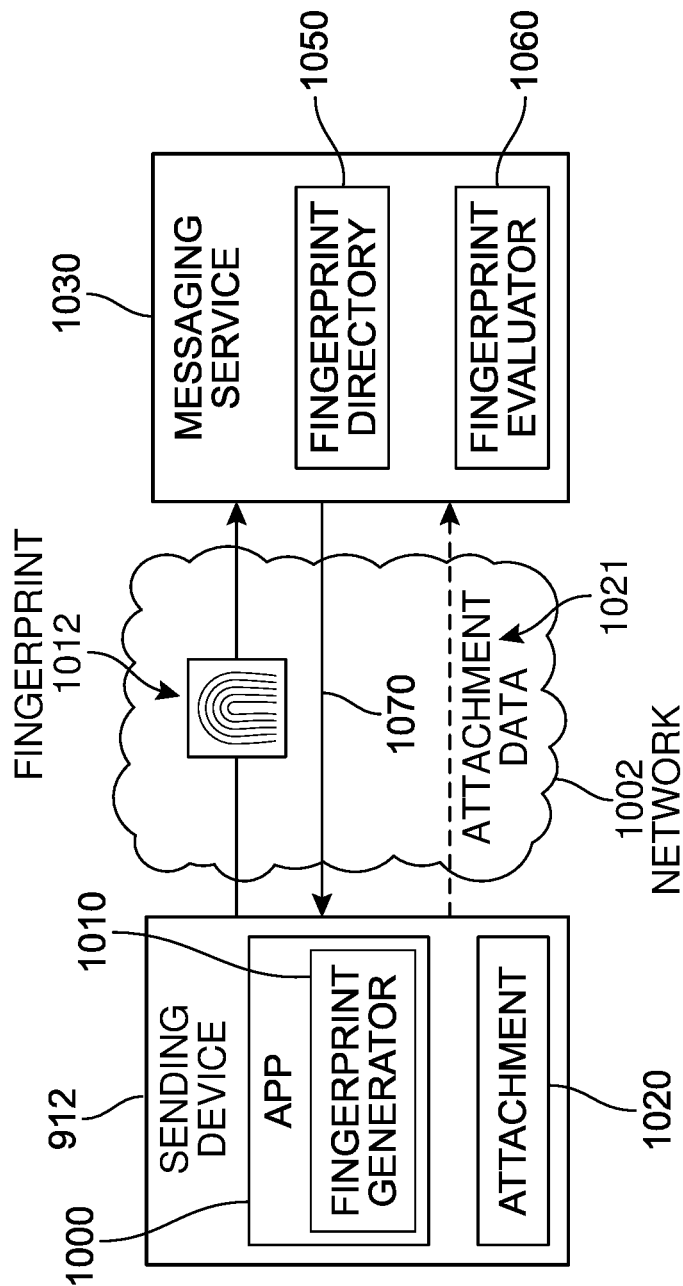
Figure 11:
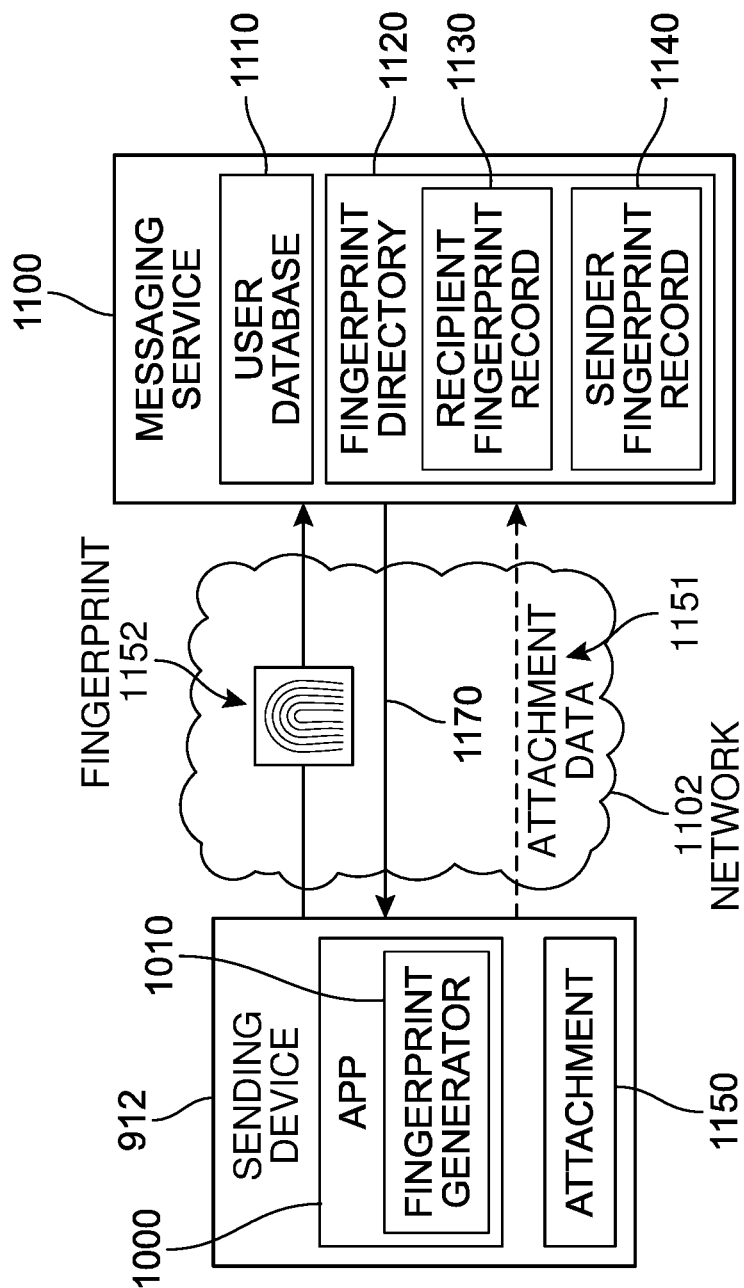
Figure 12:
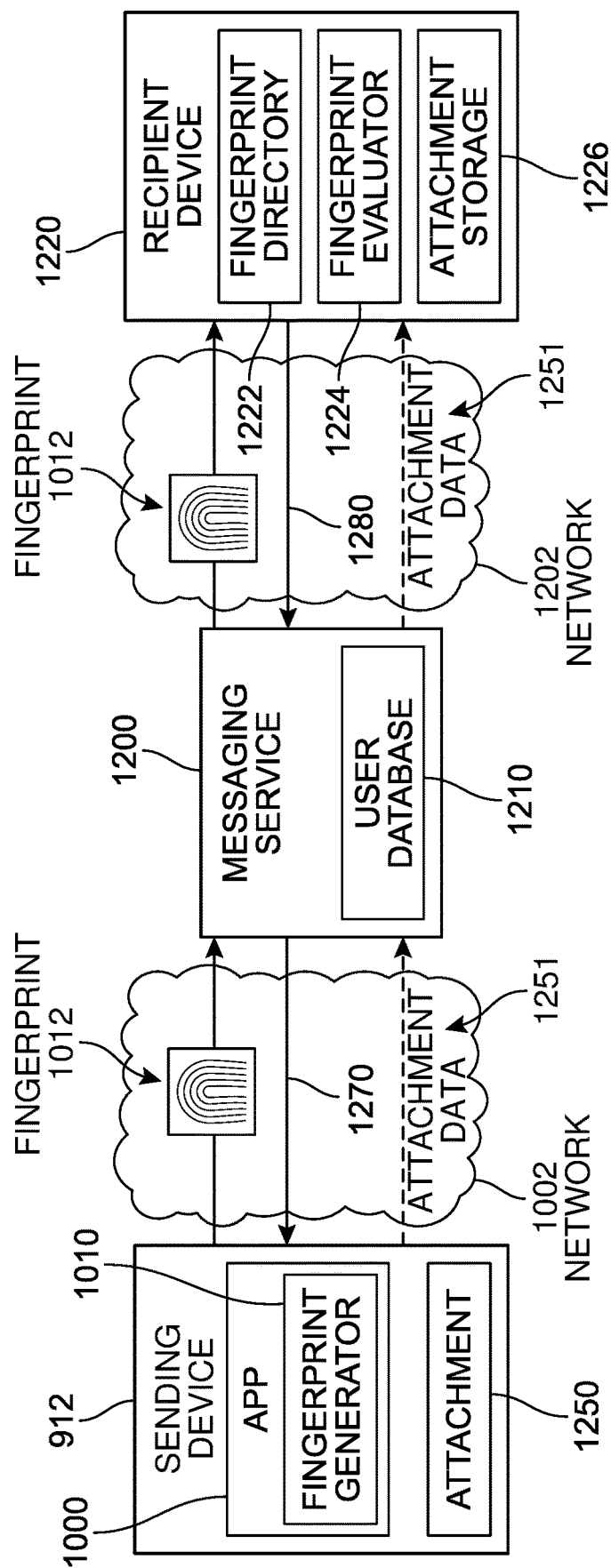

FIGS. 10-12 describe additional implementations of this process and system.

Referring to FIG. 10, sending user 910, via the first device 912, selects an attachment 1020 to send to a receiving user (as part of a larger or primary message). The sending user 910 accesses his or her client application 1000 for messaging, which registers the sender's request and generates a fingerprint 1012 for the selected attachment 1020. The fingerprint 1012 is sent via the network to a messaging service 1030. Once the messaging service 1030 receives the fingerprint 1012, the fingerprint 1012 may be evaluated by a fingerprint evaluator 1060, which can make reference to a fingerprint directory 1050. If the fingerprint evaluator 1060 determines that the messaging service 1030 has no record of the attachment 1020, it may submit a request 1070 to the client application 1000 for the full data content of the attachment 1020. The client application 1000 can then transmit the attachment 1020 to the messaging service 1030 which may update its directory accordingly. On the other hand, if the fingerprint evaluator 1060 determines that the messaging service 1030 does include a record of the data content for attachment 1020, no further data need be 'pulled' or requested from the sending user 910, as the attachment is available (for example, via an external cache) to the messaging service 1030 without requiring any further use or expenditure of network resources.

In FIG. 11, another implementation of this type of process is shown. In this case, the sending user 910, via the first device 912, again selects an attachment 1150 to send to a receiving user (as part of a larger or primary message). The sending user 910 accesses his or her client application 1000 for messaging, which registers the sender's request and generates a fingerprint 1152 for the selected attachment 1150. The fingerprint 1152 is sent via the network to a messaging service 1100. In some implementations, once the messaging service 1100 receives the fingerprint 1152, the fingerprint 1152 may be evaluated in the context of some or all of the messaging history for the specified (target) receiving user and/or the sending user. For example, a determination of the receiving user's identity may be established with reference to a user database 1110 for the messaging service 1100. The messaging service 1100 may then access portions of a fingerprint directory 1120 specific to a usage history of the receiving user. In such implementations, the fingerprint 1152 can be compared directly to fingerprint records associated with attachments that the receiving user has previously received (recipient fingerprint record 1130) and/or with attachments that the receiving user has previously requested be sent to other users (sender fingerprint record 1140) in order to determine whether the attachment is redundant for this particular receiving user. If the messaging service 1100 determines that the receiving user account is not associated with any record of the attachment 1150, it may submit a request 1170 to the client application 1000 for the full data content of the attachment 1150. The client application 1000 can then transmit the attachment 1150 to the messaging service 1000 which may update its database for the receiving user accordingly. On the other hand, if the messaging service 1030 does include a record of the data content for attachment 1150, no further data need be 'pulled' or requested from the sending user 910, as the attachment data 1151 is redundant and its content will not 'pushed' or otherwise be transmitted via network 1102 to the receiving user (unless the receiving user requests a new copy of the redundant attachment).

In FIG. 12, an additional implementation is illustrated whereby the sending user 910, via the first device 912, again selects an attachment 1250 to send to a receiving user (as part of a larger or primary message). The sending user 910 accesses his or her client application 1000 for messaging, which registers the sender's request and generates a fingerprint 1252 for the selected attachment 1250. The fingerprint 1252 is sent via the network to a messaging service 1200. In some implementations, once the messaging service 1200 receives the fingerprint 1252, the fingerprint 1252 may be evaluated in the context of some or all of the messaging history for the specified (target) receiving user and/or the sending user by reference to the receiving user's own device.

For example, a determination of the receiving user's identity may be established with reference to a user database 1210 for the messaging service 1200 and/or a connection to the receiving user's device can be initiated. The messaging service 1200 may in some implementations submit a request (along with the fingerprint 1252) to recipient end-user device 1220 to determine whether an attachment corresponding to the fingerprint 1252 has been previously received or sent by the receiving user, via access to a fingerprint directory 1222 included in the recipient end-user device 1220. In different implementations, a fingerprint evaluator 1224 on the recipient device 1220 can determine if the fingerprint 1252 matches any fingerprints already included in the fingerprint directory 1222. If no match is found, the recipient end-user device 1220 may transmit an indication 1280 to the messaging service 1200 the attachment is not redundant for the recipient end-user device 1220 and/or the receiving user. The messaging service 1200 can send a request 1270 to the client application 1000 for the full data content of the attachment 1250. The client application 1000 can then obtain and transmit the attachment 1250 to the recipient device 1220 via the messaging service 1200. In addition, the recipient device 1220 can update its fingerprint directory accordingly with the fingerprint 1252 for the attachment 1250. If the fingerprint evaluator 1224 instead determines that the receiving user has previously been sent, has sent, or otherwise accessed an attachment corresponding to fingerprint 1252, the attachment 1250 need not be transmitted by the first device 912 or the messaging service 1200 in association with sending the message to the recipient device 1220 (although this may not be true for other recipient devices for this message), as the attachment is available (for example, via an attachment storage 1226) to the receiving user, or otherwise not needed, without any further use or expenditure of network resources.

It is noted that although some examples in FIGS. 1A-12 discuss handling of a single message attachment associated with a message, in some examples a message may have multiple associated message attachments. In such examples, the described techniques may result in different handling of message attachments associated with a same message. For example, an MCMS may determine for a message that a first transmission via a first network of a first attachment associated with the message will be avoided, while also determining for the message that that a second transmission via the first network of a second attachment associated with the message will occur.

Referring next to the sequence of FIGS. 13A-14C, a second system architecture is described whereby a message processing system 1306 determines whether a value 1304 (which may be referred to as a "property value") of a property (for example, a descriptive property of an attachment 1316 and/or a property of an operating context of the message processing system) satisfies a condition 1302 associated with the property 1304 to selectively determine whether a network transmission 1336 via one or more network(s) 1330 for the attachment 1316 and/or an associated message 1314 will include the attachment data 1317, or instead the transmission 1336 will omit the attachment data 1317 and include the fingerprint 1338 for the attachment 1316 (which may be used in connection with the various fingerprint-based techniques described herein). As an example, a value 1318 of a descriptive property (which may be referred to as a "descriptive property value") of the attachment 1316 can be evaluated in order to verify whether the attachment 1316 should be the subject of a fingerprinting process or instead be transmitted via the network(s) 1330, irrespective of any potential redundancy of the attachment 1316 (for example, due to an attachment previously transmitted to a recipient device). The term "message processing system" refers to a computing device configured to transmit and receive messages and associated message attachments via one or more data communication networks according to a messaging protocol, and in various examples include end-user devices (including sending devices and/or recipient devices) and intermediary messaging services. In some implementations, some or all of the features described in connection with FIGS. 13A-14C may be performed in combination with any of the features discussed in connection with FIGS. 1A-12.

Examples of descriptive properties for attachments include, but are not limited to, content type (for example, multi-media content such as videos, presentations, or animations, other media or media-rich content such as images, audio, or graphics, specific types of documents, specific content formats, etc.) and/or attachment data size. Examples of operating context properties for message processing systems include, but are not limited to, a current time of day, a current day of a week, an amount of data bandwidth used for a period of time (for example, with respect to a daily or monthly period), an amount of data bandwidth remaining for a period of time (for example, with respect to a daily or monthly period), network speed, and/or a network connectivity type (for example, metered, unmetered, Wi-Fi, and/or cellular). Examples of conditions include, but are not limited to, whether a quantity (for example, attachment data size or network speed) meets a threshold value (for example, attachment data may be transmitted for smaller attachments), or whether a value corresponds to a specified value, values, or range of values.

Figure 13A:
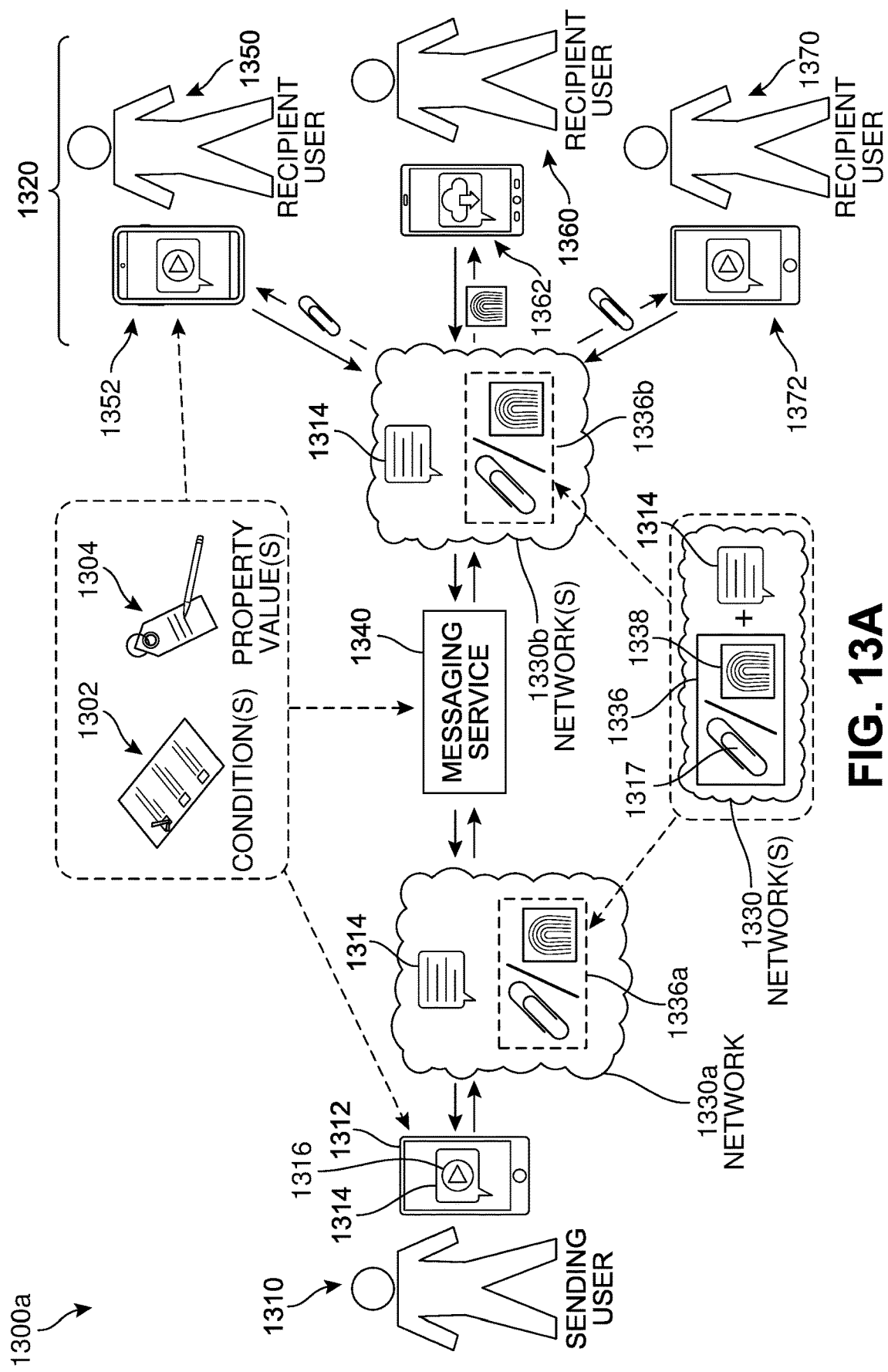
FIGS. 13A, 13B, 14A, 14B, and 14C illustrate examples of a second system architecture in which a message processing system determines whether a value of a property (for example, a descriptive property of an attachment and/or a property of an operating context of the message processing system) satisfies a condition for the property to determine whether the attachment or a fingerprint for the attachment is transmitted via a network.

FIG. 13A illustrates an example of a "mediated" system 1300*a* implementing the second system architecture, in which an intermediary is used to manage sending and transmission of messages and associated attachments between users. In the system 1300*a*, a first message processing system (for example, a sending end-user device 1312, a messaging service 1340, and/or one or more of recipient end-user devices 1352, 1362, and/or 1372) is configured to help manage transmission of message attachments based on evaluations of whether condition(s) 1302 are satisfied by corresponding property value(s) 1304. In FIG. 13A, a sending user 1310 is shown requesting, using the sending end-user device 1312, that a message 1314 and an associated message attachment 1316 be sent by the messaging service 1340 to a recipient body 1320 corresponding to recipient users 1350, 1360, and 1370 and their respective recipient end-user devices 1352, 1362, and 1372. In association with the message 1314 being sent, the first message processing system obtains one or more property value(s) 1304 and evaluates whether one or more conditions(s) 1302 are satisfied by the property value(s) 1304.

Based on the evaluation, the first message processing system controls whether, in association with the sending of the message 1314, a network transmission 1336 for the attachment 1316 and/or the message 1314 via one or more network(s) 1330 will include the attachment data 1317 or instead the transmission 1336 will omit the attachment data 1317 and include the fingerprint 1338 for the attachment 1316. In some examples, the affected network transmission 1336 is for a first network 1330*a* that conveys data between the sending device 1312 and the messaging service 1340, as shown by a first network transmission 1336*a*; this might occur in an example in which the sending device 1312 or the messaging service 1340 operates as the first message processing system. In some examples, the affected network transmission 1336 is for a second network(s) 1330*b* that conveys data between the messaging service 1340 and the receiving devices 1350, 1360, and/or 1370, as shown by a second network transmission 1336*b*; this might occur in an example in which the messaging service 1340 or one of the receiving devices 1350, 1360, or 1370 operates as the first message processing system.

Figure 13B:
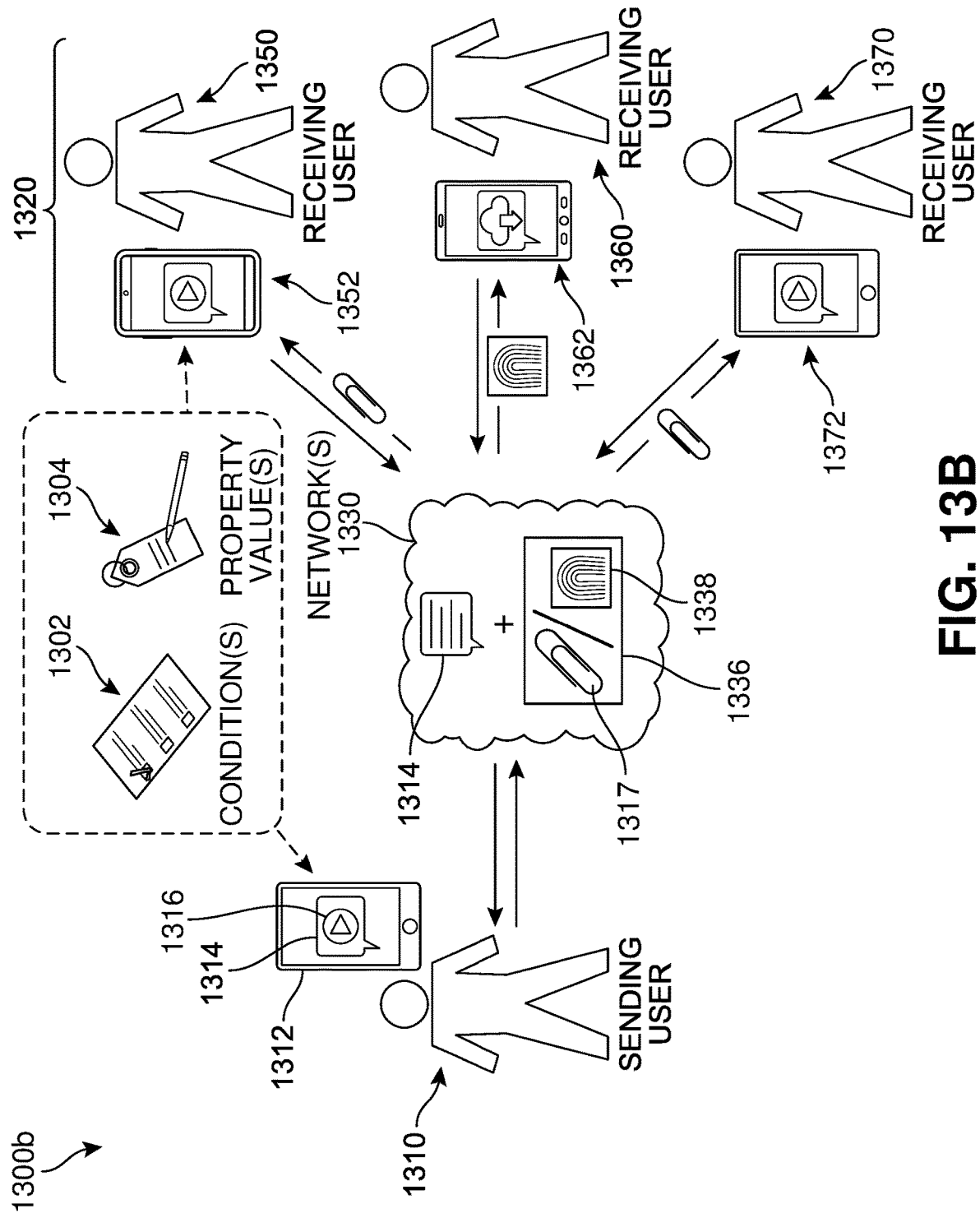

FIG. 13B illustrates an alternative example of an "unmediated" system 1300*b* implementing the second system architecture, in which end-user devices are configured to transmit and receive message attachments directly between end-user devices without passing through an intermediary messaging service. In the system 1300*b*, a first message processing system (for example, a sending end-user device 1312 and/or one or more of recipient end-user devices 1352, 1362, and/or 1372) is configured to evaluate whether condition(s) 1302 are satisfied by corresponding property value(s) 1304 and manage transmissions of message attachments accordingly. In FIG. 13B, a sending user 1310 is sending, using the sending end-user device 1312, a message 1314 and an associated message attachment 1316 to a recipient body 1320 corresponding to recipient users 1350, 1360, and 1370 and their respective recipient end-user devices 1352, 1362, and 1372. In association with the message 1314 being sent, the first message processing system obtains one or more property value(s) 1304 and evaluates whether one or more conditions(s) 1302 are satisfied by the property value(s) 1304. Based on the evaluation, the first message processing system controls whether, in association with the sending of the message 1314, a network transmission 1336 for the message attachment 1316 via one or more network(s) 1330 includes the attachment 1316 as bulk data or just a fingerprint 1338 for the attachment 1316.

Figure 14A:
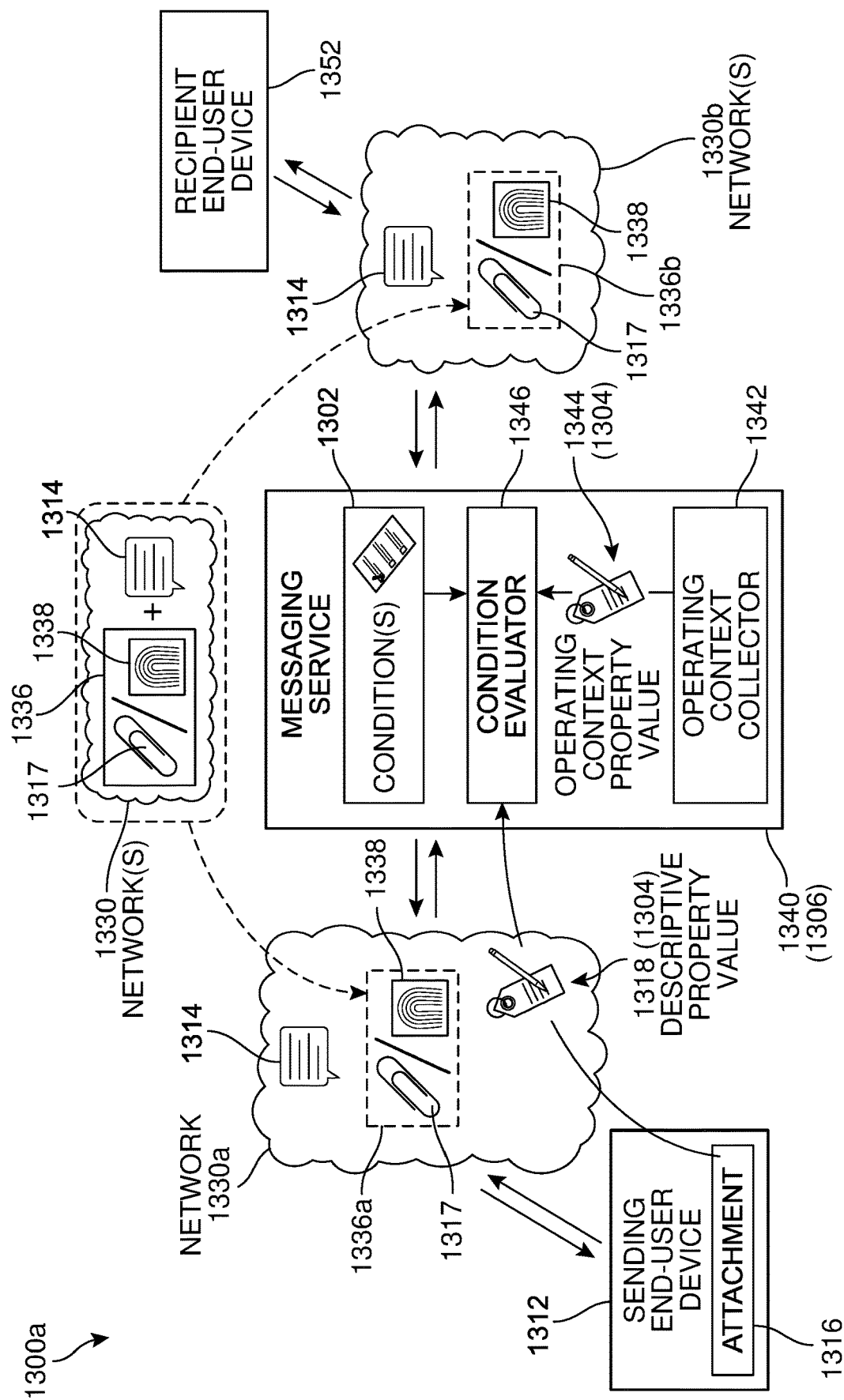

FIG. 14A illustrates an example in which the messaging service 1340 operates as the first message processing system 1306 described in connection with FIG. 13A. In FIG. 14A, the sending end-user device 1312 requests that the message 1314 and its associated message attachment 1316 be sent by the messaging service 1340 to a recipient body (for example, the recipient body 1320) corresponding to the recipient end-user device 1352. In some implementations, the messaging service 1340 is configured to store the condition(s) 1302. The messaging service 1340 includes a condition evaluator 1346 configured to obtain one or more of the condition(s) 1302, obtain one or more of the property value(s) 1304, and determine whether one or more of the condition(s) 1302 is satisfied by the obtained property value(s) 1304.

The property value(s) 1304 evaluated in association with the sending of the message 1314 may include one or more descriptive property value(s) 1318 provided by the sending device 1312 via the network 1330*a* and/or one or more operating context property value(s) 1344 provided by an operating context collector 1342 included in the messaging service 1340. In response to the condition evaluator 1346 determining whether a condition 1302 is satisfied by the property value(s) 1304, the messaging service 1340 determines whether a network transmission 1336 via network(s) 1330 for the attachment 1316 and/or the message 1314 will include the attachment data 1317 or instead the transmission 1336 will omit the attachment data 1317 and include the fingerprint 1338 for the attachment 1316. In some examples, in response to a condition 1302 being satisfied or not satisfied, the determination whether the transmission includes the attachment data 1317 or the fingerprint 1338 may override otherwise "default" behavior that would occur if the condition 1302 were not involved. In FIG. 14A, the affected network transmission 1336 may be the first network transmission 1336*a* via the first network 1330*a* between the sending device 1312 and the messaging service 1340, and/or may be the second network transmission 1336*b* via the second network 1330*b* between the messaging service 1340 and the recipient device 1352. In some implementations, settings for the messaging service 1340 can change condition(s) 1302 or other items to better accommodate particular data transfer preferences.

Figure 14B:
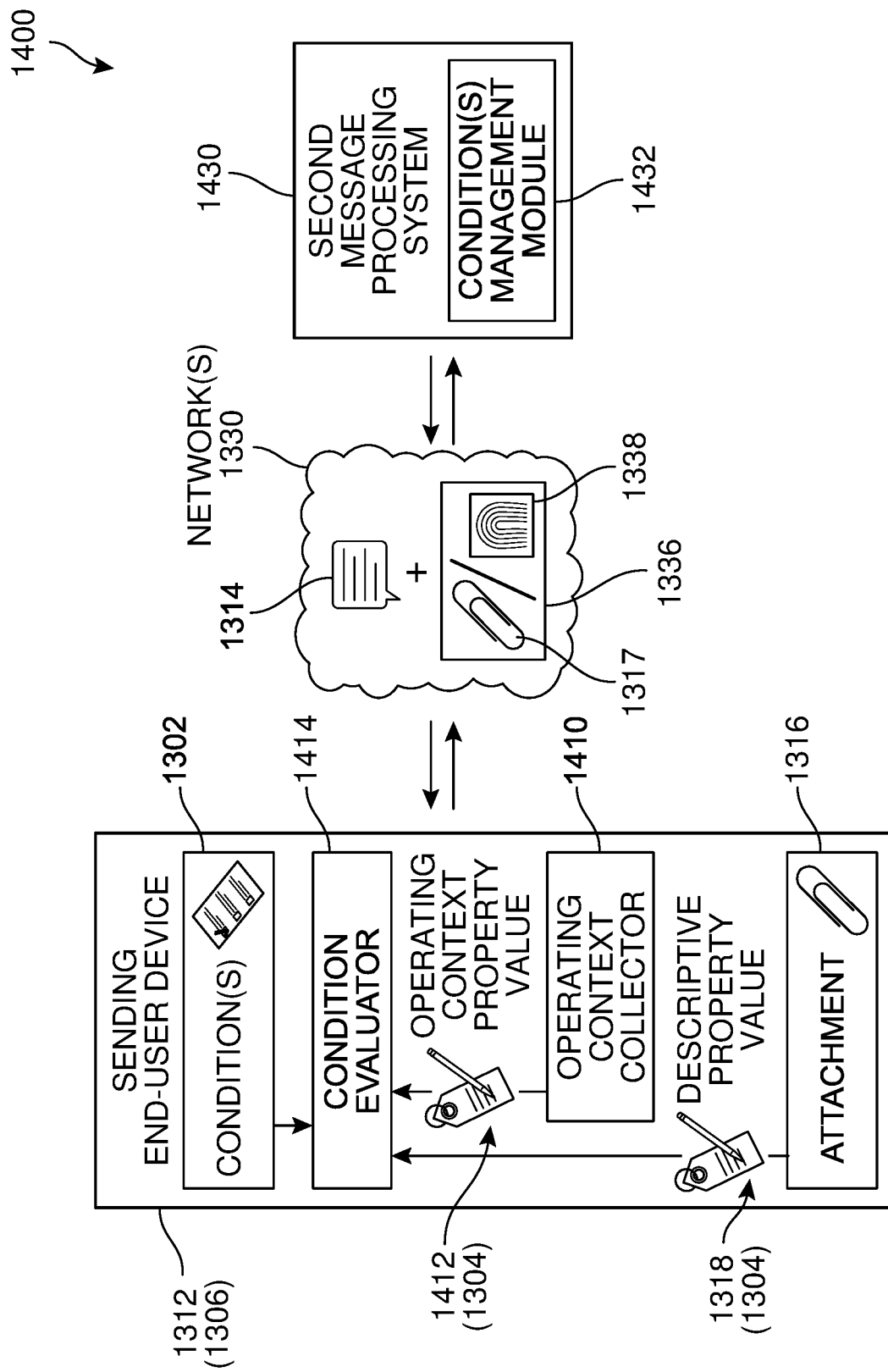

FIG. 14B illustrates an example system 1400 in which the sending end-user device 1312 operates as the first message processing system 1306 described in connection with FIG. 13A (for an mediated system) and/or FIG. 13B (for an unmediated system). It is understood that other end-user devices, including any of the receiving end-user devices 1352, 1362, and/or 1372, may be similarly configured. The example of FIG. 14B can be understood to either supplement the example of FIG. 14A (i.e., work in collaboration with the condition and evaluation of the messaging service 1340) or can represent an alternate approach in establishing the selective fingerprinting process.

In FIG. 14B, the sending end-user device 1312 requests that the message 1314 and its associated message attachment 1316 be sent to a recipient body (for example, the recipient body 1320) and, as a result, a network transmission 1336 is transmitted via network(s) 1330 to a second message processing system 1430. The second message processing system 1430 may be, for example, the messaging service 1340 and/or recipient end-user devices 1352, 1362, and/or 1372 (for example, according to whether the system 1400 is mediated, as shown in FIGS. 13A and 14A, or unmediated, as shown in FIG. 13B). In some implementations, the sending end-user device 1312 is configured to store the condition(s) 1302. The sending end-user device 1312 includes a condition evaluator 1414 that operates much as described for the condition evaluator 1346 in FIG. 14A, and is configured to obtain one or more of the condition(s) 1302, obtain one or more of the property value(s) 1304, and determine whether one or more of the condition(s) 1302 is satisfied by the obtained property value(s) 1304.

The property value(s) 1304 evaluated in association with the sending of the message 1314 may include one or more descriptive property value(s) 1318 for the attachment 1316 and/or one or more operating context property value(s) 1412 provided by an operating context collector 1410 included in the sending end-user device 1312. In response to the condition evaluator 1410 determining whether a condition 1302 is satisfied by the property value(s) 1304, the sending end-user device 1312 determines whether the network transmission 1336 via network(s) 1330 for the attachment 1316 and/or the message 1314 will include the attachment data 1317 or instead the transmission 1336 will omit the attachment data 1317 and include the fingerprint 1338 for the attachment 1316. In some examples, in response to a condition 1302 being satisfied or not satisfied, the determination whether the transmission includes the attachment data 1317 or the fingerprint 1338 may override otherwise "default" behavior that would occur if the condition 1302 were not involved. In some implementations, condition(s) 1302 for the sending end-user device 1312 under which attachment data 1317 or fingerprint 1338 are selected can also be managed and/or adjusted by the second message processing system 1430. In some implementations, the second message processing system 1430 includes a condition(s) management module 1432 configured to identify changes to the condition(s) 1302 and transmit the changes to the sending end-user device 1312 (for example, via the network(s) 1330), and the sending end-user device 1312 is configured to change its condition(s) 1302 according to the received changes. In some example, the condition(s) management module 1432 is configured to automatically identify the changes; for example, the messaging service 1340 may be configured to determine when a significant change in network conditions has occurred and automatically communicate changes to end-user devices to adjust their transmission behaviors accordingly. In some implementations, the sending user can modify settings to better accommodate their own data transfer preferences.

Figure 14C:
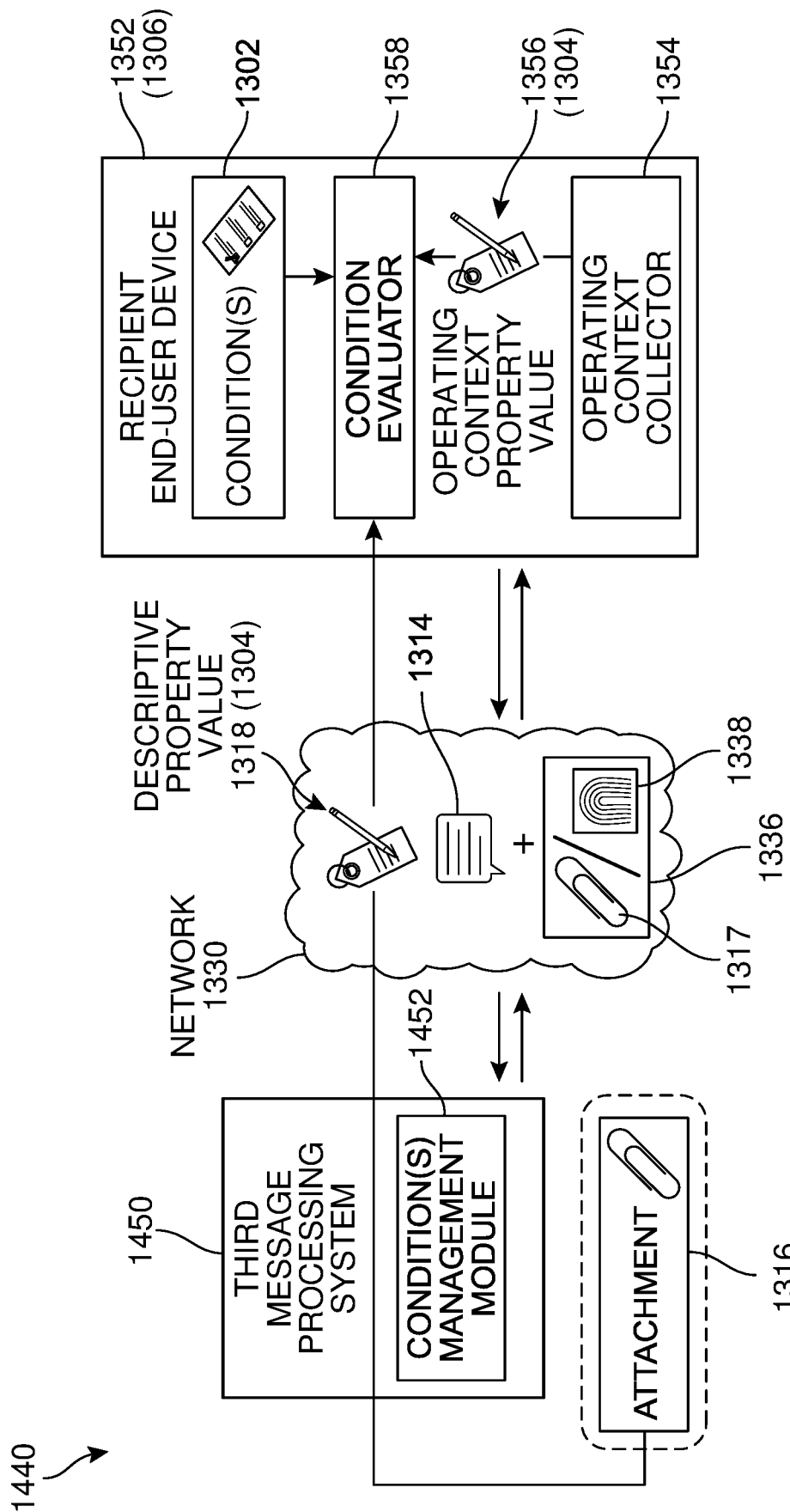

FIG. 14C illustrates an example in which the recipient end-user device 1352 operates as the first message processing system 1306 described in connection with FIG. 13A (for an mediated system) and/or FIG. 13B (for an unmediated system). It is understood that other end-user devices, including any of the sending end-user device 1312 and/or the receiving end-user devices 1362 and/or 1372, may be similarly configured. The example of FIG. 14C can be understood to either supplement the examples of FIG. 14A (i.e., work in collaboration with the condition and evaluation of the messaging service 1340) and/or FIG. 14B (i.e., work in collaboration with the condition and evaluation of the sending end-user device 1312) or can represent an alternate approach in establishing the selective fingerprinting process.

In FIG. 14C, the recipient end-user device 1352 corresponds to a recipient body (for example, the recipient body 1320) for the message 1314 and its associated message attachment 1316 and, as a result, a network transmission 1336 is received via network(s) 1330 from a third message processing system 1450. The third message processing system 1450 may be, for example, the messaging service 1340 and/or the sending end-user device 1312 (for example, according to whether the system 1400 is mediated, as shown in FIGS. 13A and 14A, or unmediated, as shown in FIG. 13B). In some implementations, the recipient end-user device 1352 is configured to store the condition(s) 1302. The recipient end-user device 1352 includes a condition evaluator 1358 that operates much as described for the condition evaluators 1346 and/or 1414 in FIGS. 14A and 14B, and is configured to obtain one or more of the condition(s) 1302, obtain one or more of the property value(s) 1304, and determine whether one or more of the condition(s) 1302 is satisfied by the obtained property value(s) 1304.

The property value(s) 1304 evaluated in association with the recipient end-user device 1352 receiving the message 1314 may include one or more descriptive property value(s) 1318 for the attachment 1316 (received via the network(s) 1330) and/or one or more operating context property value(s) 1356 provided by an operating context collector 1354 included in the recipient end-user device 1352. In response to the condition evaluator 1358 determining whether a condition 1302 is satisfied by the property value(s) 1304, the recipient end-user device 1352 determines whether the network transmission 1336 via network(s) 1330 for the attachment 1316 and/or the message 1314 will include the attachment data 1317 or instead the transmission 1336 will omit the attachment data 1317 and include the fingerprint 1338 for the attachment 1316. In some examples, in response to a condition 1302 being satisfied or not satisfied, the determination whether the transmission includes the attachment data 1317 or the fingerprint 1338 may override otherwise "default" behavior that would occur if the condition 1302 were not involved. In some implementations, condition(s) 1302 for the recipient end-user device 1352 under which attachment data 1317 or fingerprint 1338 are selected can also be managed and/or adjusted by the third message processing system 1450. In some implementations, the third message processing system 1450 includes a condition(s) management module 1452 configured to identify changes to the condition(s) 1302 and transmit the changes to the recipient end-user device 1352 (for example, via the network(s) 1330), and the recipient end-user device 1352 is configured to change its condition(s) 1302 according to the received changes. In some example, the condition(s) management module 1452 is configured to automatically identify the changes; for example, the messaging service 1340 may be configured to determine when a significant change in network conditions has occurred and automatically communicate changes to end-user devices to adjust their transmission behaviors accordingly. In some implementations, the recipient user can modify settings to better accommodate their own data transfer preferences.

It is noted that although some examples in FIGS. 13A-14C discuss handling of a single message attachment associated with a message, in some examples a message may have multiple associated message attachments. In such examples, the described techniques may result in different handling of message attachments associated with a same message. For example, an MCMS may determine for a message that a first transmission via a first network of a first attachment associated with the message will be avoided, while also determining for the message that that a second transmission via the first network of a second attachment associated with the message will occur.

Referring next to the sequence of FIGS. 15-22, a third system architecture is described whereby end-users may be notified regarding a redundancy 'status' for a particular attachment. As an example, a first user may select an attachment to be sent to a second user, only to discover after sending the attachment that he or she had previously sent this attachment to the second user. As a result, the first user feels some level of chagrin at having made this mistake, and an unnecessary drain of device and network resources has occurred. However, the proposed systems offer users guidance and information that can reduce the likelihood of these types of occurrences. In some implementations, some or all of the features described in connection with FIGS. 15-22 may be performed in combination with any of the features discussed in connection with FIGS. 1A-14C.

Figure 15:
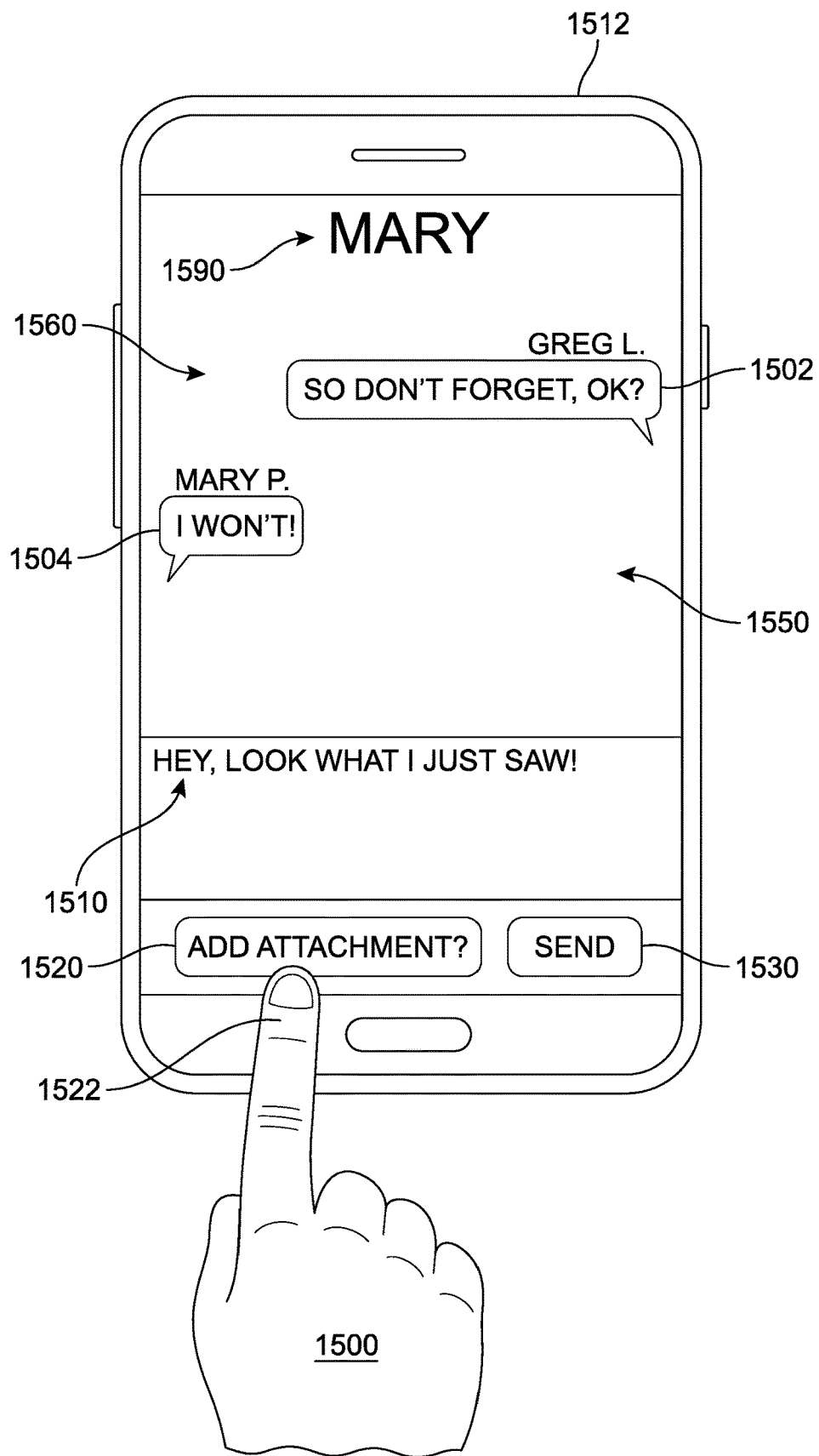
FIGS. 15, 16A, 16B, 17, 18A, 18B, 19A, 19B, 19C, 20, 21A, 21B, 21C, 21D, and 22 illustrate examples of a third system architecture in which end-users may be notified regarding a redundancy 'status' for a particular attachment.
Figure 16:
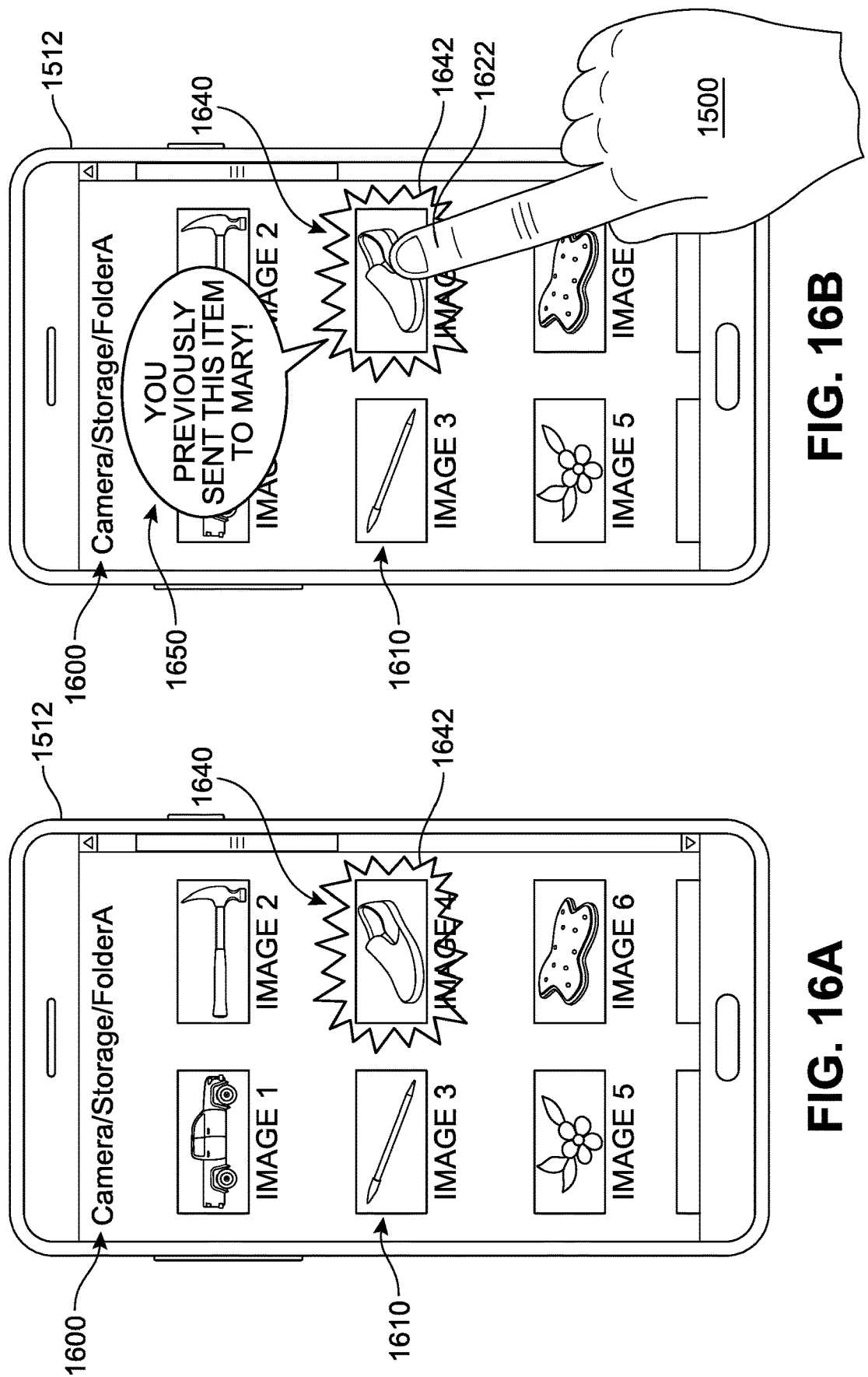

A first example is shown with reference to FIGS. 15, 16A, and 16B. A first user 1500 interacts with a messaging interface 1560 of a client application 1550 on a first device 1512 in FIG. 15. The first user 1500 can review previous messages on the messaging interface 1560, including a first message 1502 that he ("Greg L.") sent at an earlier time, as well as a second message 1504 that was received from a second user 1590 (Mary P). In the example of FIG. 15, the first user 1500 has typed or drafted a third message 1510 and is preparing to add, insert, select, or otherwise include an attachment to be sent in association with third message 1510. This is represented by a first user input 1522 (here, a touch-tap) that selects a first actuatable option 1520 for adding an attachment to the current message. Another, second actuatable option 1530 is also shown by which the first user 1500 may proceed with initiating the sending of the message.

In some implementations, the first actuatable option 1520 can, when activated, can present or otherwise offer one or more of a plurality of attachment options 1610, for example via navigation to an images folder 1600, as shown in FIGS. 16A and 16B. The plurality of attachment options 1610 can include a range of data objects, such as images, documents, videos, graphics, or other content. In different implementations, the system can include provisions for alerting a user with respect to a particular attachment option's redundancy status. Such an indicator can vary in different implementations, and can include various effects, such as blinking, changes in luminosity, superimposition of graphical elements along portions of an attachment name or other listing, flashing, animated lines, color changes, flags, graphical elements such as points or circles at each vertex and dashed or solid lines appearing along edges, a highlighting effect, boundary box, or other such visual indicators. For example, in FIG. 16A, an attachment option 1640 is associated with an indicator 1642 that substantially surrounds the attachment option 1640. In this case, the indicator 1642 is configured to allow a user to quickly recognize which (if any) options are potentially redundant for the selected recipient body (in part or in full).

In some implementations, additional information can also be provided. For example, in FIG. 16B, in response to a user selection 1622 of the attachment option 1640, a secondary alert 1650 is being presented. In some implementations, the secondary alert 1650 can be presented along with the indicator 1642, or the indicator 1642 may be removed and the secondary alert 1650 provided. As shown in FIG. 16B, the secondary alert 1650 can comprise a message or other notification that can provide supplementary information that may be helpful to the first user 1500. In this case, the secondary alert 1650 includes a message "You previously sent this to Mary!", thereby notifying the user that the selected attachment would be redundant for the targeted recipient body. While two types of notifications are shown here for purposes of illustration, it should be understood that in some implementations, there may only be a single redundancy status indicator (e.g., indicator 1642 or secondary alert 1650), or there may be more than two as shown in FIG. 16B. In other implementations, the alert or indication may take the form of a vibrotactile feedback, audio alert, or other types of indicators. It may be understood that the indicator is provided primarily as guidance for end-users, and while a user may opt to attach a different data object in response to the presentation of the indicator, another user may nevertheless continue with a selection of the redundant attachment.

Figure 17:
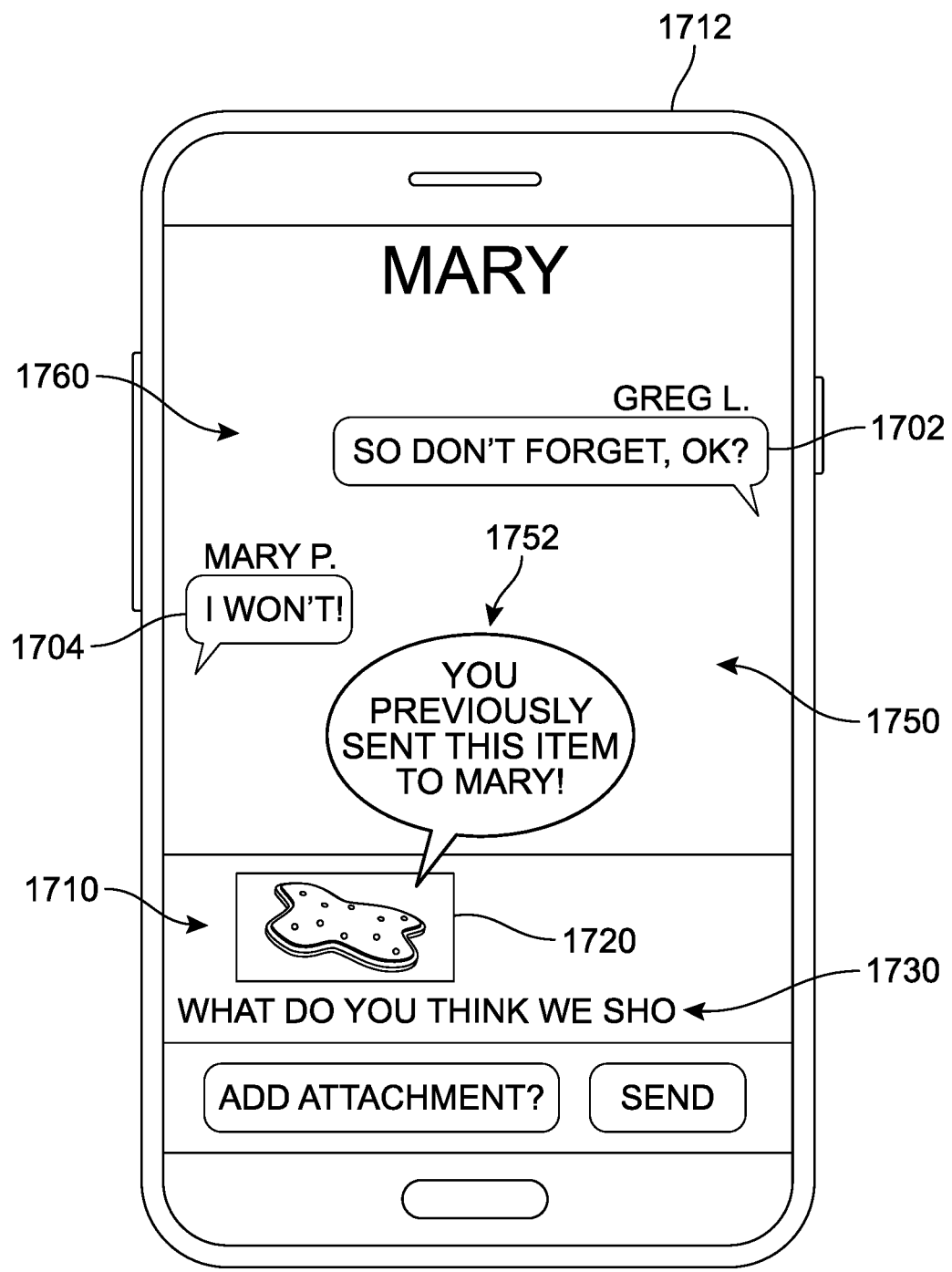

In some other implementations, the system can include provisions for providing a notification that can be alternatively or also presented on the main messaging interface (i.e., during the messaging conversation). For example, in FIG. 17, a first user interacts with a messaging interface 1760 of a client application 1750 on a first device 1712. The first user is viewing previous messages on the messaging interface 1760, including a first message 1602 that he ("Greg L.") sent at an earlier time, as well as a second message 1704 that was received from a second user (Mary P). In the example of FIG. 17, the first user has begun or initiated a third message 1710 in the same window as the conversation with Mary P., and has typed or drafted a portion of a textual content 1730. An attachment 1720 has also been selected or added to the draft third message 1710. During the preparation of the third message 1710, immediately or soon after the addition of the attachment 1720 to the message draft, the system has recognized this particular attachment as being redundant for the targeted recipient body. In response, in some implementations, the system can display an indicator or other type of notification 1752 (here including a message "You previously sent this to Mary!") to alert the user that the selected attachment would be redundant for the receiving user in this conversation.

Figure 18B:
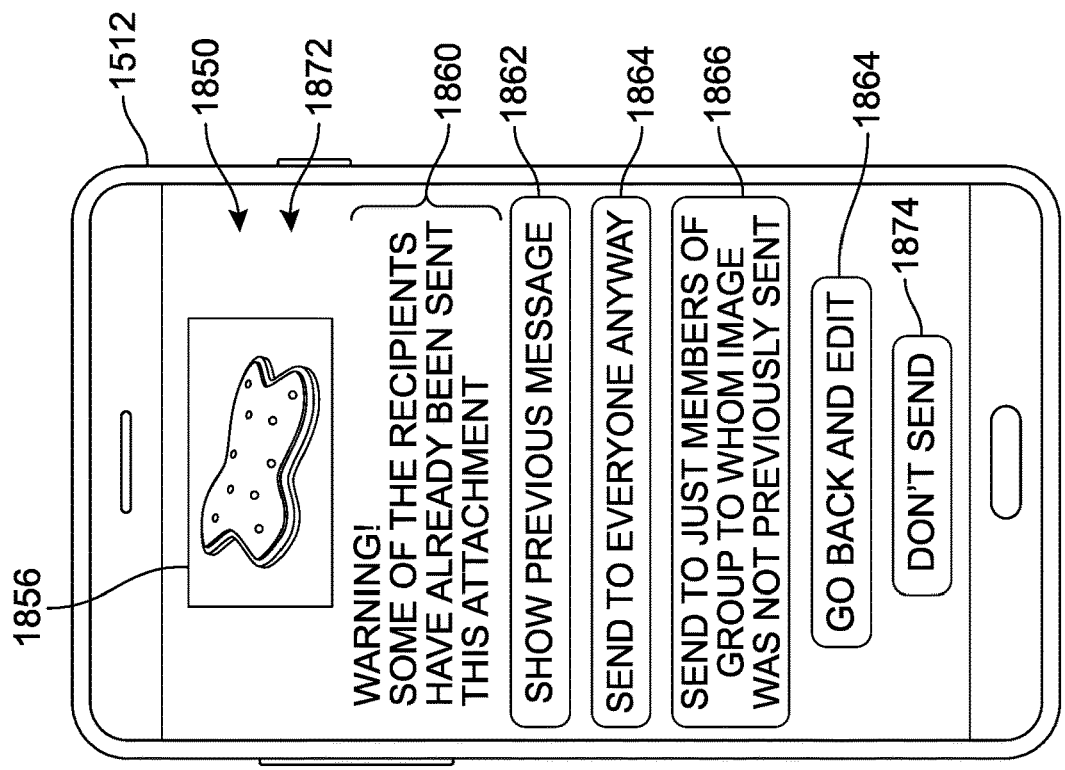
Figure 18A:
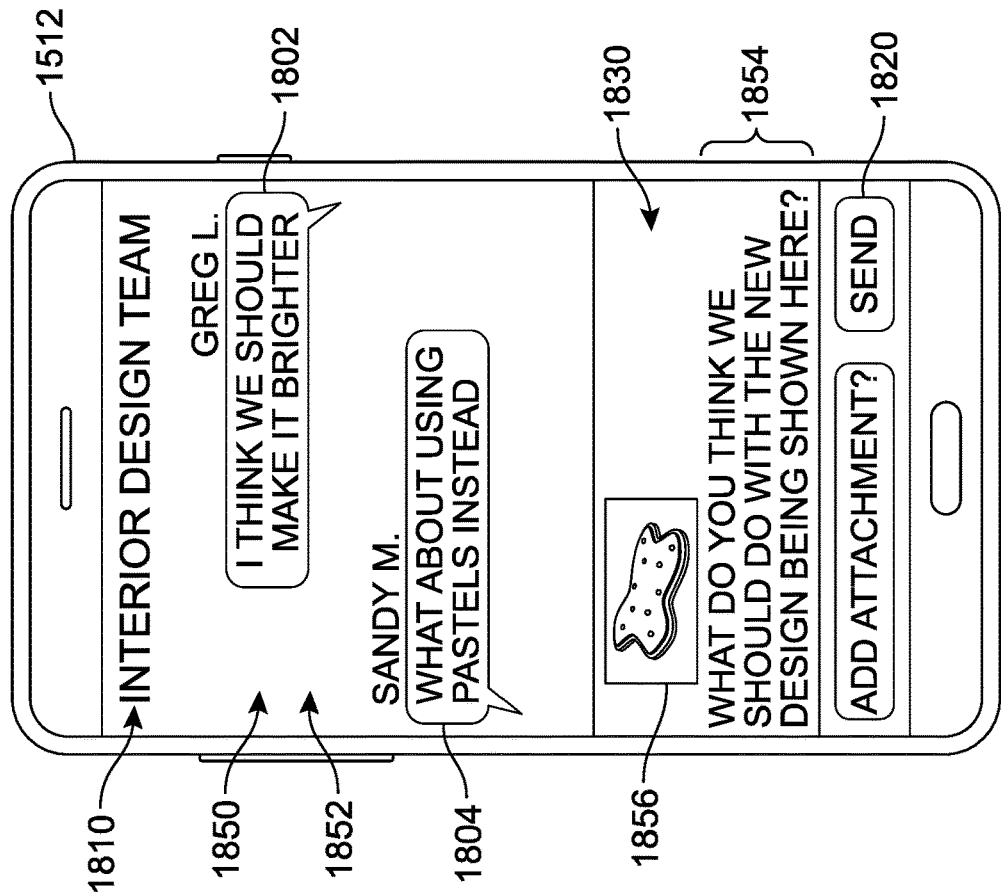

Another implementation of a redundancy notification process is illustrated with reference to FIGS. 18A and 18B. In FIG. 18A, a sending user ("Greg L.") is communicating with members of his 'Interior Design Team' group 1810 via messaging interface 1852 of a client application 1850 on device 1812. Following the sending user's previous or 'first' message 1802, an end-user Sandy M. responds with a second message 1804. In response, the sending user is preparing a response with a draft third message 1830. The third message 1830 includes textual content 1854 as well as an attachment 1856. As the sending user finalizes the message and submits a request to send it to the group 1810 (via Send option 1820), in some implementations, the system can be configured to recognize, determine, evaluate, detect, and/or identify a redundancy status for one of more of the attachments that a user has included in the message. In some implementations, as illustrated in FIG. 18B, additional information or options for one or more attachments can be automatically presented in response to a determination that the attachment 1856 is redundant for one or more users in the receiving group. This information may be shown to the user via an attachment interface 1872 of the client application 1850.

It should be understood that the options (if any), wording of options, and other information regarding the attachment that is presented to the user can vary in different implementations. For purposes of illustration, FIG. 18B shows attachment interface 1872 as including a depiction of the attachment 1856 along with a primary notification 1860 ("Warning! Some of the recipients have already been sent this attachment"). In some implementations, the user may also or alternatively be offered one or more options for responding to this notification or taking action with respect to their message. In this case, a user may select from a first option 1862 ("Show previous message") by which the occurrence(s) of this attachment in previous messages involving the sending user can be accessed, or a second option 1864 ("Send to everyone anyway") by which the sending user can request that the attachment be sent regardless of its redundancy status. In other implementations, a third option 1866 ("Send to just members of group to whom image was not previously sent") is configured to continue with transmission of this attachment (along with the third message) to only those members of the group for whom the attachment has not been previously sent. In other words, the sending user can move forward with sending the message but exclude the transmission of the attachment 1856 to members who have already received it. Further possible options can include a fourth option 1872 "Go back and edit" to allow the user to return to the messaging interface of FIG. 18A and the draft third message, and a fifth option 1874 by which a user can cancel or discontinue the third message.

Figure 19A:
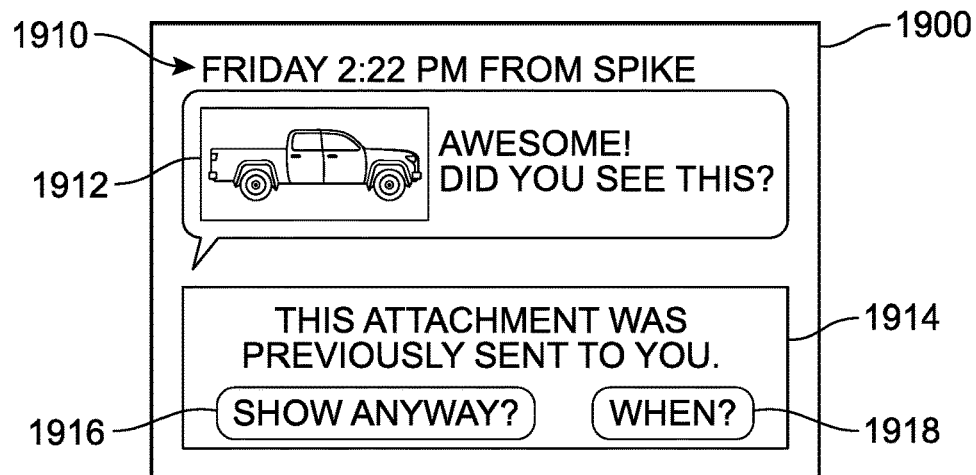

In different implementations, a receiving user may also be offered various opportunities for both receiving redundancy status information and/or taking action in response to such information. A few examples of this are presented with reference to FIGS. 19A-19C. In FIG. 19A, a messaging interface 1900 displays a message 1910 from sender Spike. The message 1910 includes an attachment 1912, as well as some textual content ("Awesome! Did you see this?"). As the receiving user initially views the incoming message, in some implementations, the attachment 1912 may be only 'minimally' visible or presented as a low-resolution or low-quality representation. In other words, the data corresponding to the first attachment 1912 has been minimized, sufficient for purposes of recognition by the receiving user. In some implementations, a full-size or complete download of the attachment can be paused or 'on hold', pending a response by the receiving user. In this case, the messaging interface 1900 informs the user via a first notification 1914 adjacent to the message 1910, "This attachment was previously sent to you". Some possible options to this notification are also provided, including a first option 1916 "Show anyway?" for requesting a download of the full-size attachment, as well as a second option 1918 "When?" for accessing additional information about this notification, such as the particular instance(s) in which the attachment 1912 was provided or sent to the receiving user (see, for example, FIG. 20).

Figure 19B:
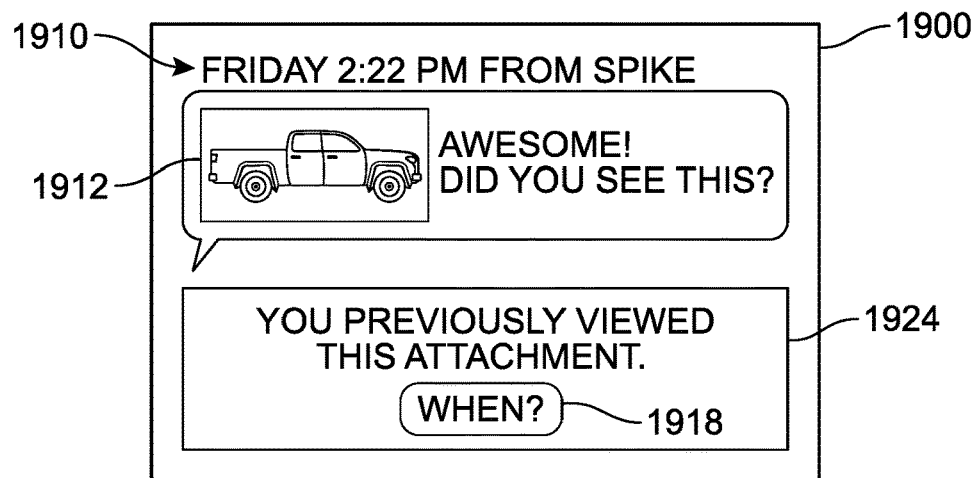

In the second example of FIG. 19B, the messaging interface 1900 again displays the message 1910 from sender Spike. The message 1910 includes attachment 1912, as well as some textual content ("Awesome! Did you see this?"). As the receiving user initially views the incoming message, in some implementations, as noted earlier, the attachment 1912 may be only 'minimally' visible or presented as a low-resolution or low-quality representation. In this case, the messaging interface 1900 informs the user via a second notification 1924 adjacent to the message 1910, "You previously viewed this attachment". A possible option to this notification are also provided, including a third option 1926 "When?" for accessing additional information about this notification, such as the particular instance(s) in which the attachment 1912 was viewed by the receiving user (see, for example, FIG. 20). In other words, a receiving user need not have 'received' the attachment previously in order for the attachment to be deemed redundant. In some implementations, the redundancy can be a result of the receiving user having previously transmitted or sent the attachment to another user, or accessed or viewed the attachment at another time—either at this device or interface, or other applications or devices associated with the receiving user account. Thus, in some implementations, the usage history of a user with respect to a particular attachment can be stored and/or accessed for determining or assessing a redundancy status of an attachment for that user, to an extent permitted by the user.

Figure 19C:
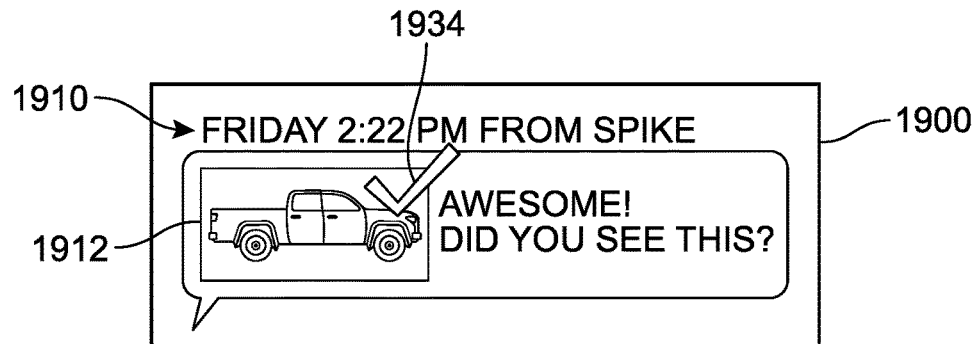

A third example is shown in FIG. 19C, where the messaging interface 1900 displays the message 1910 from sender Spike. The message 1910 includes attachment 1912, as well as some textual content ("Awesome! Did you see this?"). As the receiving user initially views the incoming message, in some implementations, as noted earlier, the attachment 1912 may be only 'minimally' visible or presented as a low-resolution or low-quality representation. In this case, the messaging interface 1900 informs the user via a third notification 1934 adjacent to the message 1910 that this attachment has been identified as redundant for the receiving user. Unlike the examples of FIGS. 19A and 19B, in this case the notification is a simple or unobtrusive symbol (here, a checkmark). The third notification 1934 allows the user to quickly appreciate the redundancy status for this attachment, with minimal distraction with respect to the overall messaging experience. In different implementations, the notification can comprise any of a wide range of symbols or visual effects, as discussed above with respect to FIG. 16A. In some implementations, the symbol can be actuatable, such that a selection of the symbol can trigger the display of additional options for interacting with this message.

Figure 20:
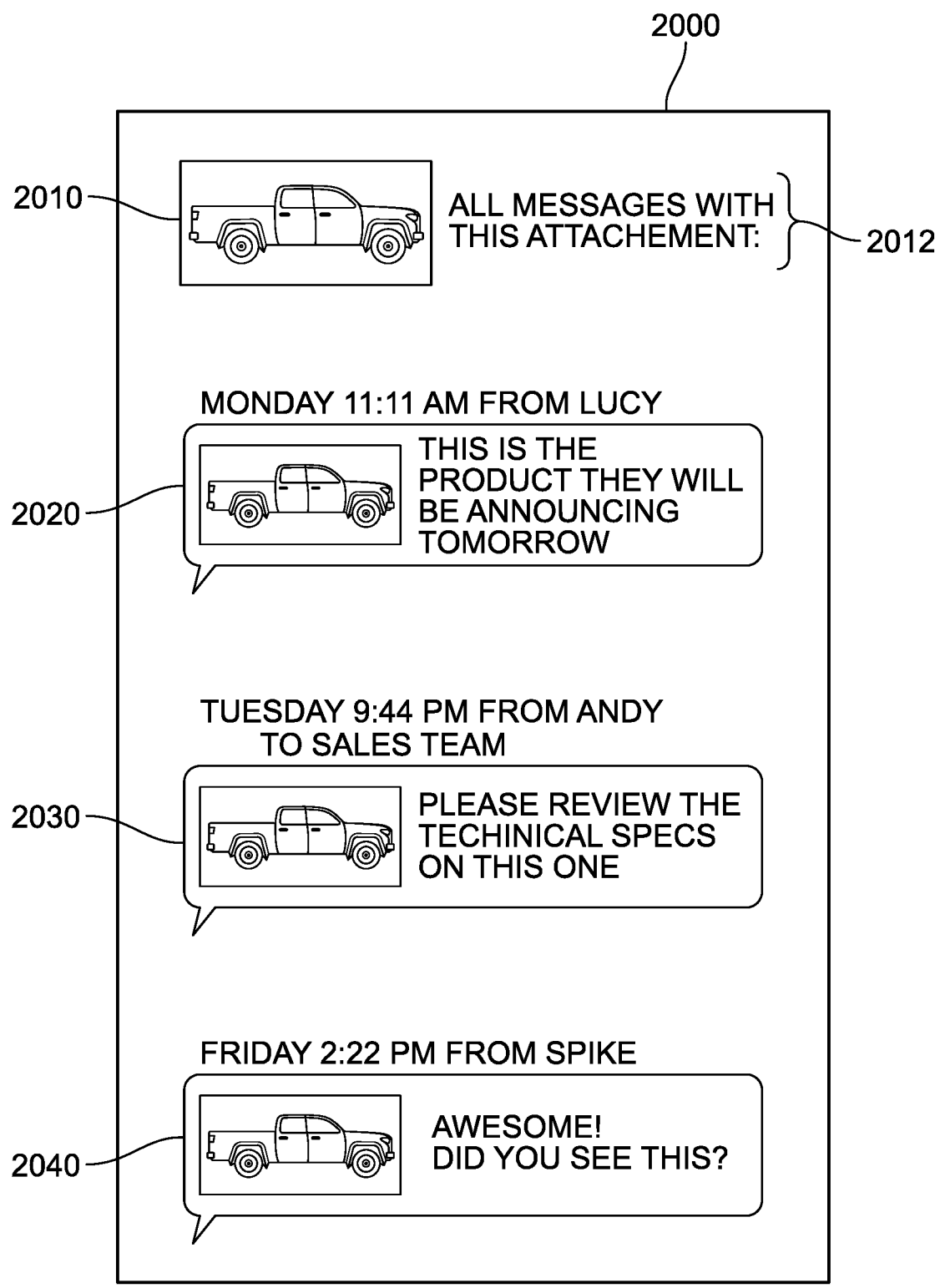

Referring now to FIG. 20, one example of a redundancy listing interface 2000 is shown. In different implementations, this type of interface can be presented to a user in response to a request or search for occurrences in which a particular attachment has been accessed or viewed. In this case, an attachment 2010 is represented, and a header message 2012 "All messages with this attachment:" informs the user that the below list identifies the one or more instances in which the attachment 2010 has been communicated with the user account. In this example, a first item 2020 includes the time and participant in the communication (Monday 11:11 AM from Lucy), as well as a copy of the message that was shared "This is the product they will be announcing tomorrow" along with the attachment 2010. A second item 2030 includes the time and participants in the communication (Tuesday 9:44 PM from Andy to Sales Team), as well as a copy of the message that was shared "Please review the technical specs on this one" with the attachment 2010. A third item 2040 also includes the time and participant in the communication (Friday 2:22 PM from Spike), as well as a copy of the message that was shared "Awesome! Did you see this?" and the attachment 2010. Thus, in some implementations, an end-user (sender or receiver) can readily access the usage history associated with a particular attachment. Such information can help guide the end-user in making better decisions with respect to data transmissions as well as reduce communication errors or misunderstandings when attachments are shared.

Figure 21A:
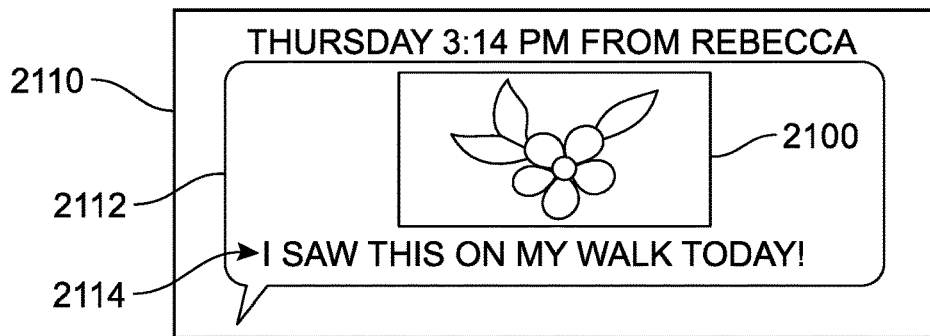
Figure 21B:
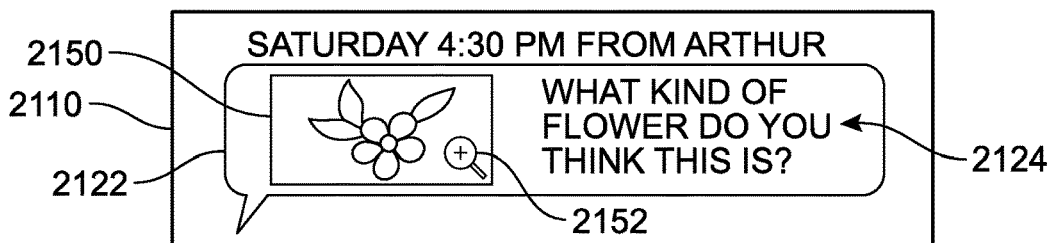
Figure 21C:
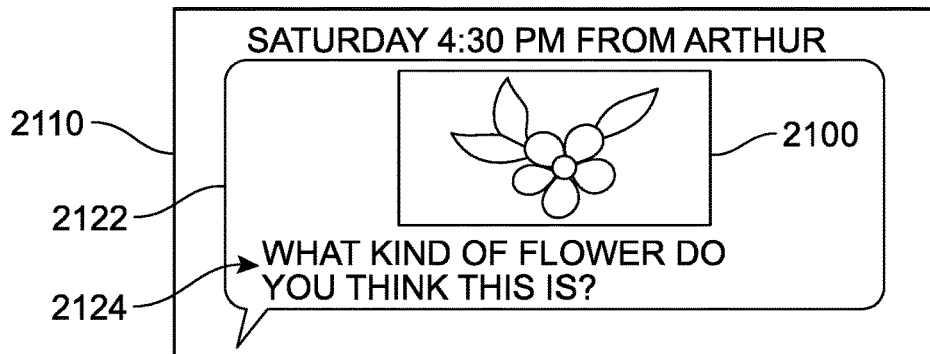

For purposes of clarity, additional examples of various user interfaces directed to notifying and/or guiding users in response to redundant attachments are illustrated in FIGS. 21A-21D. In FIG. 21A, a receiving user receives a first message 2112 from a sender Rebecca via a messaging interface 2110. The first message 2112 includes a full-size image attachment 2100, as well as textual content 2114 "I saw this on my walk today!". In this case, the attachment 2100 was determined to be a 'new' or non-redundant attachment for this user. In other words, the attachment 2100 is accessed for the first time by the first receiving user, and as a result, no redundancy-related actions are offered. In contrast, in FIG. 21B, the same receiving user receives a second message 2122 from sender Arthur via the messaging interface 2110 following the first message 2112 of FIG. 21A. The second message 2122 also includes a textual content 2124 "What kind of flower do you think this is?" and the attachment is shown but, in response to a determination that this image is redundant, the attachment is presented only as a minimized or low-resolution representation 2150. An optional indicator 2152 alerts the receiving user that a higher-resolution or full-size version of the image can be downloaded if so requested. In different implementations, in response to a submission of such a request, the messaging interface 2110 can access the full content and 'pull' the high-resolution image via a network for access by the receiving user. An example of this is illustrated in FIG. 21C, where the same second message 2122 is being viewed in the messaging interface 2110, including the textual content 2124, but now the full-size attachment 2100 has been downloaded and is shown to the receiving user.

Figure 21D:
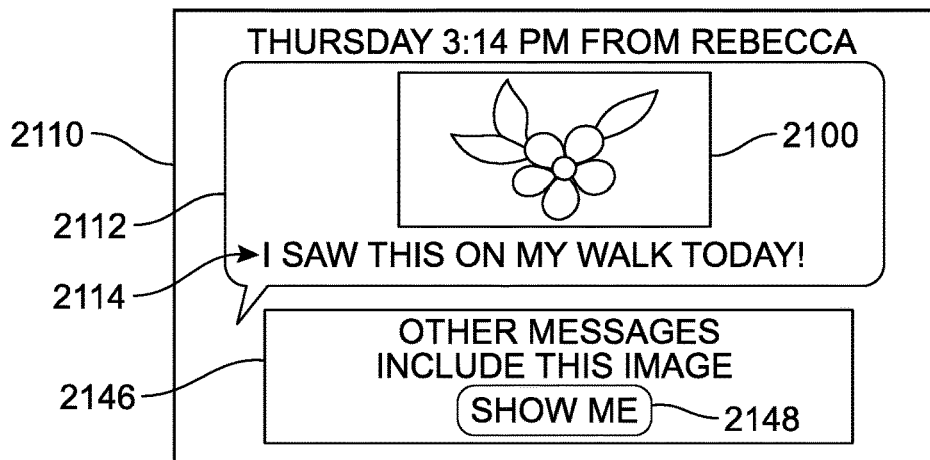

Thus, it can be appreciated that in different implementations, an end-user may receive various messages that include a particular (repeat) attachment. In some implementations, the user can be provided with opportunities to filter or approach such messages in a more selective manner. One example is shown in FIG. 21D, where a user accesses the first message 2112 that includes the attachment 2100. As additional messages including the same attachment are received or stored, the user may be able to quickly locate such instances by selection of an option 2148 ("Show me") provided by the messaging interface 2110 as part of an informational message 2146. The option 2148 can allow the receiving user to readily access or view the particular instance(s) in which the same attachment 2100 has been sent to the receiving user. In some implementations, the user interface can offer the user a means of moving between related messages or message content.

Figure 22:
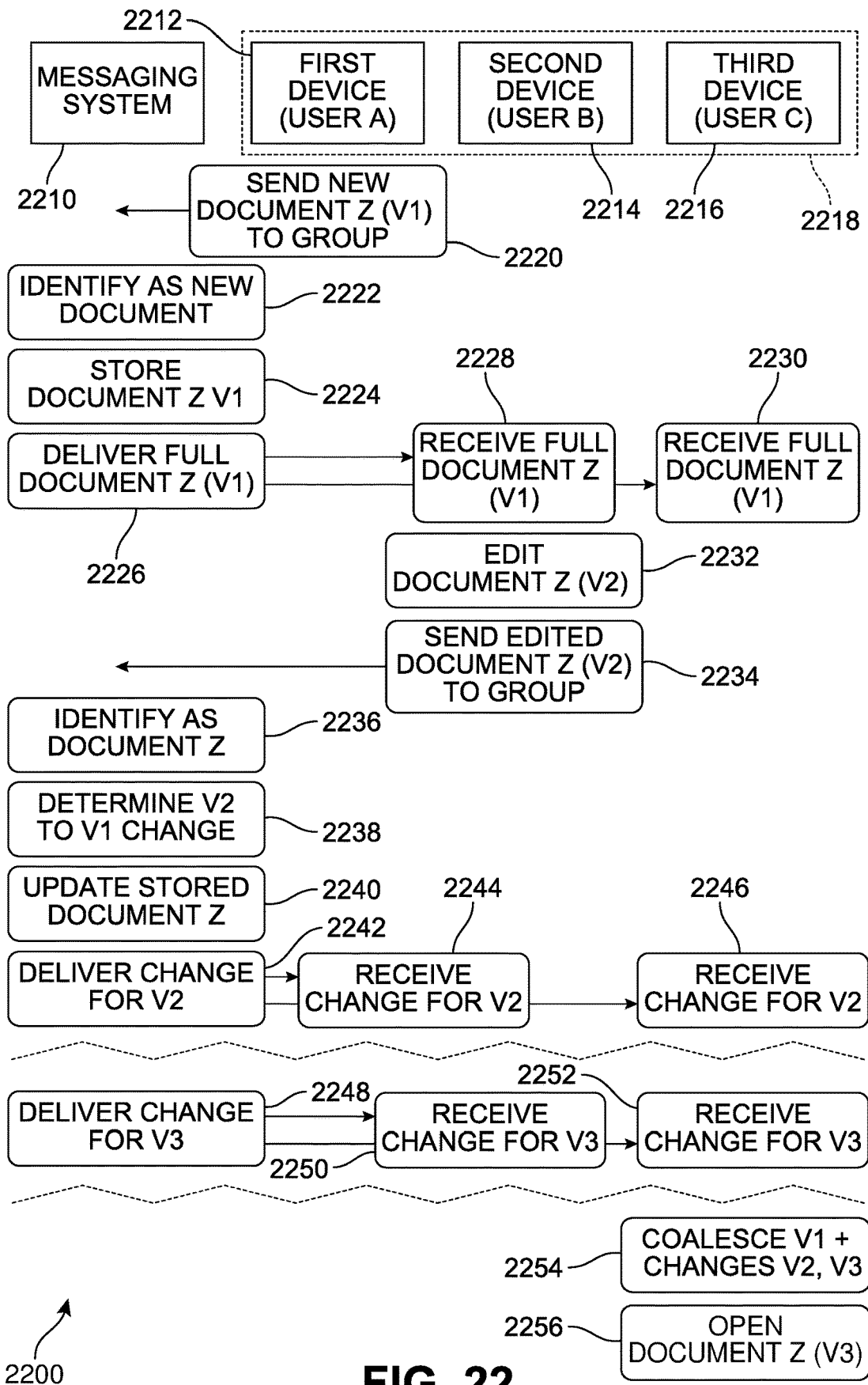

FIG. 22 presents a flow diagram of an implementation of a messaging content management process 2200 in which edited versions of previous attachments are identified, changes between versions determined, and data corresponding to the determined changes transmitted for the edited attachments. In some examples, some or all of the process 2200 may be performed in combination with any of the features discussed in connection with FIGS. 15-21D. The example shown in FIG. 22 involves a messaging system 2210, a first device 2212 associated with a first user ("User A"), a second device 2214 associated with a second user ("User B"), and a third device 2216 associated with a third user ("User C"). The three users 2212, 2214, and 2216 are each members of a same communication group 2218 through which the illustrated messages and their message attachments are send among the three users 2212, 2214, and 2216 and other members of the communication group 2218.

In FIG. 22, at a step 2220, User A uses the first device 2212 to send a new message attachment (referred to as "Document Z", although this term is not intended to narrow the intended content of the attachment) to the communication group 2218 through the messaging system 2210. At step 2220, this is considered a first version of Document Z, as indicated by the label "V1." At step 2220, the messaging system 2210 receives the first version of Document Z and, at a step 2222, the messaging system 2210 identifies the received first version of Document Z as a new attachment (or "document"). This identification may be based on, for example, a fingerprint obtained for a portion of the attachment and/or metadata included in or otherwise obtained for the attachment suitable for recognizing edited versions as being for the same document (for example, based on a filename or a unique document identifier value). The process 2200 may include a step 2224, in which the messaging system 2210 stores the attachment received at step 2220 in response its identification as a new attachment at step 2222. For example, the received first version of Document Z may be stored in its entirety as a new stored data item. At a step 2226, the messaging system 2210, in response the identification of the received first version of Document Z as a new attachment at step 2222, transmits the full attachment data for the first version of Document Z to the devices for the non-sending members of the communication group 2218: the second device 2214 for User B (which receives the attachment data at a step 2228) and the third device 2216 for User C (which receives the attachment data at a step 2230).

At a step 2232, User B edits the first version of Document Z received at step 2228 (for example, using a content editor executed by the second device 2214), resulting in a second version of Document Z (indicated by the label "V2") different from the first version of Document Z. At a step 2234, the second device 2214 sends the edited second version of Document Z (in some examples, it is sent in full) to the communication group 2218 through the messaging system 2210, and the messaging system 2210 receives the edited second version of Document Z. At a step 2236, the messaging system 2210 identifies the received second version of Document Z received at the step 2234 as being a revision of, or otherwise corresponding to, the first version of Document Z previously identified at the step 2222. This identification may be based on, for example, fingerprints obtained for respective portions of the first and second versions of Document Z, substantial similarity between respective portions of the first and second versions of Document Z, and/or metadata included in or otherwise obtained for the first and second versions of Document Z suitable for recognizing edited versions as being for the same document (for example, based on a filename or a unique document identifier value). At a step 2238, the messaging system 2210, in response to the identification of step 2236, determines changes from the first version of Document Z to the second version of Document Z. Some implementations may include a step 2240, in which the messaging system 2210, in response to the identification of step 2236, updates stored information produced by the step 2224 in association with the Document Z. For example, this may include storing the second version of Document Z received at the step 2234 in its entirety, and/or storing the changes determined at the step 2238. In some implementations, the messaging system 2210 may be configured to make multiple identified versions of an attachment separately available to users, allowing for a history of the attachment to be accessible.

At a step 2242, the messaging system 2210, in response to the identification of step 2236, transmits partial attachment data based on the changes determined at the step 2238 to the devices for the non-sending members of the communication group 2218: the first device 2212 for User A (which receives the partial attachment data at a step 2244) and the third device 2216 for User C (which receives the partial attachment data at a step 2246). In some examples, the first device 2212 and/or the third device 2216 are configured coalesce the received partial attachment data with a copy of the first version of Document Z to generate the second version of Document Z.

Prior to a step 2248, but not shown in FIG. 22, User A edits the second version of Document Z, for which the partial attachment data was received at step 2244, resulting in a third version of Document Z (indicated by the label "V3") different from the first version of Document Z. Also prior to the step 2248, the first device 2212 sends the edited third version of Document Z to the communication group 2218 through the messaging system 2210. As a result, operations similar to those described for the steps 2232-2240 are performed for the third version of Document Z. At a step 2248, the messaging service 2210 transmits partial attachment data based on detected changes between the second and third versions of Document Z to the second and third devices 2214 and 2216, much as described for the step 2242. At steps 2250 and 2252, the second and third devices 2214 and 2216 respectively receive the partial attachment data sent in step 2248. At a step 2254, the third device 2216 coalesces (or "merges") a copy of the first version of Document Z with the partial attachment data received at the steps 2246 and 2252 to generate the third version of Document Z. At a step 2256, the User C opens the third version of Document Z using an application program (for example, using a content editor or content viewer executed by the third device 2216). In some examples, the step 2254 may be performed dynamically in response to an initiation of the step 2254.

It is noted that although some examples in FIGS. 15-22 discuss handling of a single message attachment associated with a message, in some examples a message may have multiple associated message attachments. In such examples, the described techniques may result in different handling of message attachments associated with a same message. For example, an MCMS may determine for a message that a first transmission via a first network of a first attachment associated with the message will be avoided, while also determining for the message that that a second transmission via the first network of a second attachment associated with the message will occur.

Figure 23:
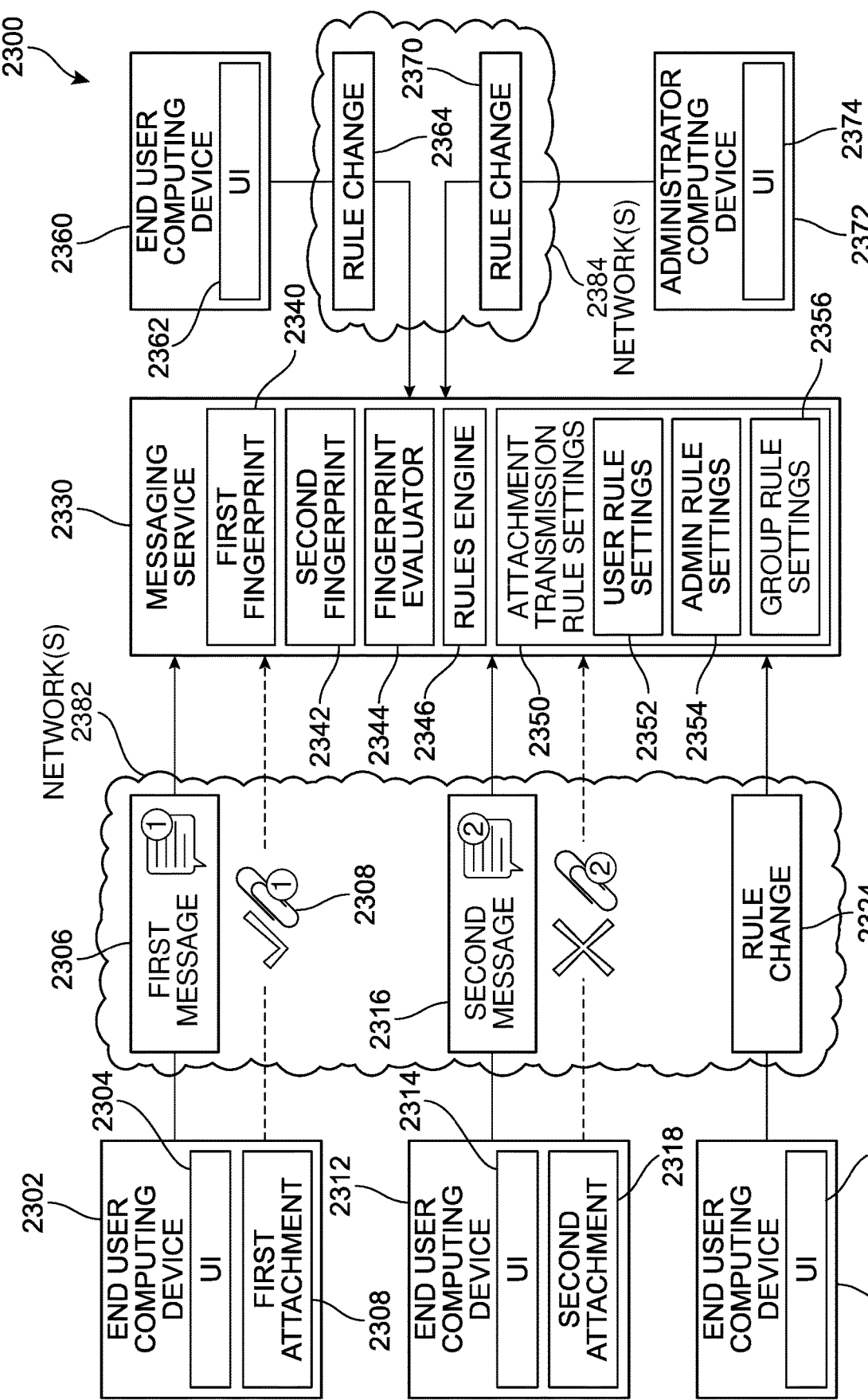

In order to better clarify the described implementations for the reader, several examples of the proposed systems are now presented below. Referring to FIG. 23, a fourth system architecture configured to receive and apply attachment transmission rule settings is shown. Referring to FIGS. 24A-25C, various user interfaces provided at end-user devices for making changes to the attachment transmission rule settings are shown. In the examples shown in FIGS. 23-25C, an intermediary messaging service receives changes to various attachment transmission rule settings from end-user computing devices resulting from user interaction with associated user interfaces. When the messaging service receives a request to send a message and an attachment in association with the message, the attachment transmission rule settings are evaluated against properties associated with the request to send the attachment to determine if the attachment should simply be transmitted or a fingerprint for the attachment be used instead of transmitted the attachment. This allows end users and administrators to assert control over the transmission of attachments under a variety of specific conditions. In some implementations, some or all of the features described in connection with FIGS. 23-25C may be performed in combination with any of the features discussed in connection with FIGS. 1A-22.

FIG. 23 illustrates an example system architecture 2300 including a messaging service 2330 configured to apply attachment transmission rule settings 2350 received from end-user computing devices. The system architecture 2300 may incorporate any of the techniques discussed in this disclosure. The messaging service 2330 maintains the attachment transmission rule settings 2350, which includes user attachment transmission rule settings 2352 (labeled "user rule settings"), administrator attachment transmission rule settings 2354 (labeled "admin rule settings"), and/or group attachment transmission rule settings 2356 (labeled "group rule settings"). The messaging service 2330 includes a rules engine 2346 that is configured to, for a message with an associated attachment (such as the first message 2306 associated with the first attachment 2308), identify attachment transmission rule settings 2350 applicable to the message, and apply the identified attachment transmission rule settings 2350 to determine whether a particular transmission of the attachment will occur. For example, as a result of applying one or more attachment transmission rule settings 2350, the rules engine 2346 may determine whether the attachment will be or will not be transmitted from a sending end-user device to the messaging service 2330, or may determine whether the attachment will be or will not be transmitted from the messaging service 2330 to a recipient end-user device. In some examples, a determination by the rules engine 2346 whether an attachment will be or will not be transmitted will override behavior. For example, although ordinarily an attachment for a message would not be transmitted from a sending end-user device to the messaging service 2330, it may nevertheless be transmitted due to the rules engine 2346. As another example, although ordinarily an attachment for a message would be transmitted from the messaging service 2330 to a recipient end-user device, it may nevertheless not be transmitted due to the rules engine 2346.

The user attachment transmission rule settings 2352 may include settings provided by a user used to determine, for a message sent by the user, whether an attachment for the message will be transmitted from a sending end-user device to the messaging service 2330. The user attachment transmission rule settings 2352 may include settings provided by a user used to determine, for a message which is being sent to the user, whether an attachment for the message will be transmitted from the messaging service 2330 to a recipient end-user device associated with the user. In some examples, some user attachment transmission rule settings 2352 apply to an attachment identified by a user, providing the user control over repeated transmission of specific attachments. In some examples, some user attachment transmission rule settings 2352 apply to another user identified by a user, providing the user control over transmission of attachments to or from the identified user. In some examples, some user attachment transmission rule settings 2352 apply to a communication group identified by a user, providing the user control over transmission of attachments sent to the identified communication group.

The administrator attachment transmission rule settings 2354 may include settings provided by an administrator (for example, an administrator user associated with an administrator computing device 2372) for a particular set of users (such as a set of users associated with an organization). In some examples, some administrator attachment transmission rule settings 2354 affect whether an attachment is stored in a cloud storage, which in turn may determine an endpoint of a transmission of the attachment and/or how the attachment is presented and/or made available to a user. In some examples, some administrator attachment transmission rule settings 2354 affect whether the messaging service 2330 will perform tracking of attachments sent to or sent by the affected users. When such tracking is enabled, the messaging service 2330 may be able to identify messages with redundant attachments for the affected users and avoid transmitting the attachments for those messages.

In FIG. 23, a first end-user (not shown in FIG. 23) associated with a first end-user computing device 2302 is shown requesting, via a user interface 2304 presented by the first end-user computing device 2302, a first message 2306 and a first user-indicated first recipient body. The first recipient body includes a second end-user (not shown in FIG. 23) associated with a second end-user computing device 2360. For example, the first recipient body may include the second end-user individually, or the first recipient body may include a communication group that the second end-user is a member of. For the first message 2306, the messaging service 2330 has determined that the first attachment 2308 is to be transmitted from the first end-user computing device 2302 to the messaging service 2330. The determination may have been produced by the rules engine 2346 according to one or more attachment transmission rule settings 2350, or may be based on a first fingerprint 2340 obtained for the first attachment 2308.

Also, a third end-user (not shown in FIG. 23) associated with a third end-user computing device 2312 is shown requesting, via a user interface 2314 presented by the third end-user computing device 2312, a second message 2316 and a second user-indicated attachment 2318 for the second message 2316 be sent by the messaging service 2330 to a second recipient body. A second fingerprint 2342 for the second user-indicated attachment 2318 matches the first fingerprint 2340 for the first user-indicated attachment 2308 (for example, as a result of being bitwise identical). The second recipient body includes the second end-user associated with the second end-user computing device 2360. For the second message 2316, the messaging service 2330 has determined that the second attachment 2318 will not be transmitted from the second end-user computing device 2312 to the messaging service 2330. The determination may have been produced by the rules engine 2346 according to one or more attachment transmission rule settings 2350, or may be based on the second finger print 2344 (for example, due to a fingerprint evaluator 2344 determining the second fingerprint 2342 matches the first fingerprint 2340).

FIG. 23 further shows rule changes 2324, 2364, and 2370 received by the messaging service 2330 from respective end-user computing devices 2320, 2360, and 2372 using respective user interfaces 2322, 2362, and 2374. Examples of such user interfaces are illustrated in FIGS. 24A-25C. The messaging service 2330 is configured to modify attachment transmission rule settings 2350 associated with and according to each of the received rule changes 2324, 2364, and 2370. By way of example, the rule change 2324 may specify a change to a user attachment transmission rule setting 2352 selected via the user interface 2500 shown in FIG. 25A, the rule change 2364 may specify a change to a user attachment transmission rule setting 2352 selected via one of the user interfaces 2412, 2426, and 2454 shown in FIGS. 2$b, 24C, and 24E, and the rule change 2370 may specify a change to an administrator attachment transmission rule setting 2354 selected via the user interface 2520 in FIG. 25B or a change to a group attachment transmission rule setting 2356 selected via the user interface 2530 in FIG. 25C.

FIGS. 24A-24E illustrate examples of user interfaces 2400, 2412, 2426, 2440, and 2454 for making changes to user attachment transmission rule settings 2350 (labeled "user rule settings") included in the attachment transmission rule settings 2350. A recipient end-user device may be configured to present the user interfaces 2400, 2412, 2426, 2440, and 2454 in association with a received message having an associated attachment.

In some other implementations, the system can include provisions for providing a mechanism by which a user can adjust, apply, or otherwise establish preferences, rules, or policies regarding the attachment transmission process. For example, in FIG. 24A, a receiving user views a message 2402 via the messaging interface 2400, with an identifier "Friday 2:22 PM from Spike". In other words, the message 2402 was received at 2:22 PM on Friday, from a sender account referred to as Spike. The message 2402 in this case includes a video attachment 2404 and textual content 2406 ("Awesome! Did you see this video?"). In different implementations, the receiving user, upon notification or delivery of a message, can also presented with one or more selectable options for engaging with the message content. For purposes of illustration, two possible options are shown, including a first selectable option 2408 "Attachment options" (see FIG. 24B), and a second selectable option 2410 "Sender options" (see FIG. 24C).

In some implementations, when the first selectable option 2408 is selected, an ancillary user interface may be shown or presented on the device display. As illustrated in FIG. 24B, additional information or options for one or more attachments configured to facilitate a user's ability to manage their message attachments can be offered. In FIG. 24B, for purposes of clarity, the message 2402 is again shown (though the inclusion of the message can be understood to be optional) in conjunction with a first menu 2412. The first menu 2412 offers a plurality of "Options for this attachment", including a first option 2416 ("Only get thumbnails and download when asked"), a second option 2418 ("Always download in full"), a third option 2420 ("Discard this copy"), and a fourth option 2422 ("Discard this copy and all other future copies"). It should be understood that additional options can also be included in first menu 2412, the labeling of an option varied, and/or one or more of the options shown may be omitted.

In different implementations, the system can include provisions for enabling a user to make decisions or policies with respect to specific attachments or attachment types. For example, a user may select the first option 2416 to request that all messages that include the current attachment (i.e., video attachment 2404) should automatically exclude or prevent download of the full content of the video attachment 2404 and instead limit the transmission of the video attachment 2404 to a thumbnail. The full-sized video attachment 2404 should only be downloaded if the user submits an additional request for the download. In some implementations, the rule would be applicable to all instances of this specific attachment, and/or attachments that have a fingerprint corresponding to the fingerprint generated for this particular attachment.

As another example, a user may select the second option 2418 to request that all messages that include the current attachment be automatically downloaded in full. In other words, this attachment need not undergo a redundancy evaluation, and/or the redundancy of the attachment will be immaterial, as this particular attachment will be transmitted via a network to the user regardless of whether it has been previously received on multiple occasions. In another example, a user may select the third option 2420 to delete or otherwise remove the attachment from their messaging application and/or device. Finally, a user may select the fourth option 2422 to both delete the attachment and to ensure that other copies (whether previously received or to be received in the future) are removed. In some implementations, this can ensure that the user does not receive either the attachment or any smaller representation of the same attachment (e.g., a thumbnail).

Furthermore, in different implementations, the selected option(s) can be configured for application across a range of user devices via policy settings 2424. In this case, a first policy option 2424A ("All of my devices") enforces the rules corresponding to the selected option(s) on all devices associated or registered with the user account that is selecting the option. In another example, a second policy option 2424B ("Just for this device") enforces the rules corresponding to the selected option(s) only on the current device (i.e., the device being used at this time). A third policy option 2424C ("For all of my mobile devices") allows the user to apply the rules corresponding to the selected option(s) on all mobile devices associated or registered with the user account that is selecting the option.

Figure 24C:
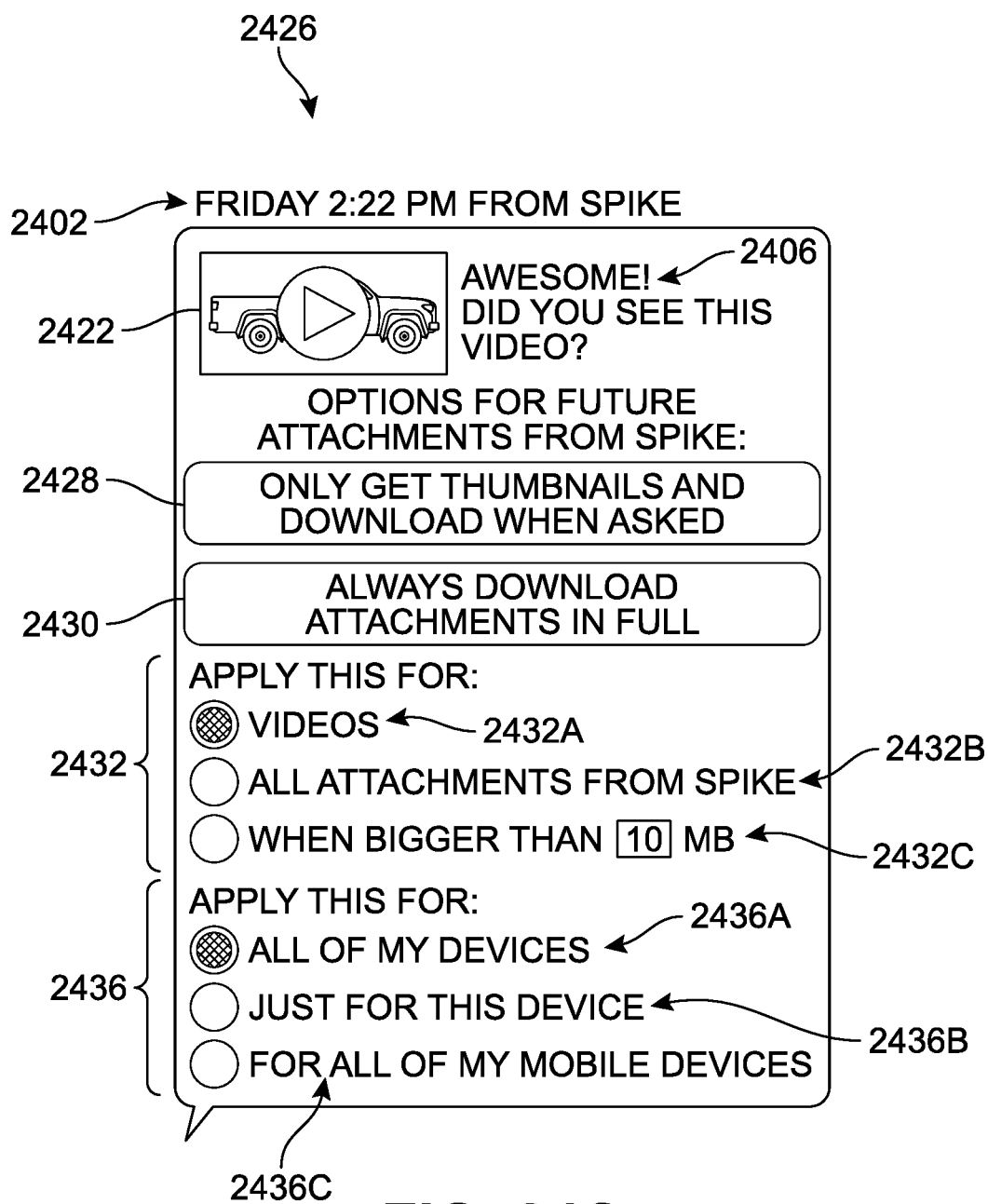

Returning momentarily to FIG. 24A, in some implementations, when the second selectable option 2410 is selected, a different ancillary user interface may be shown or presented on the device display. As illustrated in FIG. 24C, in some implementations, additional information or options for managing attachments that are transmitted or otherwise associated with a specific sender or sending body can be offered to the receiving user. In FIG. 24B, for purposes of clarity, the message 2402 is again shown (though the inclusion of the message can be understood to be optional) in conjunction with a second menu 2426. The second menu 2426 offers a plurality of "Options for future attachments from Spike:", including a first option 2428 ("Only get thumbnails and download when asked"), and a second option 2430 ("Always download attachments in full"). It should be understood that references to "Spike" occur for purposes of illustration, and are intended to refer to the sending body for the particular message that was being viewed or accessed in the previous interface (see FIG. 24A). Furthermore, additional options can also be included in second menu 2426, the labeling of an option varied, and/or one or more of the options shown may be omitted.

In different implementations, the system can include provisions for enabling a user to make decisions or policies with respect to specific senders. For example, a user may select the first option 2428 to request that all messages from the designated sender should automatically exclude or prevent download of the full content of any attachments and instead limit the transmission of an attachment to a thumbnail. The full-sized attachments from "Spike" should only be downloaded if a submission requesting a download of an attachment is received by the system.

As another example, a user may select the second option 2430 to request that all message attachments from the current sender be automatically downloaded in full. In other words, any attachments from this sender need not undergo a redundancy evaluation, and/or the redundancy of the attachments will be immaterial, as any attachment from this particular sender will be transmitted to the user regardless of whether it has been previously received on multiple occasions.

Furthermore, in different implementations, the selected option(s) can be configured for application across a range of attachment types, via an attachment policy settings 2432 and/or across a range of user devices via a device policy settings 2436. In this case, a first attachment policy option 2432A ("Videos") ensures that the rule corresponding to the designated option applies only to video-type attachments from the designated sender. In another example, a second attachment policy option 2432B ("All attachments from Spike") ensures that the rule corresponding to the selected option applies to all attachment types from the selected sender. A third attachment policy option 2432C ("When bigger than [10] MB") allows the user to establish a size-based boundary on the attachments that are downloaded from Spike. In other words, a user can request that the rule corresponding to the selected option applies to all attachment types from the designated sender that are larger in size than the volume of data that has been designated by the user (or a system default). In some implementations, the user is able to enter or input (or can be provided with options by which he or she can select a threshold or number) a particular size for attachments that will be affected by this policy. It can be appreciated that these types of options can be broadened to allow users to request that attachments of a certain content type or size be transmitted or downloaded only at specified times of day, when the mobile device is accessing data via Wi-Fi (rather than cellular data), etc.

In addition, similar to those presented with reference to FIG. 24B, in some implementations, the device policy settings 2436 can offer a first device policy option 2436A ("All of my devices") configured to enforce rules corresponding to the selected option(s) on all devices associated or registered with the user account that is selecting the option. In another example, a second device policy option 2436B ("Just for this device") enforces the rule corresponding to the selected option only on the current device (i.e., the device being used at this time). A third device policy option 2436C ("For all of my mobile devices") allows the user to apply the rule corresponding to the selected option on all mobile devices associated or registered with the user account that is selecting the option.

For purposes of illustration, another example of these provisions is shown with reference to FIGS. 24D and 24E. In FIG. 24D, a receiving user views a message 2442 via the messaging interface 2440, with an identifier "Tuesday 9:44 PM from Andy to Sales Team". In other words, the message 2442 was received at 9:44 PM on Tuesday, from a sender account referred to as Andy. Furthermore, the message 2442 was shared with the receiving user as part of a group, of which it may be understood that the receiving user is a member.

The message 2442 in this case includes a video attachment 2444 and textual content 2446 ("Please watch this video before our weekly meeting"). In different implementations, the receiving user, upon notification or delivery of a message, can also presented with one or more selectable options for engaging with the message content. For purposes of illustration, three possible options are shown, including a first selectable option 2448 "Attachment options" (see FIG. 24B), a second selectable option 2450 "Sender options" (see FIG. 24C), and a third selectable option 2452 "Group options" (see FIG. 24E).

In some implementations, when the third selectable option 2452 is selected, an ancillary user interface may be shown or presented on the device display. As illustrated in FIG. 24E, additional information or options for one or more attachments configured to facilitate a user's ability to manage the group-based message attachments can be offered. In FIG. 24E, for purposes of clarity, the message 2442 is again shown (though the inclusion of the message can be understood to be optional) in conjunction with a third menu 2454. The third menu 2454 offers a plurality of "Options for future attachments in Sales Team:", including a first option 2458 ("Only get thumbnails and download when asked"), and a second option 2460 ("Always download attachments in full"). It should be understood that references to "Sales Team" occur for purposes of illustration, and are intended to refer generally to the members of the messaging body associated with the particular message that was being viewed or accessed in the previous interface (see FIG. 24D). Furthermore, additional options can also be included in third menu 2454, the labeling of an option varied, and/or one or more of the options shown may be omitted.

In different implementations, the system can include provisions for enabling a user to make decisions or policies with respect to specific messaging groups. For example, a user may select the first option 2458 to request that all messages from members of the selected group should automatically exclude or prevent download of the full content of any attachments and instead limit the transmission of an attachment to a thumbnail. The full-sized attachments from members of "Sales Team" group should only be downloaded if a request from the user for a download of an attachment is received by the system. As another example, a user may select the second option 2460 to request that all message attachments from members of the designated group be automatically downloaded in full. In other words, any attachments from this sender need not undergo a redundancy evaluation, and/or the redundancy of the attachments will be immaterial, as any attachment from these particular member(s) will be transmitted to the user regardless of whether it has been previously received on multiple occasions.

Furthermore, in different implementations, the selected option(s) can be configured for application across a range of attachment types, via an attachment policy settings 2462 and/or across a range of user devices via a device policy settings 2464. In this case, a first attachment policy option 2462A ("Videos") ensures that the rule corresponding to the selected option applies only to video-type attachments from the group. In another example, a second attachment policy option 2462B ("All attachments from Sales Team") ensures that the rule corresponding to the selected option applies to any attachment type from the group. A third attachment policy option 2462C ("When bigger than [10] MB") allows the user to establish a size-based boundary on the attachments that are downloaded from messages sent by members of the group. In other words, a user can request that the rule corresponding to the selected option applies to all attachment types from the group that are larger in size than the volume of data that has been designated by the user (or a system default). In some implementations, the user is able to enter or input (or can be provided with options by which he or she can select a threshold or number) a particular size for attachments that will be affected by this policy. It can be appreciated that these types of options can be broadened to allow users to request that attachments of a certain type or size be transmitted only at specified times of day, when the mobile device is accessing data via wi-fi (rather than cellular data), etc.

In addition, similar to those presented with reference to FIG. 24B, in some implementations, the device policy settings 2464 can offer a first device policy option 2464A ("All of my devices") configured to enforce rules corresponding to the selected option(s) on all devices associated or registered with the user account that is selecting the option. In another example, a second device policy option 2464B ("Just for this device") enforces the rule corresponding to the selected option only on the current device (i.e., the device being used at this time). A third device policy option 2464C ("For all of my mobile devices") allows the user to apply the rule corresponding to the selected option on all mobile devices associated or registered with the user account that is selecting the option.

Figure 25A:
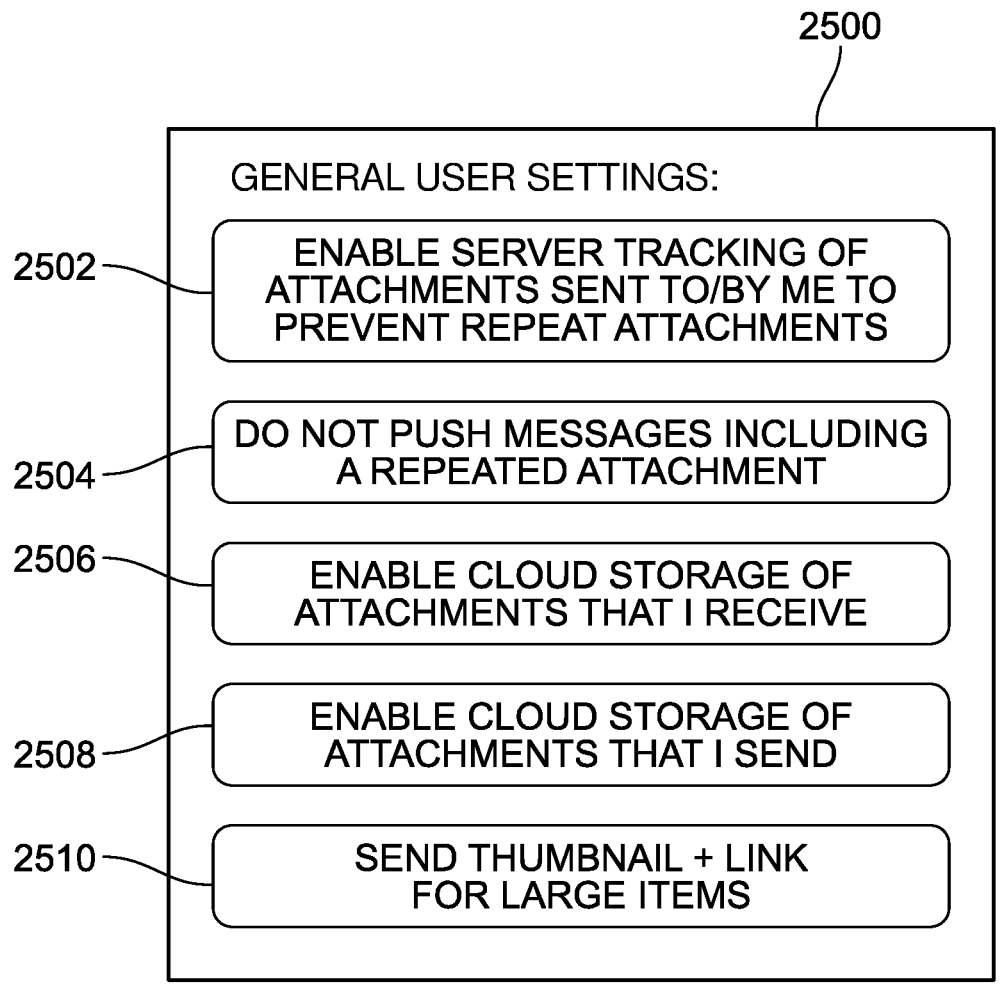

In different implementations, the system can further include provisions for enabling users to establish broader settings across the messaging interface as related to attachment transmission management. Some examples of these provisions are described with reference to FIGS. 25A-25C. One non-limiting example of a general settings user interface ("general settings") 2500 is shown in FIG. 25A, offering a plurality of settings options. It should be understood that additional options can also be included in general settings 2500, the labeling of an option varied, and/or one or more of the options shown may be omitted. In FIG. 25A, a first selectable option 2502, a second selectable option 2504, a third selectable option 2506, a fourth selectable option 2508, and a fifth selectable option 2510 are presented. The first selectable option 2502 ("Enable server tracking of attachments sent to/by me to prevent repeat attachments") is configured to permit the messaging server access to delivery details for message attachments transmitted to the user or sent by the user. This can allow the server to record information about the message attachment and for purposes of tracking and identifying redundant messages. The second selectable option 2504 ("Do not push messages including a repeat attachment") is configured to allow a receiving user to filter messages that include redundant attachments. In other words, if the system detects or otherwise determines that an incoming message includes an attachment that is redundant for this user, the message can be prevented from being transmitted to the user.

Furthermore, in some implementations, the system can include provisions for reducing or limiting the amount of data that is transmitted by maintaining copies of attachments in the cloud for use in later messages. For example, the third selectable option 2506 ("Enable cloud storage of attachments that I receive") enables attachments that are received by this user to be stored in the user's cloud-based storage account, and the fourth selectable option 2508 ("Enable cloud storage of attachments that I send") enables attachments that are sent from this user to be stored in the user's cloud-based storage account. These saved attachments can be accessed by the server as it determines that subsequent messages are being requested that include an attachment that was previously saved. Rather than pull the data from the sending user, the server can instead provide the attachment via its own storage, thereby significantly reducing the amount of data being transmitted. In addition, fifth selectable option 2510 ("Send thumbnail+link for large items") is also configured to reduce or limit the amount of data received (and/or sent) by requesting that all attachments having a large volume of data (as established by the user and/or by the system) should be transmitted in thumbnail format as well as (or alternatively) offering a link to the full download of the attachment.

Figure 25B:
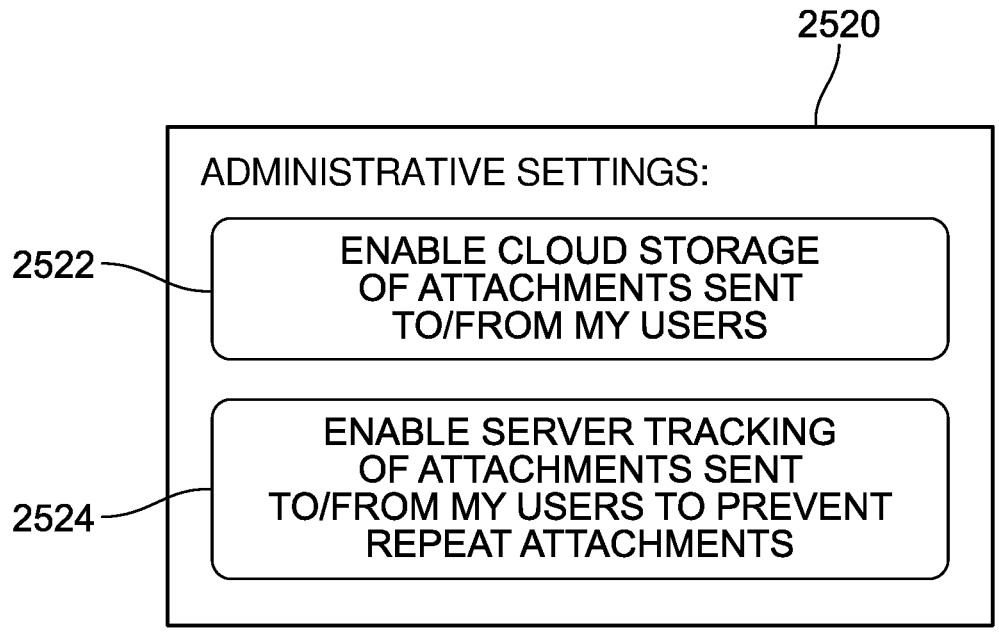

Similarly, in different implementations, administrators of messaging applications for organizations or groups can be provided with an opportunity to adjust or request the application of one or more "Admin Settings" 2520 as illustrated in FIG. 25B. It should be understood that additional options can also be included in Admin Settings 2500, the labeling of an option varied, and/or one or more of the options shown may be omitted. In FIG. 25B, a first selectable option 2522 and a second selectable option 2524 are presented. The first selectable option 2522 "Enable cloud storage of attachments sent to/from users" enables attachments that are received by or sent to organizational users to be stored in the user's cloud-based storage account, thereby significantly reducing the amount of data being transmitted across the organization's network. In addition, second selectable option 2524

"Enable server tracking of attachments sent to/from users to prevent repeat attachments" is configured to allow the messaging server access to delivery details for message attachments transmitted to the members of the organization or messages sent to members of the organization. This can allow the server to record information about the message attachment and for purposes of tracking and identifying redundant messages.

Figure 25C:
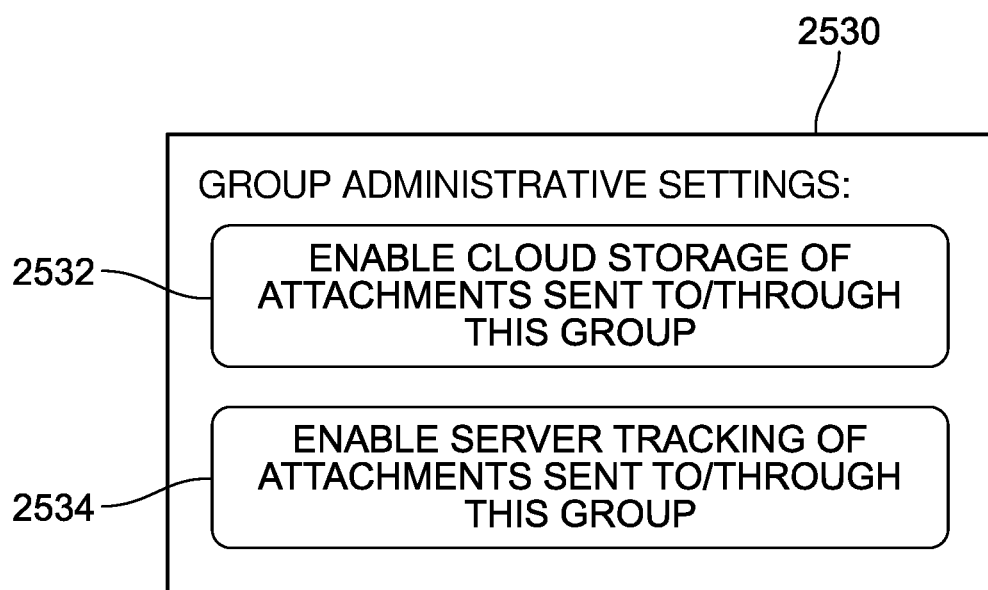

In cases where an administrator wishes to apply various settings in a more directed manner, a "Group Admin Settings" menu 2530, as shown in FIG. 25C, can be offered. It should be understood that additional options can also be included in Group Admin Settings 2500, the labeling of an option varied, and/or one or more of the options shown may be omitted. In FIG. 25B, a first selectable option 2522 and a second selectable option 2524 are presented. The first selectable option 2522 ("Enable cloud storage of attachments sent to/from users") enables attachments that are received by or sent to organizational users to be stored in the user's cloud-based storage account, thereby significantly reducing the amount of data being transmitted across the organization's network. In addition, second selectable option 2524 ("Enable server tracking of attachments sent to/from users to prevent repeat attachments") is configured to allow the messaging server access to delivery details for message attachments transmitted to the members of the organization or messages sent to members of the organization. This can allow the server to record information about the message attachment and for purposes of tracking and identifying redundant messages.

It is noted that although some examples in FIGS. 23-25C discuss handling of a single message attachment associated with a message, in some examples a message may have multiple associated message attachments. In such examples, the described techniques may result in different handling of message attachments associated with a same message. For example, an MCMS may determine for a message that a first transmission via a first network of a first attachment associated with the message will be avoided, while also determining for the message that that a second transmission via the first network of a second attachment associated with the message will occur.

Figure 26:
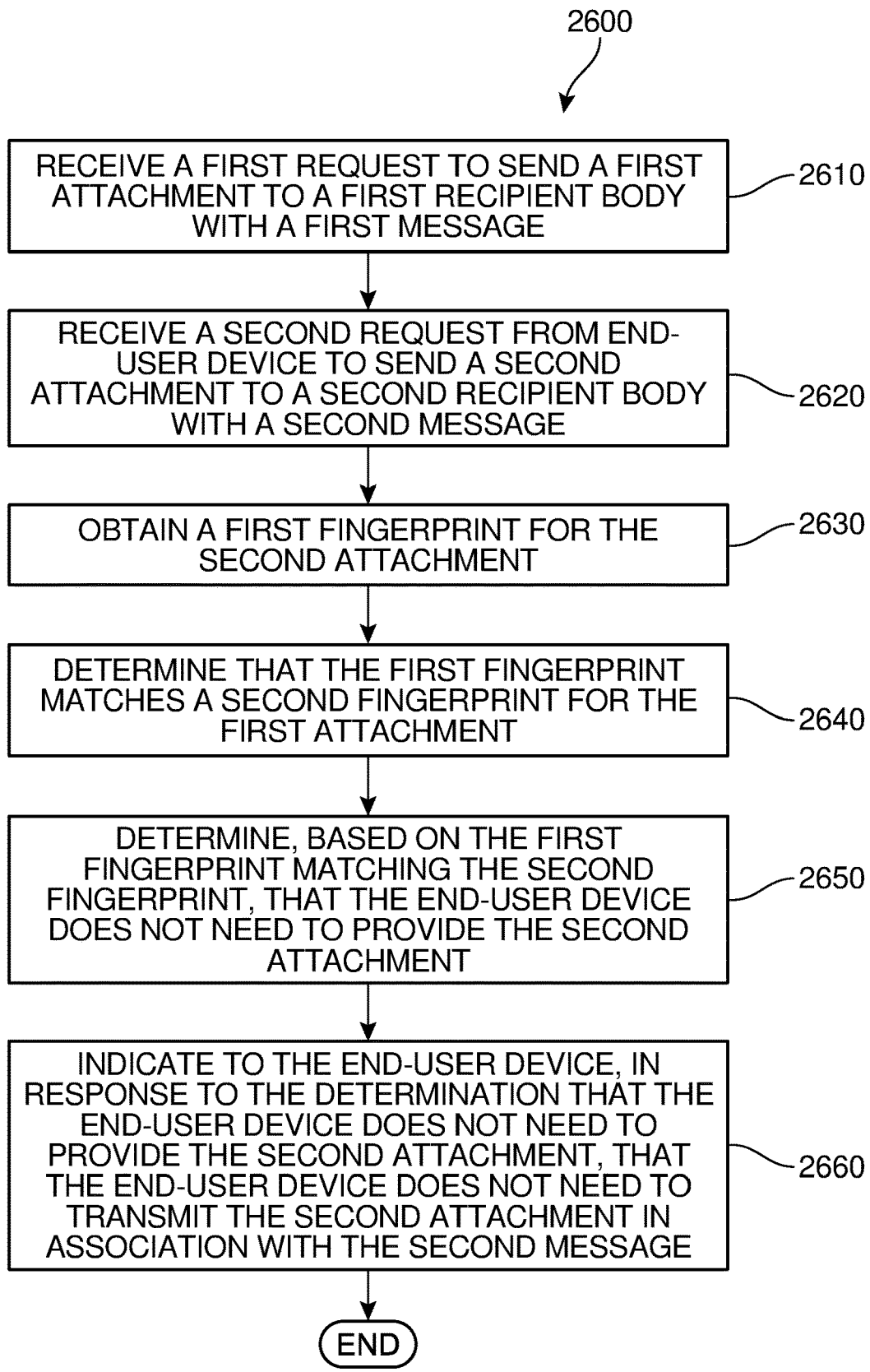
FIGS. 26, 27A-27B, 28A, 28B, 28C, and 29 present flow charts illustrating implementations of various example processes for communication between users of an electronic messaging service using any of the features herein described.

FIG. 26 is a flow chart illustrating an implementation of an example process 2600 for communication between users of an electronic messaging service. In some examples, some or all of the process 2600 may be performed in combination with any of the features discussed in connection with FIGS. 1A-12. In FIG. 26, a first operation 2610 includes receiving, at a first computer system from a first end-user computing device via a data communication network at a first time, a first request to send a first user-indicated message attachment to a first recipient body in association with a request to send a first message to the first recipient body. In a second operation 2620, the process 2600 includes receiving, at the first computer system from a second end-user computing device via a data communication network after the first time, a second request to send a second user-indicated message attachment to a second recipient body in association with request to send a second message to the second recipient body. In a third operation 2630, the process 2600 includes obtaining, at the first computer system, a first fingerprint resulting from a first fingerprinting algorithm being applied to the second user-indicated message attachment. In a fourth operation 2640, the process 2600 includes determining that the first fingerprint matches a second fingerprint resulting from the first fingerprinting algorithm being applied to the first user-indicated message attachment. In a fifth operation 2650, the process 2600 includes determining, by the first computer system based on the determination that the first fingerprint matches the second fingerprint, that the second end-user computing device does not need to provide the second user-indicated message attachment. In a sixth operation 2660, the process 2600 includes indicating to the second end-user computing device, in response to the determination that the second end-user computing device does not need to provide the second user-indicated message attachment, that the second end-user computing device does not need to transmit the second user-indicated message attachment to another computing device in association with the second message.

Figure 27A:
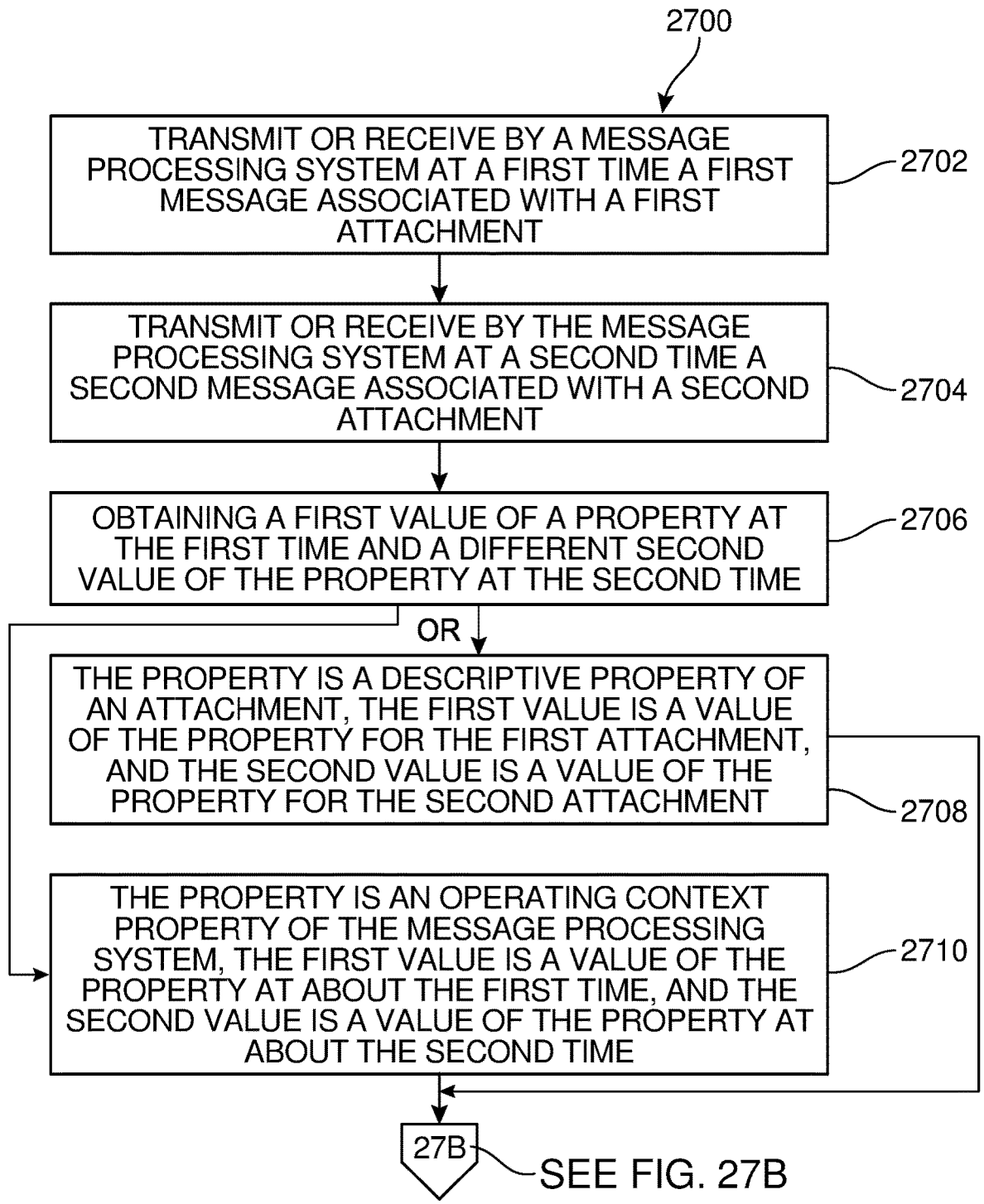
Figure 27B:
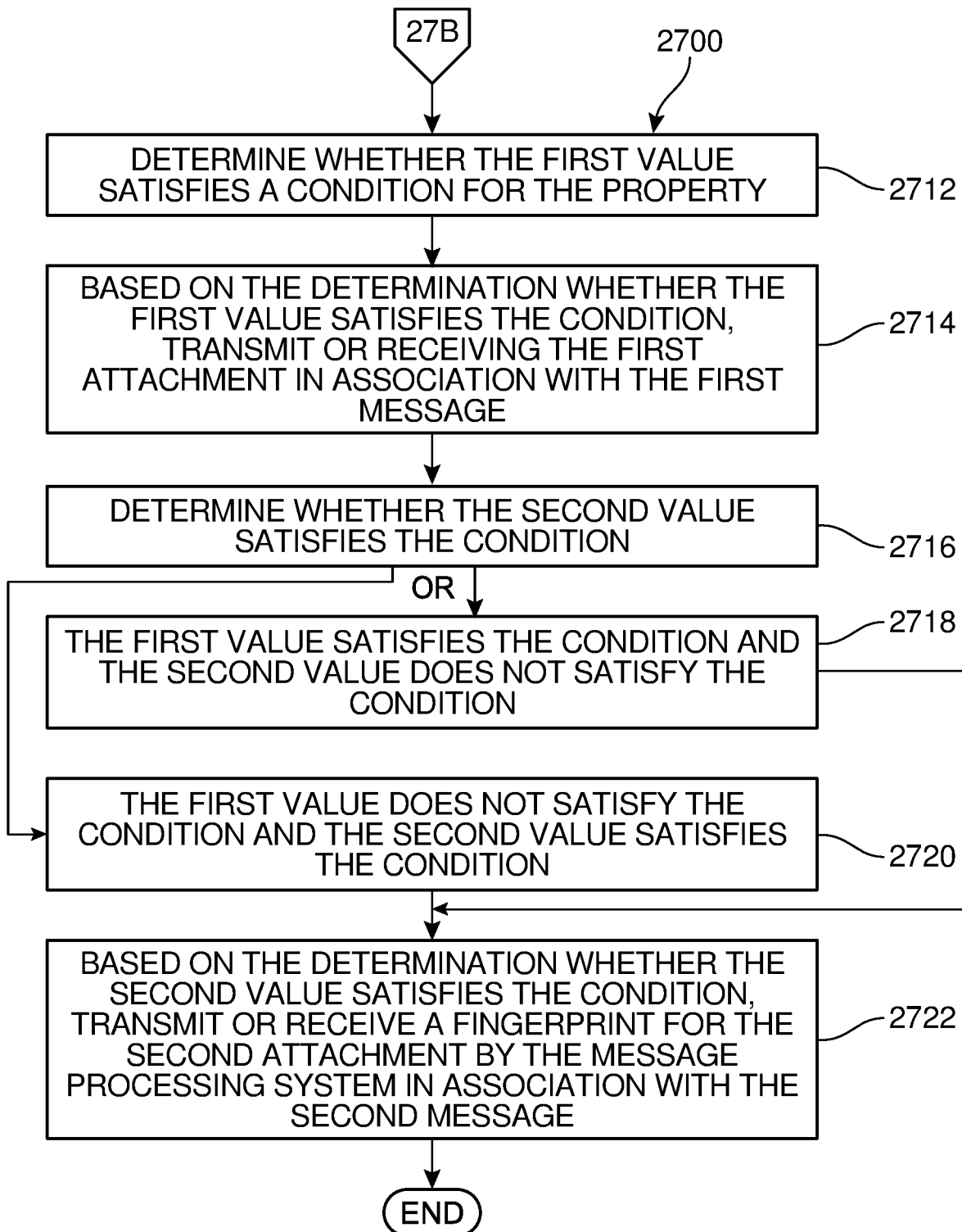

FIGS. 27A and 27B provide a flow chart illustrating an implementation of an example process 2700 for communication between users of an electronic messaging service. In some examples, some or all of the process 2700 may be performed in combination with any of the features discussed in connection with FIGS. 1A-8 and 13A-14C. In FIG. 27A, a first operation 2702 includes transmitting or receiving a first message via a data communication network by a first message processing system at a first time, wherein the first message is associated with a first user-indicated message attachment. In a second operation 2704, the process 2700 includes transmitting or receiving a second message via a data communication network by the first message processing system at a second time, wherein the second message is associated with a second user-indicated message attachment. In a third operation 2706, the process 2700 includes obtaining, by the first message processing system, a first value of a first property at the first time and a different second value of the first property at the second time. Only one of a first condition 2708 and a second condition 2710 applies for the process 2700 before a fourth operation 2712. According to the first condition 2708, the first property is a first descriptive property of a user-indicated message attachment, the first value is a value of the first descriptive property for the first user-indicated message attachment, and the second value is a value of the first descriptive property for the second user-indicated message attachment. Otherwise, according to the second condition 2710, the first property is a first operating context property of the first message processing system, the first value is a value of the first operating context property for the first message processing system at about the first time, and the second value is a value of the first operating context property for the first message processing system at about the second time.

Continuing the process 2700 in FIG. 27B, in the fourth operation 2712, the process 2700 includes determining whether the first value satisfies a first condition for the first property. In a fifth operation 2714, the process 2700 includes, based on the determination whether the first value satisfies the first condition, transmitting or receiving the first user-indicated message attachment via a data communication network by the first message processing system in association with the transmitting or receiving of the first message. In a sixth operation 2716, the process 2700 includes determining whether the second value satisfies the first condition. Only one of a third condition 2718 and a fourth condition 2720 applies for the process 2700 before a seventh operation 2722. According to the third condition 2718, the first value satisfies the first condition and the second value does not satisfy the first condition. Otherwise, according to the fourth condition 2718, the first value does not satisfy the first condition and the second value satisfies the first condition. In the seventh operation 2722, the process 2700 includes, based on the determination whether the second value satisfies the first condition, transmitting or receiving a fingerprint for the second user-indicated message attachment via a data communication network by the first message processing system in association with the transmitting or receiving of the second message.

Figure 28A:
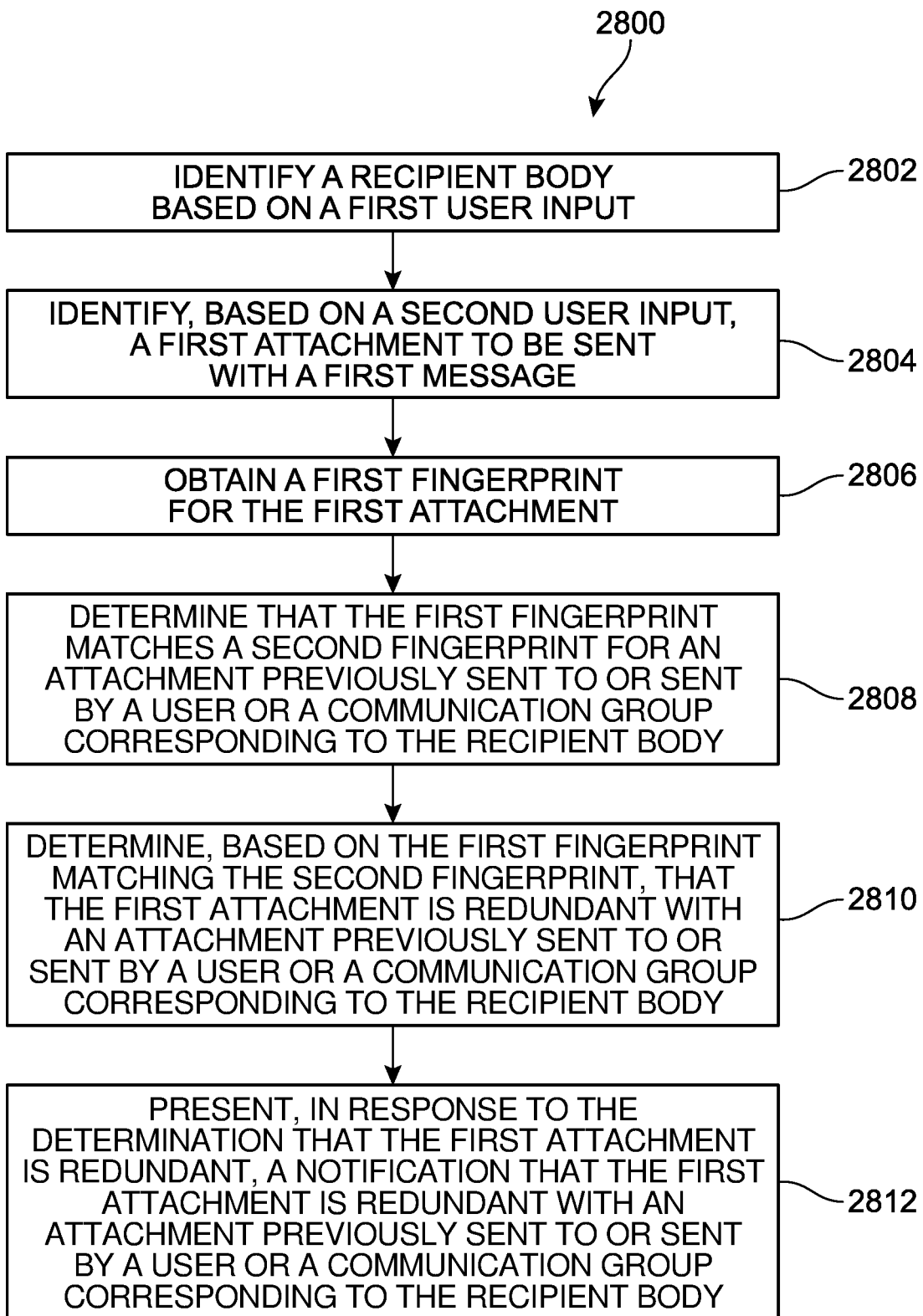

FIG. 28A is a flow chart illustrating an implementation of an example process 2800 for communication between users of an electronic messaging service. In some examples, some or all of the process 2800 may be performed in combination with any of the features discussed in connection with FIGS. 1A-8 and 15-22. In FIG. 28A, a first operation 2802 includes identifying a first recipient body based on a first user input obtained by a first end-user computing device. In a second operation 2804, the process 2800 includes identifying, based on a second user input obtained by the first end-user computing device, a first user-indicated message attachment to be sent in association with a first message. In a third operation 2806, the process 2800 includes obtaining a first fingerprint resulting from a first fingerprinting algorithm being applied to the first user-indicated message attachment. In a fourth operation 2808, the process 2800 includes determining that the first fingerprint matches a second fingerprint resulting from the first fingerprinting algorithm being applied to a message attachment previously sent to or sent by a first user or a communication group corresponding to the first recipient body. In a fifth operation 2810, the process 2800 includes determining, based on at least the determination that the first fingerprint matches the second fingerprint, that the first user-indicated message attachment is redundant with a message attachment previously sent to or sent by a user or a communication group corresponding to the first recipient body. In a sixth operation 2812, the process 2800 includes presenting, via a human-machine interface provided by the first end-user computing device at a first time in response to the determination that the that the first user-indicated message attachment is redundant, a first notification that the first user-indicated message attachment is redundant with a message attachment previously sent to or sent by a user or a communication group associated with the first recipient body.

Figure 28B:
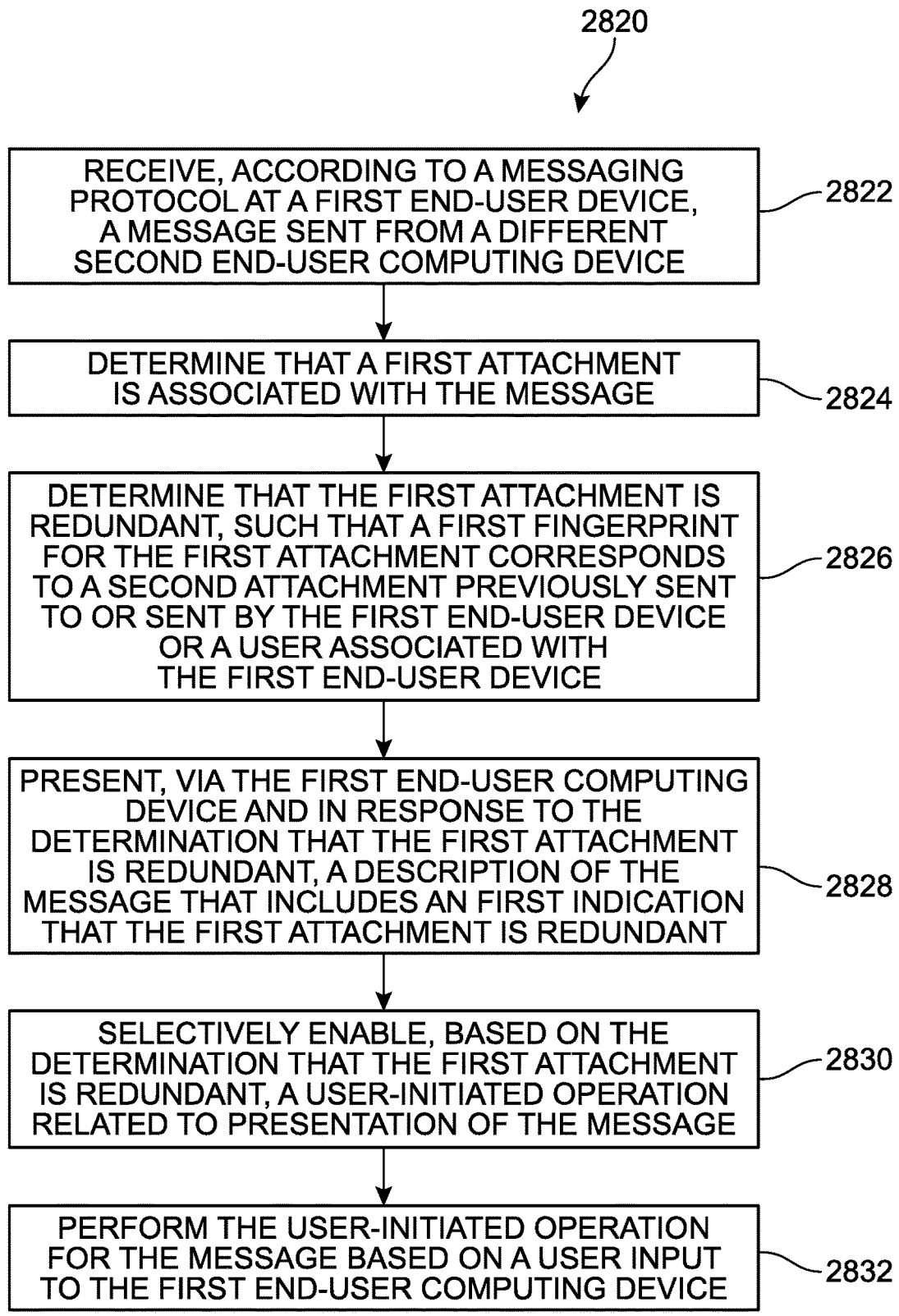

FIG. 28B is a flow chart illustrating an implementation of an example process 2820 for communication between users of an electronic messaging service. In some examples, some or all of the process 2820 may be performed in combination with any of the features discussed in connection with FIGS. 1A-8 and 15-22. In FIG. 28B, a first operation 2822 includes receiving, via a data communication network according to a messaging protocol at a first end-user computing device, a first message sent from a different second end-user computing device. In some implementations, the messaging protocol may define rules and/or formats for sending a message bearing user-created text between different end-user computing devices, sending a message between different end-user computing devices and identifying one or more user-indicated message attachment associated with the message, and transferring a user-indicated message attachment associated with a message to the first end-user computing device. In a second operation 2824, the process 2820 includes determining that a first user-indicated message attachment is associated with the first message. In a third operation 2826, the process 2820 includes determining, at the first end-user computing device, that the first user-indicated message attachment is redundant, such that a first fingerprint resulting from a first fingerprinting algorithm being applied to the first user-indicated message attachment corresponds to a second user-indicated message attachment previously sent to or sent by the first end-user computing device or a first user associated with the first end-user computing device. In a fourth operation 2828, the process 2820 includes presenting, via a human-machine interface provided by the first end-user computing device and in response to the determination that the first user-indicated message attachment is redundant, a description of the first message that includes a first indication that the first user-indicated message attachment is redundant. In a fifth operation 2830, the process 2820 includes selectively enabling, based on the determination that the first user-indicated message attachment is redundant, a first user-initiated operation related to presentation of the first message. In a sixth operation 2832, the process 2820 includes performing the first user-initiated operation for the first message based on a first user input to the first end-user computing device.

Figure 28C:
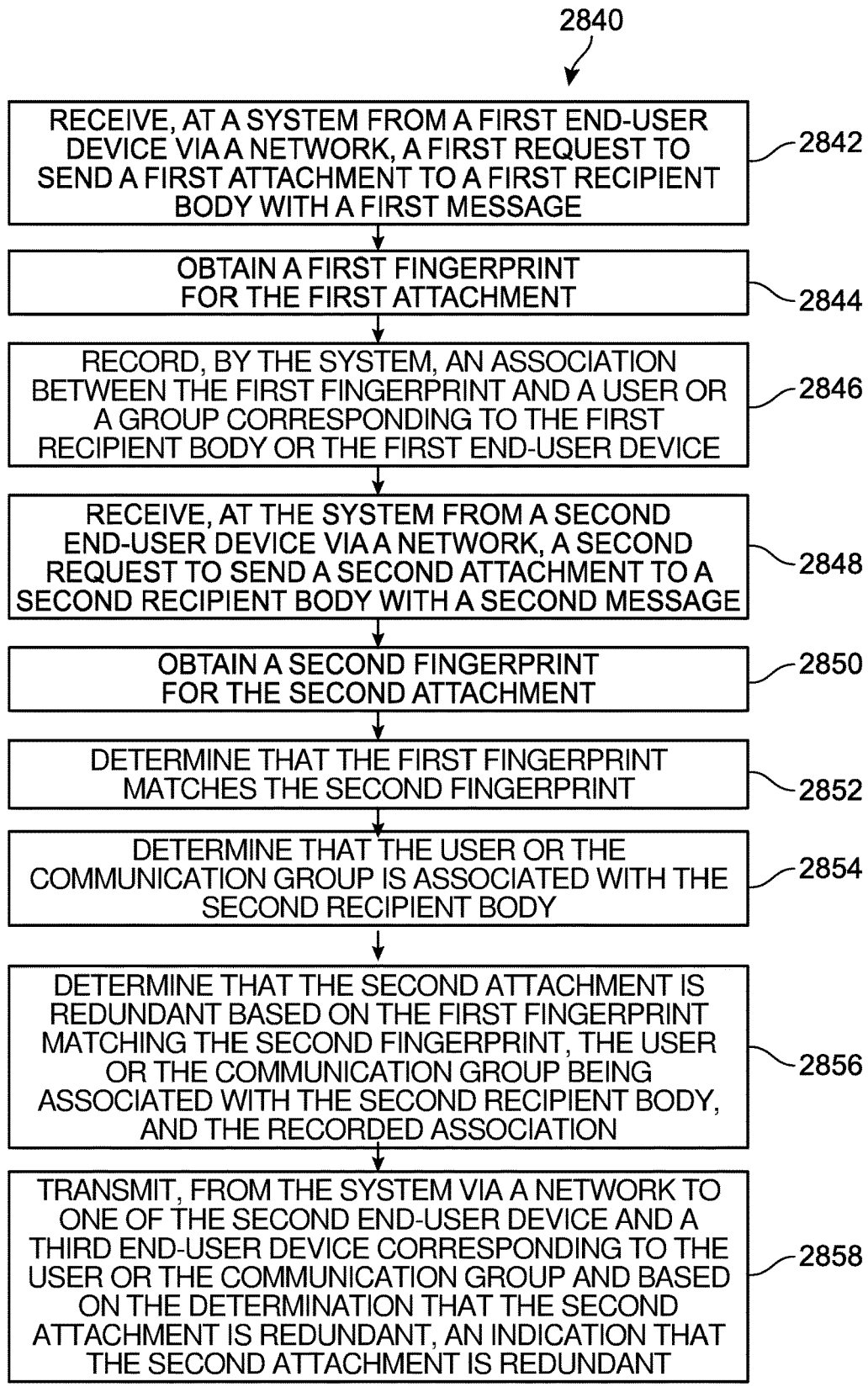

FIG. 28C is a flow chart illustrating an implementation of an example process 2840 for communication between users of an electronic messaging service. In some examples, some or all of the process 2840 may be performed in combination with any of the features discussed in connection with FIGS. 1A-8 and 15-22. In FIG. 28C, a first operation 2842 includes receiving, at a first computer system from a first end-user computing device via a data communication network, a first request to send a first user-indicated message attachment to a first recipient body in association with a request to send a first message to the first recipient body. In a second operation 2844, the process 2840 includes obtaining, at the first computer system, a first fingerprint resulting from a first fingerprinting algorithm being applied to the first user-indicated message attachment. In a third operation 2846, the process 2840 includes recording, by the first computer system, a first association between the first fingerprint and a first user or a communication group corresponding to the first recipient body or the first end-user computing device. In a fourth operation 2848, the process 2840 includes receiving, at the first computer system from a second end-user computing device via a data communication network, a second request to send a second user-indicated message attachment to a second recipient body in association with request to send a second message to the second recipient body. In a fifth operation 2850, the process 2840 includes obtaining, at the first computer system, a second fingerprint resulting from the first fingerprinting algorithm being applied to the second user-indicated message attachment. In a sixth operation 2852, the process 2840 includes determining that the first fingerprint matches the second fingerprint. In a seventh operation 2854, the process 2840 includes determining that the first user or the communication group is associated with the second recipient body. In an eighth operation 2856, the process 2840 includes determining that the second user-indicated message attachment is redundant based on the determination that the first fingerprint matches the second fingerprint, the determination that the first user or the communication group is associated with the second recipient body, and the recorded first association. In a ninth operation 2858, the process 2840 includes transmitting, from the first computer system via a network to one of the second end-user computing device and a third end-user computing device corresponding to the first user or the communication group and based on the determination that the second user-indicated message attachment is redundant, an indication that the second user-indicated message attachment is redundant.

Figure 29:
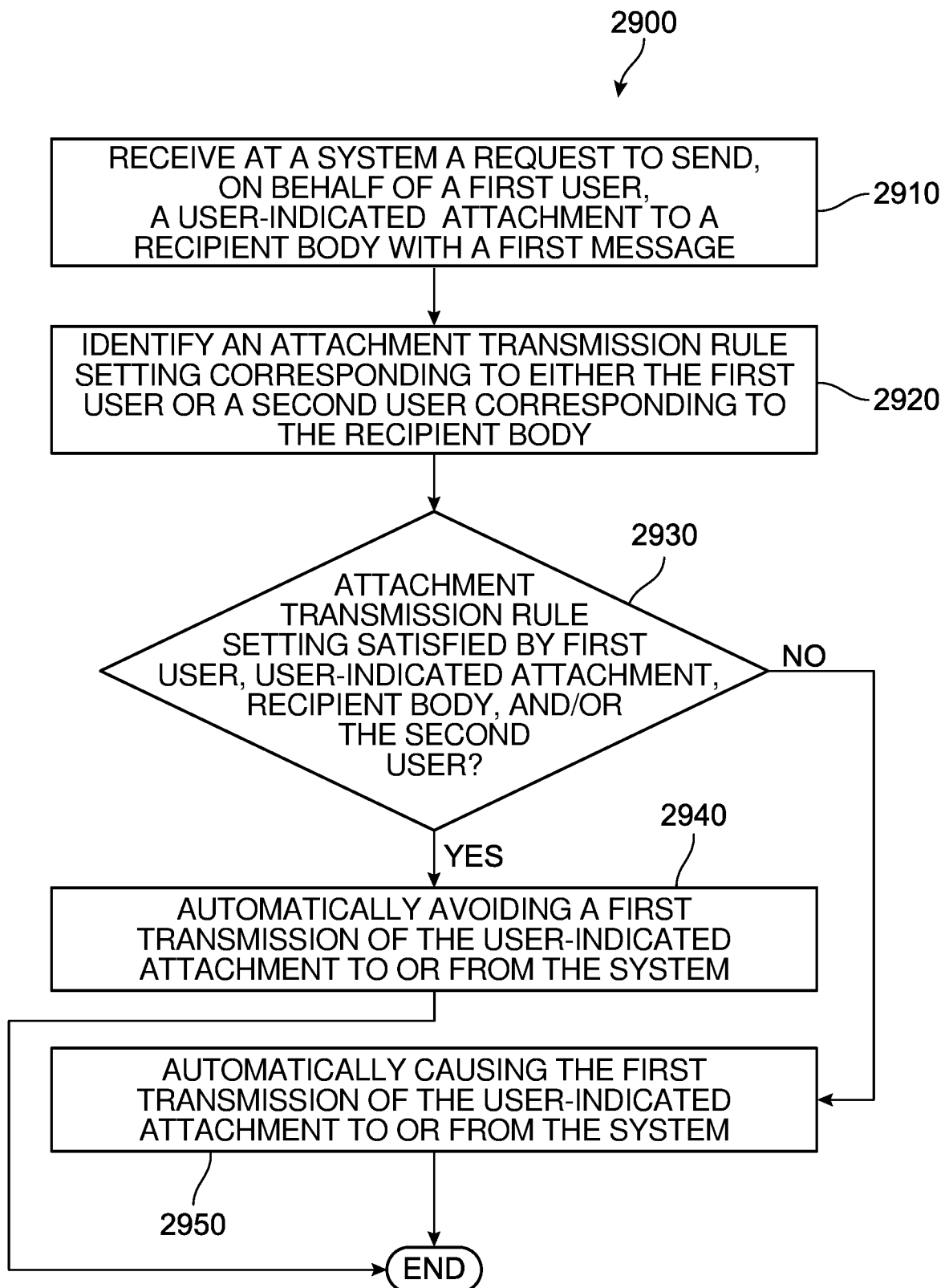

FIG. 29 is a flow chart illustrating an implementation of an example process 2900 for communication between users of an electronic messaging service. In some examples, some or all of the process 2900 may be performed in combination with any of the features discussed in connection with FIGS. 1A-8 and 23-25C. In FIG. 29, a first operation 2910 includes receiving, via a data communication network at a first computer system, a first request to send, on behalf of a first user, a first user-indicated message attachment to a first recipient body in association with a request to send a first message to the first recipient body. In a second operation 2920, the process 2900 includes identifying an attachment transmission rule setting corresponding to either the first user or a second user corresponding to the first recipient body. In a third operation 2930, the process 2900 includes determining, as a first determination, whether the identified attachment transmission rule setting is satisfied by the first user, the first user-indicated message attachment, the first recipient body, and/or the second user. If the first determination indicates that the identified attachment transmission rule setting is satisfied (2930, 'YES'), the process 2900 continues to a fourth operation 2940 that includes automatically avoiding a first transmission of the first user-indicated message attachment to or from the first computer system in response to the first determination indicating that the identified attachment transmission rule setting is satisfied. Once the fourth operation 2940 is performed, the process 2900 ends. If instead the first determination indicates that the identified attachment transmission rule setting is not satisfied (2930, 'NO'), the process 2900 continues to a fifth operation 2950 that includes automatically causing the first transmission of the first user-indicated message attachment to or from the first computer system in response to the first determination indicating that the identified attachment transmission rule setting is not satisfied.

Examples of the operations illustrated in the flow charts shown in FIGS. 8, 22, and 26-29 are described in connection with FIGS. 1A-25C. It is understood that the specific orders or hierarchies of operations disclosed in FIGS. 8, 22, and 26-29 are example approaches. Based upon design preferences, it is understood that the specific orders or hierarchies of operations in FIGS. 8, 22, and 26-29 can be rearranged while remaining within the scope of the present disclosure. FIGS. 8, 22, and 26-29 present elements of the various operations in sample orders, and are not meant to be limited to the specific orders or hierarchies presented. Also, the accompanying method claims present elements of various operations in sample orders, and are not meant to be limited to the specific orders or hierarchies presented.

The detailed examples of systems, devices, and techniques described in connection with FIGS. 1A-29 are presented herein for illustration of the disclosure and its benefits. Such examples of use should not be construed to be limitations on the logical process embodiments of the disclosure, nor should variations of user interface methods from those described herein be considered outside the scope of the present disclosure. In some embodiments, various features described in FIGS. 1A-29 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 30:
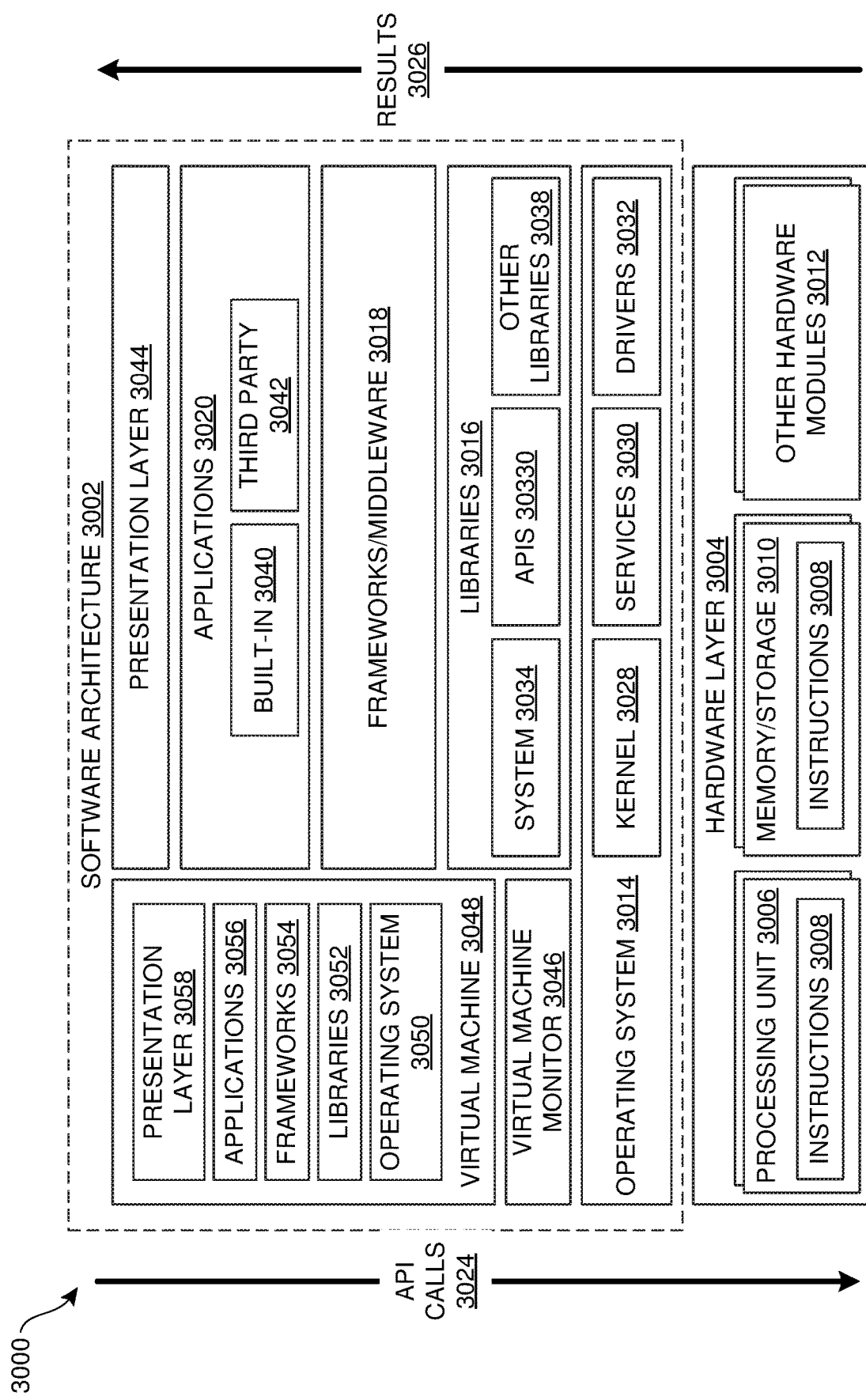
FIG. 30 is a block diagram illustrating an example software architecture, various portions of which may be used in conjunction with various hardware architectures herein described, which may implement any of the features herein described.

FIG. 30 is a block diagram 3000 illustrating an example software architecture 3002, various portions of which may be used in conjunction with various hardware architectures herein described, which may implement any of the above-described features. FIG. 30 is a non-limiting example of a software architecture and it will be appreciated that many other architectures may be implemented to facilitate the functionality described herein. The software architecture 3002 may execute on hardware such as a machine 3100 of FIG. 31 that includes, among other things, processors 3110, memory 3130, and input/output (I/O) components 3150. A representative hardware layer 3004 is illustrated and can represent, for example, the machine 3100 of FIG. 31. The representative hardware layer 3004 includes a processing unit 3006 and associated executable instructions 3008. The executable instructions 3008 represent executable instructions of the software architecture 3002, including implementation of the methods, modules and so forth described herein. The hardware layer 3004 also includes a memory/storage 3010, which also includes the executable instructions 3008 and accompanying data. The hardware layer 3004 may also include other hardware modules 3012. Instructions 3008 held by processing unit 3008 may be portions of instructions 3008 held by the memory/storage 3010.

The example software architecture 3002 may be conceptualized as layers, each providing various functionality. For example, the software architecture 3002 may include layers and components such as an operating system (OS) 3014, libraries 3016, frameworks 3018, applications 3020, and a presentation layer 3044. Operationally, the applications 3020 and/or other components within the layers may invoke API calls 3024 to other layers and receive corresponding results 3026. The layers illustrated are representative in nature and other software architectures may include additional or different layers. For example, some mobile or special purpose operating systems may not provide the frameworks/middleware 3018.

The OS 3014 may manage hardware resources and provide common services. The OS 3014 may include, for example, a kernel 3028, services 3030, and drivers 3032. The kernel 3028 may act as an abstraction layer between the hardware layer 3004 and other software layers. For example, the kernel 3028 may be responsible for memory management, processor management (for example, scheduling), component management, networking, security settings, and so on. The services 3030 may provide other common services for the other software layers. The drivers 3032 may be responsible for controlling or interfacing with the underlying hardware layer 3004. For instance, the drivers 3032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 3016 may provide a common infrastructure that may be used by the applications 3020 and/or other components and/or layers. The libraries 3016 typically provide functionality for use by other software modules to perform tasks, rather than rather than interacting directly with the OS 3014. The libraries 3016 may include system libraries 3034 (for example, C standard library) that may provide functions such as memory allocation, string manipulation, file operations. In addition, the libraries 3016 may include API libraries 3036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 3016 may also include a wide variety of other libraries 3038 to provide many functions for applications 3020 and other software modules.

The frameworks 3018 (also sometimes referred to as middleware) provide a higher-level common infrastructure that may be used by the applications 3020 and/or other software modules. For example, the frameworks 3018 may provide various graphic user interface (GUI) functions, high-level resource management, or high-level location services. The frameworks 3018 may provide a broad spectrum of other APIs for applications 3020 and/or other software modules.

The applications 3020 include built-in applications 3040 and/or third-party applications 3042. Examples of built-in applications 3040 may include, but are not limited to, a contacts application, a browser application, a location application, a media application, a messaging application, and/or a game application. Third-party applications 3042 may include any applications developed by an entity other than the vendor of the particular platform. The applications 3020 may use functions available via OS 3014, libraries 3016, frameworks 3018, and presentation layer 3044 to create user interfaces to interact with users.

Some software architectures use virtual machines, as illustrated by a virtual machine 3048. The virtual machine 3048 provides an execution environment where applications/modules can execute as if they were executing on a hardware machine (such as the machine 3100 of FIG. 31, for example). The virtual machine 3048 may be hosted by a host OS (for example, OS 3014) or hypervisor, and may have a virtual machine monitor 3046 which manages operation of the virtual machine 3048 and interoperation with the host operating system. A software architecture, which may be different from software architecture 3002 outside of the virtual machine, executes within the virtual machine 3048 such as an OS 3050, libraries 3052, frameworks 3054, applications 3056, and/or a presentation layer 3058.

Figure 31:
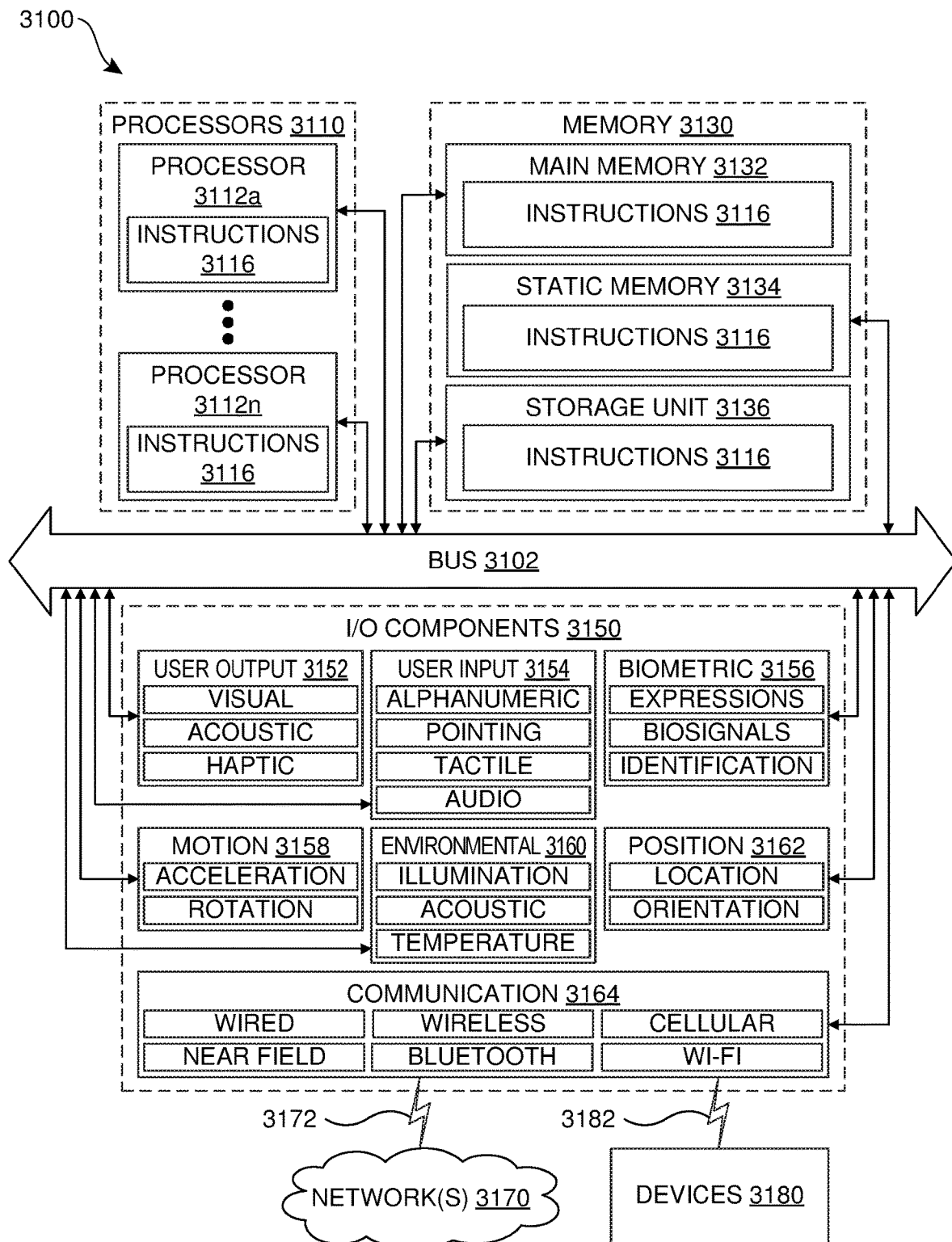
FIG. 31 is a block diagram illustrating components of an example machine configured to read instructions from a machine-readable medium and perform any of the features described herein.

FIG. 31 is a block diagram illustrating components of an example machine 3100 configured to read instructions from a machine-readable medium (for example, a machine-readable storage medium) and perform any of the features described herein. The example machine 3100 is in a form of a computer system, within which instructions 3116 (for example, in the form of software components) for causing the machine 3100 to perform any of the features described herein may be executed. As such, the instructions 3116 may be used to implement modules or components described herein. The instructions 3116 cause unprogrammed and/or unconfigured machine 3100 to operate as a particular machine configured to carry out the described features. The machine 3100 may be configured to operate as a standalone device or may be coupled (for example, networked) to other machines. In a networked deployment, the machine 3100 may operate in the capacity of a server machine or a client machine in a server-client network environment, or as a node in a peer-to-peer or distributed network environment. Machine 3100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 3100 is illustrated, the term "machine" include a collection of machines that individually or jointly execute the instructions 3116.

The machine 3100 may include processors 3110, memory 3130, and I/O components 3150, which may be communicatively coupled via, for example, a bus 3102. The bus 3102 may include multiple buses coupling various elements of machine 3100 via various bus technologies and protocols. In an example, the processors 3110 (including, for example, a central processing unit (CPU), a graphics processing unit (GPU), a digital signal processor (DSP), an ASIC, or a suitable combination thereof) may include one or more processors 3112a to 3112n that may execute the instructions 3116 and process data. In some examples, one or more processors 3110 may execute instructions provided or identified by one or more other processors 3110. The term "processor" includes a multi-core processor including cores that may execute instructions contemporaneously. Although FIG. 31 shows multiple processors, the machine 3100 may include a single processor with a single core, a single processor with multiple cores (for example, a multi-core processor), multiple processors each with a single core, multiple processors each with multiple cores, or any combination thereof. In some examples, the machine 3100 may include multiple processors distributed among multiple machines.

The memory/storage 3130 may include a main memory 3132, a static memory 3134, or other memory, and a storage unit 3136, both accessible to the processors 3110 such as via the bus 3102. The storage unit 3136 and memory 3132, 3134 store instructions 3116 embodying any one or more of the functions described herein. The memory/storage 3130 may also store temporary, intermediate, and/or long-term data for processors 3110. The instructions 3116 may also reside, completely or partially, within the memory 3132, 3134, within the storage unit 3136, within at least one of the processors 3110 (for example, within a command buffer or cache memory), within memory at least one of I/O components 3150, or any suitable combination thereof, during execution thereof. Accordingly, the memory 3132, 3134, the storage unit 3136, memory in processors 3110, and memory in I/O components 3150 are examples of machine-readable media.

As used herein, "machine-readable medium" refers to a device able to temporarily or permanently store instructions and data that cause machine 3100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 3116) for execution by a machine 3100 such that the instructions, when executed by one or more processors 3110 of the machine 3100, cause the machine 3100 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 3150 may include a wide variety of hardware components adapted to receive input, provide output, produce output, transmit information, exchange information, capture measurements, and so on. The specific I/O components 3150 included in a particular machine will depend on the type and/or function of the machine. For example, mobile devices such as mobile phones may include a touch input device, whereas a headless server or IoT device may not include such a touch input device. The particular examples of I/O components illustrated in FIG. 31 are in no way limiting, and other types of components may be included in machine 3100. The grouping of I/O components 3150 are merely for simplifying this discussion, and the grouping is in no way limiting. In various examples, the I/O components 3150 may include user output components 3152 and user input components 3154. User output components 3152 may include, for example, display components for displaying information (for example, a liquid crystal display (LCD) or a projector), acoustic components (for example, speakers), haptic components (for example, a vibratory motor or force-feedback device), and/or other signal generators. User input components 3154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 3150 may include biometric components 3156, motion components 3158, environmental components 3160, and/or position components 3162, among a wide array of other physical sensor components. The biometric components 3156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 3158 may include, for example, acceleration sensors (for example, an accelerometer) and rotation sensors (for example, a gyroscope). The environmental components 3160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 3162 may include, for example, location sensors (for example, a Global Position System (GPS) receiver), altitude sensors (for example, an air pressure sensor from which altitude may be derived), and/or orientation sensors (for example, magnetometers).

The I/O components 3150 may include communication components 3164, implementing a wide variety of technologies operable to couple the machine 3100 to network(s) 3170 and/or device(s) 3180 via respective communicative couplings 3172 and 3182. The communication components 3164 may include one or more network interface components or other suitable devices to interface with the network(s) 3170. The communication components 3164 may include, for example, components adapted to provide wired communication, wireless communication, cellular communication, Near Field Communication (NFC), Bluetooth communication, Wi-Fi, and/or communication via other modalities. The device(s) 3180 may include other machines or various peripheral devices (for example, coupled via USB).

In some examples, the communication components 3164 may detect identifiers or include components adapted to detect identifiers. For example, the communication components 3164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 3162, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of electronic messaging comprising:
   identifying a first recipient body based on a first user input obtained by a first end-user computing device;
   identifying, based on a second user input obtained by the first end-user computing device, a first user-indicated message attachment to be sent in association with a first message;
   obtaining a first fingerprint resulting from a first fingerprinting algorithm being applied to the first user-indicated message attachment;
   determining that the first fingerprint matches a second fingerprint resulting from the first fingerprinting algorithm being applied to a message attachment previously sent to or sent by a first user or a communication group corresponding to the first recipient body;
   determining, based on at least the determination that the first fingerprint matches the second fingerprint, that the first user-indicated message attachment is redundant with a message attachment previously sent to or sent by a user or a communication group corresponding to the first recipient body; and
   presenting, via a human-machine interface provided by the first end-user computing device at a first time in response to the determination that the that the first user-indicated message attachment is redundant, a first notification that the first user-indicated message attachment is redundant with a message attachment previously sent to or sent by a user or a communication group corresponding to the first recipient body.

2. The method of claim 1, further comprising:
modifying a text component of the first message in response to a third user input obtained by the first end-user computing device after the first time;
requesting the first message including the modified text component be sent to the first recipient body in response to a fourth user input obtained by the first end-user computing device; and
requesting the first user-indicated message attachment be sent to the first recipient body in association with the first message in response to the fourth user input obtained by the first end-user computing device.

3. The method of claim 1, further comprising:
requesting the first message be sent to the first recipient body in response to a third user input obtained by the first end-user computing device after the first time; and
transmitting the first user-indicated message attachment in association with the first message via a data communication network in response to the third user input.

4. The method of claim 1, further comprising generating the first fingerprint by applying the first fingerprinting algorithm to the first user-indicated message attachment at the first end-user computing device.

5. The method of claim 1, further comprising:
recording, by the first end-user computing device, a first association between the second fingerprint and the first user or the communication group;
determining that the first user or the communication group corresponds to the first recipient body,
wherein the determination that the first user-indicated message attachment is redundant is based on at least the determination that the first fingerprint matches the second fingerprint, the determination that the first user or the communication group corresponds to the first recipient body, and the recorded first association between the second fingerprint and the first user or the communication group.

6. The method of claim 1, wherein the determination that the first fingerprint matches the second fingerprint is determined based on the first fingerprint being identical to the second fingerprint or a similarity metric between the first fingerprint and the second fingerprint satisfying a threshold condition.

7. A method of electronic messaging comprising:
receiving, via a data communication network according to a messaging protocol at a first end-user computing device, a first message sent from a different second end-user computing device, wherein the messaging protocol defines rules and/or formats for sending a message bearing user-created text between different end-user computing devices, sending a message between different end-user computing devices and identifying one or more user-indicated message attachment associated with the message, and transferring a user-indicated message attachment associated with a message to the first end-user computing device;
determining that a first user-indicated message attachment is associated with the first message;
determining, at the first end-user computing device, that the first user-indicated message attachment is redundant, such that a first fingerprint resulting from a first fingerprinting algorithm being applied to the first user-indicated message attachment corresponds to a second user-indicated message attachment previously sent to or sent by the first end-user computing device or a first user associated with the first end-user computing device;
presenting, via a human-machine interface provided by the first end-user computing device and in response to the determination that the first user-indicated message attachment is redundant, a description of the first message that includes a first indication that the first user-indicated message attachment is redundant;
selectively enabling, based on the determination that the first user-indicated message attachment is redundant, a first user-initiated operation related to presentation of the first message; and
performing the first user-initiated operation for the first message based on a first user input to the first end-user computing device.

8. The method of claim 7, wherein:
the first message includes a first indication that a remote computing device determined that the first fingerprint corresponds to the second user-indicated message attachment; and
the determination at the first end-user computing device that the first user-indicated message attachment is redundant is based on the first indication being included in the first message.

9. The method of claim 7, further comprising:
receiving, by the first end-user computing device via a data communication network according to the messaging protocol, a second message that includes a second fingerprint resulting from the first fingerprinting algorithm being applied to a second user-indicated message attachment that accompanies the second message; and
determining, at the first end-user computing device, that the first fingerprint matches the second fingerprint, wherein:
the first message includes the first fingerprint, and
the determination at the first end-user computing device that the first user-indicated message attachment is redundant is based on the determination that the first fingerprint matches the second fingerprint.

10. The method of claim 9, wherein the determination that the first fingerprint matches the second fingerprint is determined based on the first fingerprint being identical to the second fingerprint or a similarity metric between the first fingerprint and the second fingerprint satisfying a threshold condition.

11. The method of claim 7, wherein:
the first message includes a sample image corresponding to the first user-indicated message attachment, wherein the sample image has a smaller transmission size than the first user-indicated message attachment; and
the first indication includes displaying the sample image.

12. The method of claim 7, wherein the performing the first user-initiated operation comprises:
receiving, by the first end-user computing device via a data communication network, a third message attachment corresponding to the first user-indicated message attachment; and
rendering the received third message attachment by the first end-user computing device.

13. The method of claim 7, wherein the first user-initiated operation includes displaying a listing of additional messages associated with first user-indicated message attachment.

14. The method of claim 7, further comprising:
determining that the second user-indicated message attachment was previously displayed by an end-user device associated with the first user; and
presenting, via a human-machine interface provided by the first end-user computing device and in response to the determination that the second user-indicated message attachment was previously displayed, an indication that the first user-indicated message attachment was previously viewed by the first user.

15. The method of claim 7, wherein the first indication that the first user-indicated message attachment is redundant includes a minimized or low-resolution representation of the first user-indicated message attachment.

16. A nontransitory machine-readable medium including instructions which, when executed by the first end-user computing device, cause the first end-user computing device to perform the method of claim 7.

17. A method of electronic messaging comprising:
receiving, at a first computer system from a first end-user computing device via a data communication network, a first request to send a first user-indicated message attachment to a first recipient body in association with a request to send a first message to the first recipient body;
obtaining, at the first computer system, a first fingerprint resulting from a first fingerprinting algorithm being applied to the first user-indicated message attachment;
recording, by the first computer system, a first association between the first fingerprint and a first user or a communication group corresponding to the first recipient body or the first end-user computing device;
receiving, at the first computer system from a second end-user computing device via a data communication network, a second request to send a second user-indicated message attachment to a second recipient body in association with request to send a second message to the second recipient body;
obtaining, at the first computer system, a second fingerprint resulting from the first fingerprinting algorithm being applied to the second user-indicated message attachment;
determining that the first fingerprint matches the second fingerprint;
determining that the first user or the communication group corresponds to the second recipient body;
determining that the second user-indicated message attachment is redundant based on the determination that the first fingerprint matches the second fingerprint, the determination that the first user or the communication group corresponds to the second recipient body, and the recorded first association; and
transmitting, from the first computer system via a network to one of the second end-user computing device and a third end-user computing device corresponding to the first user or the communication group and based on the determination that the second user-indicated message attachment is redundant, an indication that the second user-indicated message attachment is redundant.

18. The method of claim 17, further comprising:
identifying a sending user associated with the first end-user computing device;
recording, by the first computer system, a second association between the first fingerprint and the sending user;
receiving, at the first computer system from a third end-user computing device via a network, a third request to send a third user-indicated message attachment to a third recipient body;
obtaining a third fingerprint resulting from the first fingerprinting algorithm being applied to the third user-indicated message attachment;
determining that the first fingerprint matches the third fingerprint;
determining that the sending user is associated with the third recipient body;
determining that the third user-indicated message attachment is redundant based on the determination that the first fingerprint matches the third fingerprint, the determination that the sending user is associated with the third recipient body, and the recorded second association; and
transmitting, from the first computer system via a network to one of the third end-user computing device and the first end-user computing device and based on the determination that the third user-indicated message attachment is redundant, an indication that the second user-indicated message attachment is redundant for the sending user.

19. The method of claim 17, wherein the determination that the first fingerprint matches the second fingerprint is determined based on the first fingerprint being identical to the second fingerprint or a similarity metric between the first fingerprint and the second fingerprint satisfying a threshold condition.

20. A nontransitory machine-readable medium including instructions which, when executed by the first computer system, cause the first computer system to perform the method of claim 17.

* * * * *